US006256407B1

(12) United States Patent
Mennie et al.

(10) Patent No.: US 6,256,407 B1
(45) Date of Patent: *Jul. 3, 2001

(54) COLOR SCANHEAD AND CURRENCY HANDLING SYSTEM EMPLOYING THE SAME

(75) Inventors: Douglas U. Mennie, Barrington; Frank M. Csulits, Gurnee, both of IL (US); Matthew L. Anderson, Salem, WI (US); Gary P. Watts, Buffalo Grove, IL (US); Richard A. Mazur, Naperville, IL (US); Charles P. Jenrick, Schaumburg, IL (US); Bradford T. Graves, Arlington Heights, IL (US)

(73) Assignee: Cummins-Allison Corporation, Mt. Prospect, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,175

(22) Filed: Mar. 15, 1999

Related U.S. Application Data

(63) Continuation-in-part of application No. 09/197,250, filed on Nov. 20, 1998, now abandoned.
(60) Provisional application No. 60/078,228, filed on Mar. 17, 1998.

(51) Int. Cl.[7] .......... G06K 9/00

(52) U.S. Cl. .......... 382/135; 382/321; 358/514

(58) Field of Search .......... 382/112, 135, 382/137, 139, 140, 318, 319, 321; 358/512, 513, 514

(56) References Cited

U.S. PATENT DOCUMENTS

| | | | |
|---|---|---|---|
| 3,480,785 | 11/1969 | Aufderheide | 250/219 |
| 3,496,370 | 2/1970 | Haville et al. | 250/219 |
| 3,679,314 | 7/1972 | Mustert | 356/71 |
| 3,764,978 | 10/1973 | Tyburski et al. | 340/146.3 D |
| 4,319,137 | 3/1982 | Nakamura et al. | 250/556 |
| 4,334,619 | 6/1982 | Horino et al. | 209/551 |
| 4,542,829 | 9/1985 | Emery et al. | 209/534 |

(List continued on next page.)

FOREIGN PATENT DOCUMENTS

| | | | |
|---|---|---|---|
| 4438746 A1 | 5/1995 | (DE) | H04N/1/40 |
| 0 071 421 | 2/1983 | (EP) | G07D/7/00 |

(List continued on next page.)

OTHER PUBLICATIONS

First Translation of JP 61–14557.
Second Translation of 61–14557.
Translation of JP 54–71673.

(List continued on next page.)

*Primary Examiner*—Andrew W. Johns
(74) *Attorney, Agent, or Firm*—Jenkens & Gilchrist

(57) ABSTRACT

A document handling system is configured for processing a variety of different documents. The system includes an input receptacle for receiving a stack of documents, a standard sensor for scanning at least one non-color characteristic of the bills in the stack, a color sensor for scanning the color characteristics of the bills, and an output receptacle for receiving the bills after they have been processed. A transport mechanism is included for transporting bills, one at a time, from the input receptacle past the sensors to the output receptacle. An operator interface is provided for displaying information to an operator and inputting information to the system. A processor is also included for processing the data gathered from the sensors to evaluate the bills.

118 Claims, 48 Drawing Sheets

U.S. PATENT DOCUMENTS

| | | | |
|---|---|---|---|
| 4,547,896 | 10/1985 | Ohtombe et al. | 382/7 |
| 4,563,771 | 1/1986 | Gorgone et al. | 382/7 |
| 4,587,412 | 5/1986 | Apisdorf | 235/449 |
| 4,658,289 | 4/1987 | Nagano et al. | 358/75 |
| 4,680,803 | 7/1987 | Dilella | 382/9 |
| 4,710,963 | 12/1987 | Chapman et al. | 382/7 |
| 4,716,456 | 12/1987 | Hosaka | 358/75 |
| 4,825,246 | 4/1989 | Fukuchi et al. | 355/4 |
| 4,841,358 | 6/1989 | Kammoto et al. | 358/75 |
| 4,870,483 * | 9/1989 | Nishigaki et al. | 358/44 |
| 4,881,268 | 11/1989 | Uchida et al. | 382/7 |
| 4,922,109 | 5/1990 | Bercovitz et al. | 250/556 |
| 4,943,159 | 7/1990 | Oetliker et al. | 356/73 |
| 4,947,441 | 8/1990 | Hara et al. | 382/7 |
| 4,953,086 | 8/1990 | Fukatsu | 364/408 |
| 4,973,851 | 11/1990 | Lee | 250/556 |
| 4,992,860 | 2/1991 | Hamaguchi et al. | 358/75 |
| 5,026,159 | 6/1991 | Allen et al. | 356/318 |
| 5,027,415 | 6/1991 | Hara et al. | 382/7 |
| 5,101,184 | 3/1992 | Antes | 235/454 |
| 5,236,072 | 8/1993 | Cargill | 194/207 |
| 5,295,196 | 3/1994 | Raterman et al. | 382/7 |
| 5,304,813 | 4/1994 | De Man | 250/556 |
| 5,309,515 | 5/1994 | Troung et al. | 382/7 |
| 5,367,577 | 11/1994 | Gotaas | 382/7 |
| 5,465,301 | 11/1995 | Jotcham et al. | 380/54 |
| 5,467,405 | 11/1995 | Raterman et al. | 382/135 |
| 5,471,281 | 11/1995 | Hayashi et al. | 155/201 |
| 5,498,879 | 3/1996 | De Man | 250/556 |
| 5,565,962 | 10/1996 | Yoshimoto | 355/201 |
| 5,638,496 | 6/1997 | Sato | 395/109 |
| 5,640,463 | 6/1997 | Csultis | 382/135 |
| 5,652,802 | 7/1997 | Graves et al. | 382/135 |
| 5,687,963 | 11/1997 | Mennie | 271/119 |
| 5,692,067 | 11/1997 | Raterman et al. | 382/135 |
| 5,704,491 | 1/1998 | Graves | 209/534 |
| 5,724,437 | 3/1998 | Bucher et al. | 382/112 |
| 5,724,438 | 3/1998 | Graves | 382/135 |
| 5,751,840 | 5/1998 | Raterman et al. | 382/135 |
| 5,790,693 | 8/1998 | Graves et al. | 382/135 |
| 5,790,697 | 8/1998 | Munro et al. | 382/135 |
| 5,806,650 | 9/1998 | Mennie et al. | 194/206 |
| 5,815,592 | 9/1998 | Mennie et al. | 382/135 |
| 5,822,448 | 10/1998 | Graves et al. | 382/135 |
| 5,832,104 | 11/1998 | Graves et al. | 382/135 |
| 5,867,589 | 2/1999 | Graves et al. | 382/135 |
| 5,870,487 | 2/1999 | Graves et al. | 382/135 |
| 5,875,259 | 2/1999 | Mennie et al. | 382/135 |
| 5,898,510 * | 4/1999 | Kaihotsu et al. | 358/509 |
| 5,905,810 | 5/1999 | Jones et al. | 382/135 |
| 5,917,621 * | 6/1999 | Yushiya | 358/518 |
| 6,061,121 | 5/2000 | Holl et al. | 256/71 |

FOREIGN PATENT DOCUMENTS

| | | | |
|---|---|---|---|
| 0 077 464 | 4/1983 | (EP) | G03H/1/08 |
| 0083062 | 9/1987 | (EP) | G07D/7/00 |
| 0 325 364 | 7/1989 | (EP) | H04N/1/46 |
| 0 338 123 | 10/1989 | (EP) | G07D/7/00 |
| 0 487 316 | 5/1992 | (EP) | G07D/7/00 |
| 0537513 A1 | 4/1993 | (EP) | G07D/7/00 |
| 0 718 809 | 6/1996 | (EP) | G07D/7/00 |
| 2 199 173 | 6/1988 | (GB) | G06K/9/62 |
| 54-71673 | 6/1979 | (JP) | G06M/7/06 |
| 54-71674 | 6/1979 | (JP) | G06M/7/06 |
| 56-136689 | 10/1981 | (JP) | B07C/3/08 |
| 61-14557 | 4/1986 | (JP) | G06M/7/06 |
| 61-41439 | 9/1986 | (JP) | G06M/7/06 |
| 2-12492 | 1/1990 | (JP) | G07D/7/00 |
| WO 91/03031 | 3/1991 | (WO) | G07D/7/00 |
| WO 96/36021 | 11/1996 | (WO) | G07D/7/00 |

OTHER PUBLICATIONS

Translation of JP 54–71674.
Translation of JP 61–41439.
First Translation of JP 56–136689.
Second Translation of JP 56–136689.
Billcon D–202/204 Service Manual (cover marked 630229) (Japanese).
Translation of Billcon D–202/204 Service Manual.
Billcon D–202, D204 Operator's Manual (cover marked 611215) (Japanese).
First Translation of Billcon D–202, D204 Operator's Manual (H15).
Second Translation of Billcon D–202, D204 Operator's Manual (H15).
Banking Machine Digest No. 31 Dec. 5, 1988 (Japanese).
First Translation of Banking Machine Digest No. 31.
Second Translation of Banking Machine Digest No. 31.
Third Translation of Banking Machine Digest No. 31.

* cited by examiner

*FIG. 18* TIMING DIAGRAM

MAIN ROUTINE

THRCHK

PATTCHK

PATTCHK

COLRES

COLRES

COLRES

COLOR SCANHEAD AND CURRENCY HANDLING SYSTEM EMPLOYING THE SAME

CROSS-REFERENCE TO RELATED APPLICATIONS

This application is a continuation-in-part of application Ser. No. 09/197,250, filed Nov. 20, 1998 now abandoned, and claims the benefit of copending Provisional Patent Application Ser. No. 60/078,228 filed Mar. 17, 1998.

FIELD OF THE INVENTION

The present invention relates generally to currency handling systems such as those capable of distinguishing or discriminating between currency bills of different denominations and, more particularly, to such systems that employ color sensors.

BACKGROUND OF THE INVENTION

Systems that are currently available for simultaneous scanning and counting of documents such as paper currency are relatively complex and costly, and relatively large in size. The complexity of such systems can also lead to excessive service and maintenance requirements. These drawbacks have inhibited more widespread use of such systems, particularly in banks and other financial institutions where space is limited in areas where the systems are most needed, such as teller areas. The above drawbacks are particularly difficult to overcome in systems which offer much-needed features such as the ability to authenticate the genuineness and/or determine the denomination of the bills.

Therefore, there is a need for a small, compact system that can denominate bills of different denominations of bills. Likewise there is such a need for a system that can discriminate the denominations of bills from more than more country. Likewise there is a need for such a small compact system that can readily be made to process the bills from a set of countries and yet has the flexibility so it can also be readily made to process the bills from a different set of one or more countries. Likewise, there is a need for a currency handling system that can satisfy these needs while at the same time being relatively inexpensive.

There is also a need for a currency handling system that can retrieve color information from currency bills. Currently, there are a systems that do perform color analysis on bills; however, these systems suffer from one or more drawbacks. For example, many of these color-capable systems are extremely large and expensive. Furthermore, some of these systems employ a color CCD array to scan bills. Color CCD arrays have the disadvantages of being expensive and requiring a considerable amount of processing power, thus requiring more expensive signal processors and more processing time. Additionally, one problem associated with color scanning is a need for bills to be more brightly illuminated than for standard scanning or analysis. However, adding additional light sources adds to the cost of the system and undesirably increases the heat that is generated and the power that is consumed.

Another drawback of prior color-capable currency handling systems is that they employ color scanhead arrangements that are themselves large in size which in turn requires the systems in which they are used to be larger.

Accordingly, there is a need for a small, compact, and less expensive full color scanning currency handling system. A full color scanning currency handling system uses all three of the primary colors to process and discriminate a currency bill or document. The term "primary colors" as used herein means colors from which all colors may be generated and includes the three additive primary colors (red, green, and blue) as well as the three subtractive primary colors (magenta, yellow, and cyan). Likewise, there is a need for a full color scanhead arrangement for use in such a system that will require less processing power and adequately address the issues of providing enough illumination while at the same time avoiding the problems of excessive heat generation and power consumption. There is a need for a full color scanning arrangement that can meet these needs in a cost effective manner.

There is also a need for a system that can distinguish documents via color. There is a further need for a system that can quickly preselect master patterns. Likewise there is a need for a system that can limit the master patterns compared to the test bill pattern thus reducing the number of no-calls and/or mis-calls. There is also a need for a system that allows high speed, low cost scanning of a wide variety of money and documents including casino script, amusement park script, stock certificates, bonds, postage stamps, and/or food coupons, or other such documents. Finally, there is a need for a system that can provide not only black and white data, but also color data corresponding to the document being processed.

SUMMARY OF THE INVENTION

In accordance with one aspect of the present invention, there is provided a currency scanning system that uses full color scanning to discriminate and/or authenticate a variety of different currencies, including different denominations within a currency set.

In accordance with another aspect of this invention, there is provided such a currency scanning system utilizing color sensors that eliminate the need for lenses to focus light, thus reducing the cost and size of the system.

In one embodiment, the system of the invention automatically learns the characteristics of authentic currency from a variety of different currency systems.

In accordance with another aspect of this invention, there is provided a document handling system for processing documents, the system comprising a first sensor for scanning at least one characteristic of a document other than color, a full color sensor for scanning color characteristics of the document, and a processor for processing data corresponding to the characteristics scanned from one or more documents with the first sensor and the color sensor and for using the data to evaluate one or more document.

In accordance with another aspect of this invention, there is provided a document scanning system comprising a first scanhead assembly for scanning a first side of a document, said first scanhead assembly including at least one optical sensor for scanning optical characteristics of a document and size sensors comprising a pair of laterally spaced apart linear optical arrays extending a predetermined distance oppositely laterally outwardly for detecting opposite side edges of a document, for determining the length of a document in a direction transverse to a path of travel of a document past said scanhead.

In accordance with another aspect of this invention, there is provided a document handling method for processing documents, the method comprising the steps of scanning at least one characteristic of a document other than color, scanning full color characteristics of the document, processing data corresponding to the color and other characteristics scanned from one or more documents, and using the data to evaluate one or more documents.

In accordance with another aspect of this invention, there is provided a color scanhead apparatus for a document handling system, said color scanhead comprising a full color sensor including a plurality of color cells, each cell comprising a primary color sensor for sensing each of at least two primary colors.

In accordance with another aspect of this invention, there is provided a color scanning method for a document handling system for processing documents, the method comprising the steps of scanning full color characteristics of a document, processing data corresponding to the characteristics scanned from one or more documents, and using the data to evaluate one or more documents.

These and other features are provided by a system for processing a variety of different currencies. The system includes an input receptacle for receiving a stack of currency bills to be counted, a standard sensor for scanning the black and white characteristics of the bills in the stack, a color sensor for scanning the color characteristics of the bills, and an output receptacle for receiving the bills after they have been processed. A transport mechanism is included for transporting bills, one at a time, from the input receptacle past the sensors to the output receptacle. An operator interface is provided for displaying information to an operator and inputting information to the system. A processor is also included for processing the data gathered from the sensors to evaluate the bills.

Figure 1:
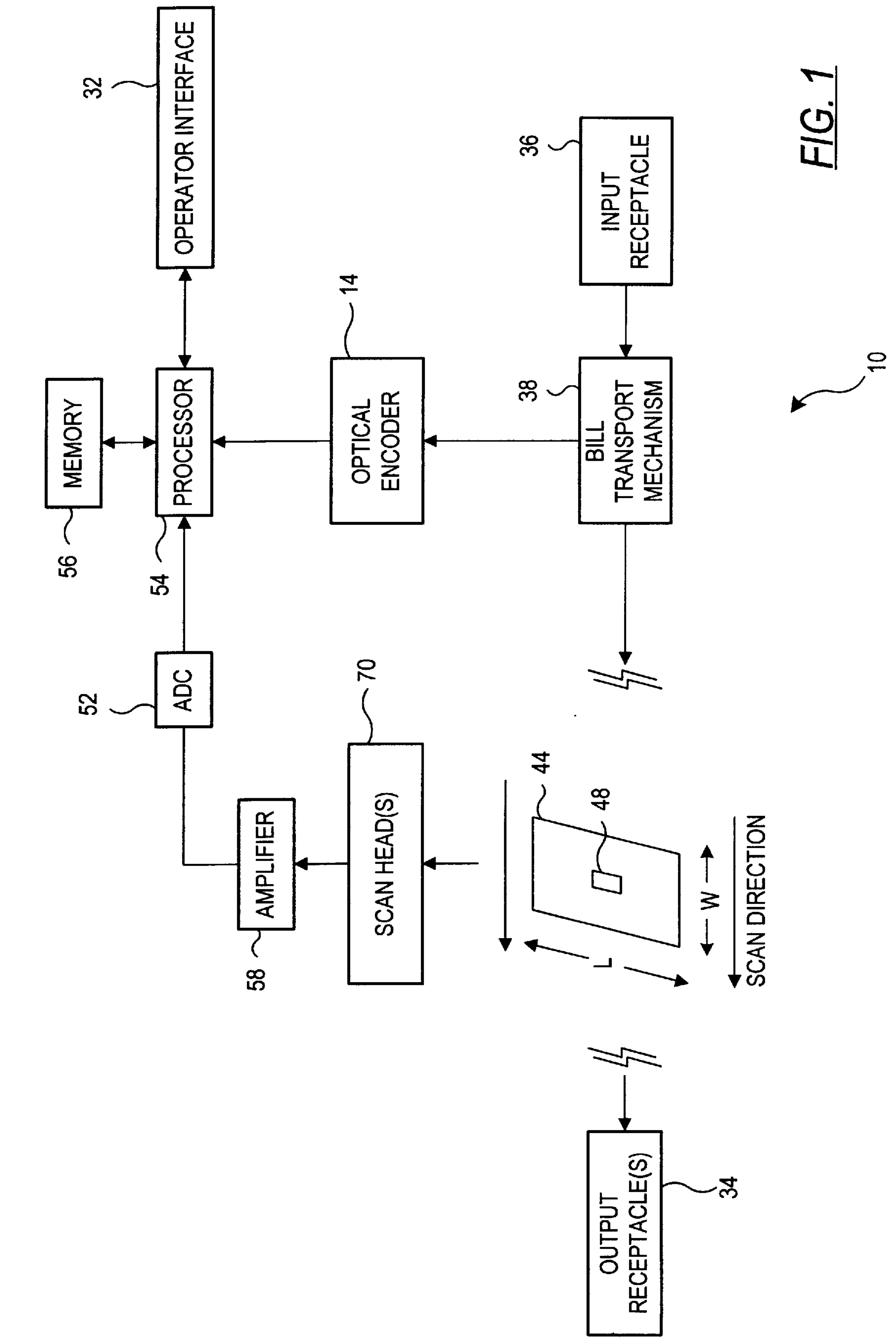
FIG. 1 is a functional block diagram of a currency handling system embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE EMBODIMENTS

FIG. 1 illustrates in functional block diagram form the operation of currency handling systems according to the present invention. FIGS. 2*a–2d*, 3*a–3b*, and 4*a–4c* then illustrate various physical embodiments of currency handling systems that function as discussed in connection with FIG. 1 and that employ a color scanning arrangement according to the present invention. These embodiments will be described first and then the details concerning embodiments of color scanheads and processing will be described.

Turning to FIG. 1, a currency handling system 10 comprises an input receptacle 36 for receiving a stack of currency bills to be processed. The processing may include evaluating, denominating, authenticating, and/or counting the currency bills. In addition to handling currency bills, the currency handling system 10 may be designed to accept and process other documents including but not limited to stamps, stock certificates, coupons, tickets, checks and other identifiable documents.

Bills placed in the input receptacle are transported one by one by a transport mechanism 38 along a transport path past one or more scanheads or sensors 70. The scanhead(s) 70 may perform magnetic, optical and other types of sensing to generate signals that correspond to characteristic information received from a bill 44. In embodiments to be described below, the scanhead(s) 70 comprises a color scanhead. In the embodiment shown in FIG. 1, the scanhead(s) 70 employs a substantially rectangularly shaped sample region 48 to scan a segment of each passing currency bill 44. After passing the scanhead(s) 70, each of the bills 44 is transported to one or more output receptacles 34 which may include stacking mechanisms to re-stack the bills 44.

According to some embodiments the scanhead(s) 70 generates analog output(s) which are amplified by an amplifier 58 and converted into a digital signal by means of an analog-to-digital converter (ADC) unit 52 whose output is fed as a digital input to a controller or processor such as a central processing unit (CPU), a processor or the like. The process (such as a microprocessor) controls the overall operation of the currency handling system 10. An encoder 14 linked to the bill transport mechanism 38 provides input to the PROCESSOR 54 to determine the timing of the operations of the currency handling system 10. In this manner, the processor is able to monitor the precise location of bills as they are transported through the currency handling system.

The PROCESSOR 54 is also operatively coupled to an internal or an external memory 56. The memory comprises one or more types of memories such as a random access memory ("RAM"), a read only memory ("ROM"), EPROM or flash memory depending on the information stored or to be stored therein. The memory 56 stores software codes and/or data related to the operation of the currency handling system 10 and information for denominating and/or authenticating bills.

An operator interface panel and display 32 provides an operator the capability of sending input data to, or receiving output data from, the currency handling system 10. Input data may comprise, for example, user-selected operating modes and user-defined operating parameters for the currency handling system 10. Output data may comprise, for example, a display of the operating modes and/or status of the currency handling system 10 and the number or cumulative value of evaluated bills. In one embodiment, the operator interface panel 32 comprises a touch-screen "keypad" and display which may be used to provide input data and display output data related to operation of the currency handling system 10. Alternatively, the operator interface 32 may employ physical keys or buttons and a separate display or a combination of physical keys and displayed touch-screen keys.

A determination of authenticity or denomination of a bill under test is based on a comparison of scanned data associated with the test bill to the corresponding master data stored in the memory 56. For example, where the currency handling system 10 comprises a denomination discriminator, a stack of bills having undetermined denominations may be processed and the denomination of each bill in the stack determined by comparing data generated from each bill to prestored master information. If the data from the bill under test sufficiently matches master information associated with a particular denomination and bill-type stored in memory, a determination of denomination may be made.

The master information may comprise numerical data associated with various denominations of currency bills. The numerical data may comprise, for example, thresholds of acceptability to be used in evaluating test bills, based on expected numerical values associated with the currency or a range of numerical values defining upper and lower limits of acceptability. The thresholds may be associated with various sensitivity levels. The master information may also comprise pattern information associated with the currency such as, for example, optical or magnetic patterns.

Figure 2A:
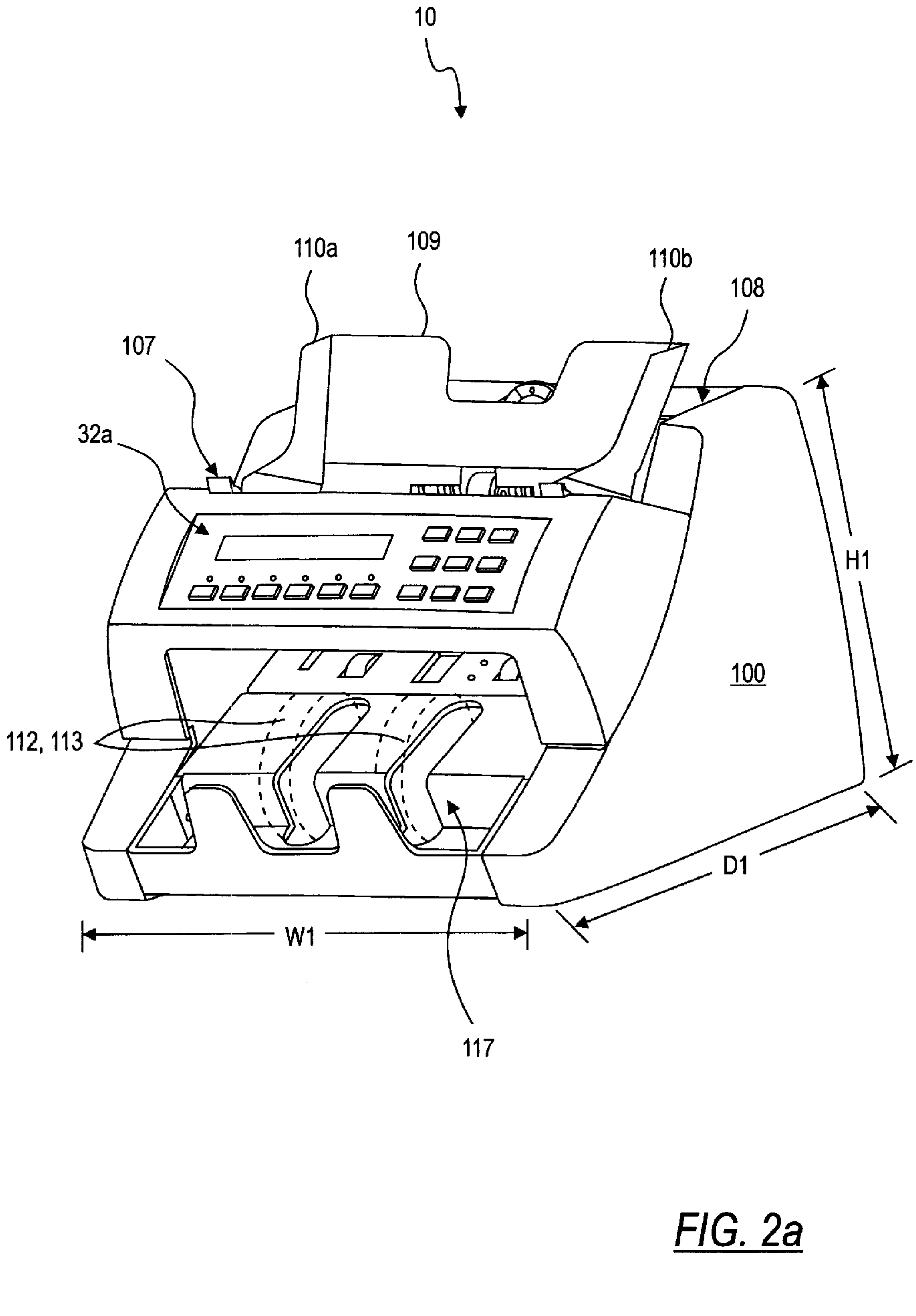
FIG. 2*a* is a perspective view of a single pocket currency handling system according to one embodiment of the present invention.
Figure 2B:
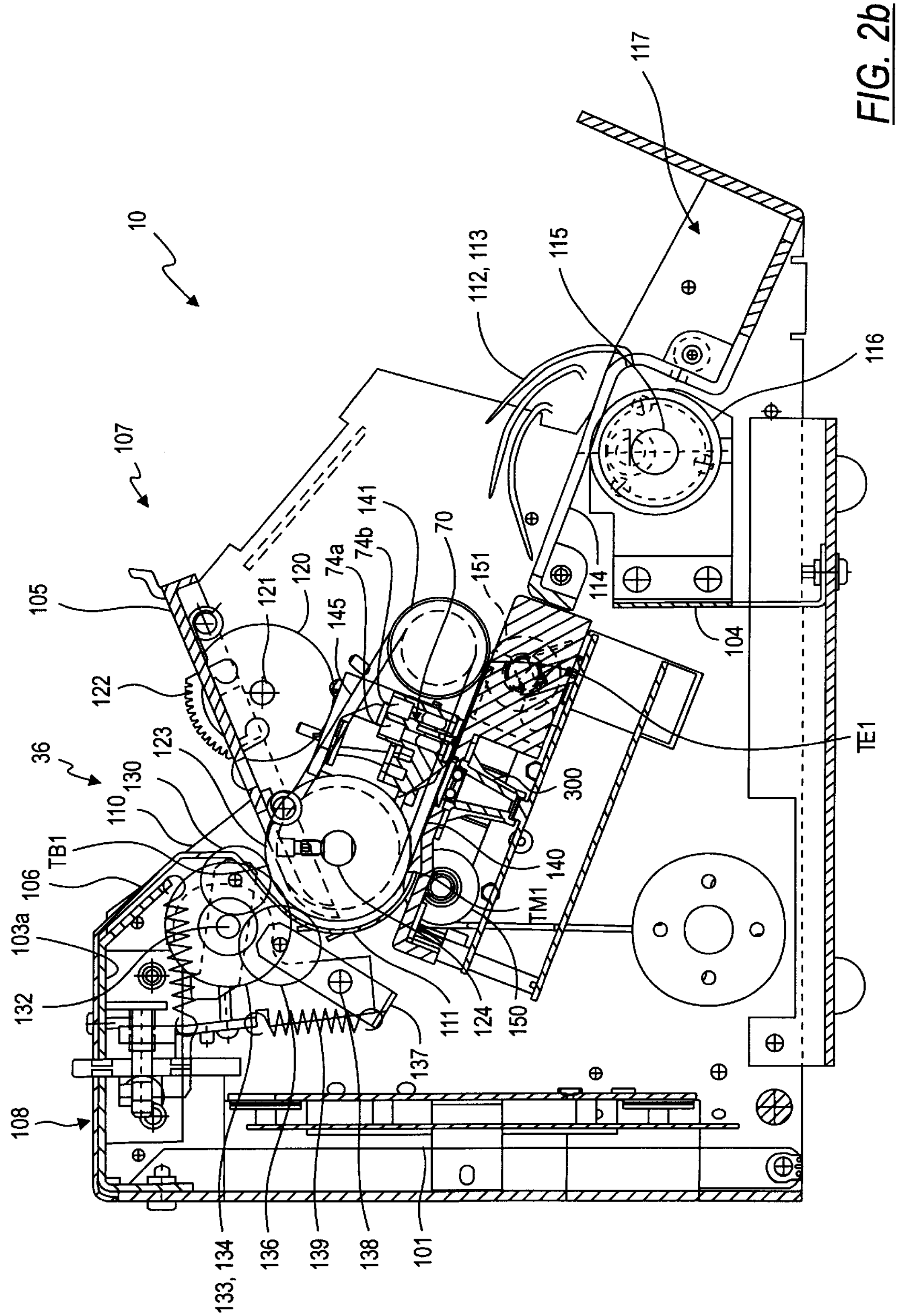
FIG. 2*b* is a sectional side view of the single pocket currency handling system of FIG. 2*a* depicting various transport rolls in side elevation.
Figure 2C:
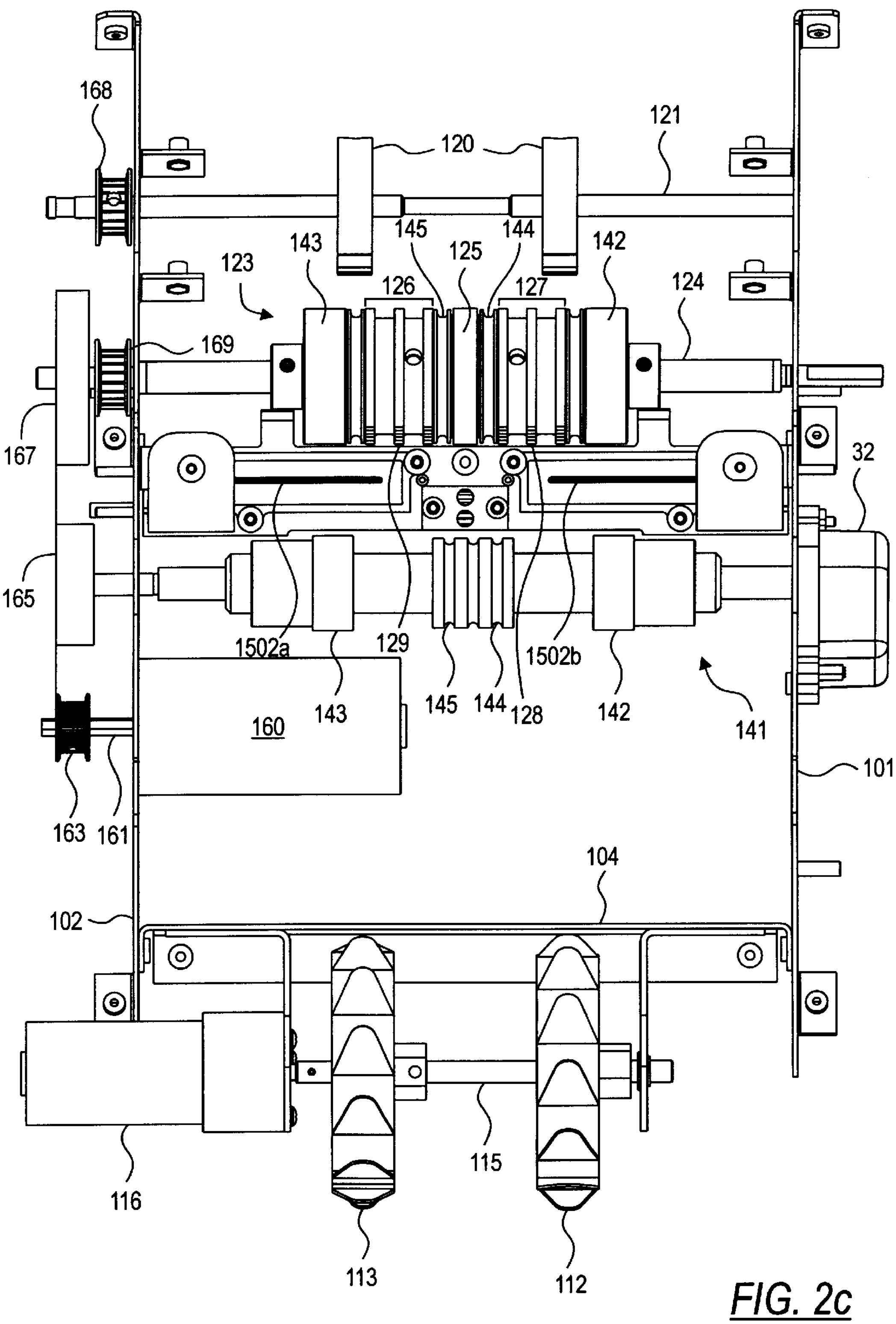
FIG. 2*c* is a top plan view of the interior mechanism of the system of FIG. 2*a* for transporting bills across a scanhead, and also showing the stacking wheels at the front of the system.
Figure 2D:
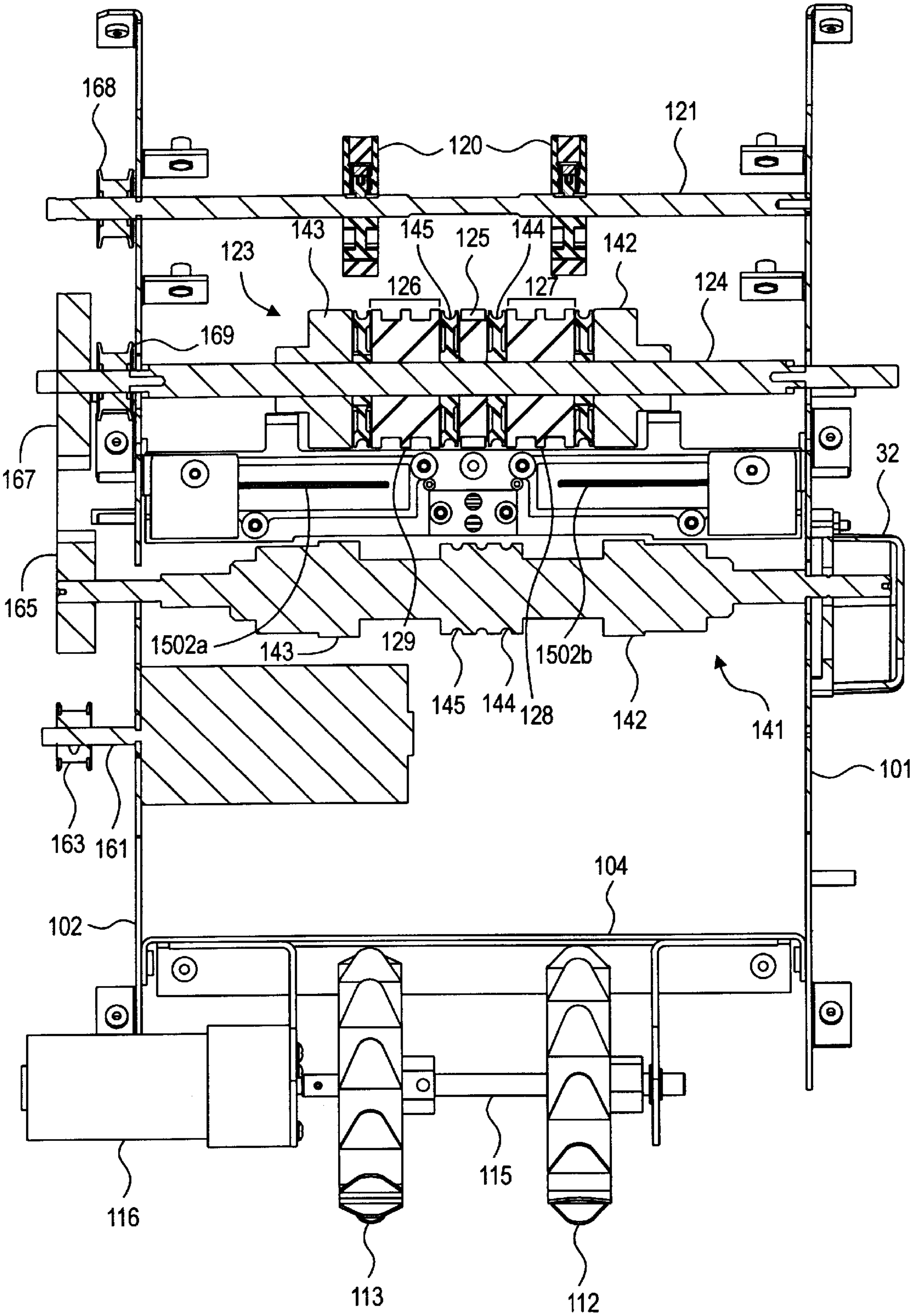
FIG. 2*d* is a sectional top view of the interior mechanism of the system of FIG. 2*a* for transporting bills across a scanhead, and also showing the stacking wheels at the front of the system.

Turning to FIGS. 2*a–2d*, FIG. 2*a* is a perspective view of a currency handling system 10 having a single output receptacle 117 according to one embodiment of the present invention. FIG. 2*b* is a sectional side view of the single pocket currency handling system of FIG. 2*a* depicting various transport rolls in side elevation and FIG. 2*c* is a top plan view of the interior mechanism of the system of FIG. 2*a* for transporting bills across a scanhead, and also showing the stacking wheels 112, 113 at the front of the system. The mechanics of this embodiment will be described briefly below. For more detail, single pocket currency handling systems are described in greater detail in U.S. Pat. No. 5,687,963 entitled "Method and Apparatus for Discriminating and Counting Documents," and U.S. Pat. No. 5,295,196 entitled "Method and Apparatus for Currency Discriminating and Counting," both of which are assigned to the assignee of the present invention and incorporated herein by reference in their entirety. The physical embodiment of the currency handling system described in U.S. Pat. No. 5,687,963 including the transport mechanism and its operation is similar to that depicted in FIGS. 2*a*–2*d* except for the scanhead arrangement. The currency handling system of FIGS. 2*a*–2*d* employs a color scanhead 300 (FIG. 2*b*) according to the present invention or in addition to one of the standard scanheads 70 described in U.S. Pat. No. 5,687,963. The currency handling system of FIGS. 2*a*–2*d* is designed to transport and process bills at a rate in excess of 800 bills per minute, preferably in excess of. 1200 bills per minute.

In the single-pocket system 10, the currency bills are fed, one by one, from a stack of currency bills placed in the input receptacle 36 into a transport mechanism, which guides the currency bills past sensors to a single output receptacle 117. The single-pocket currency handling system 10 includes a housing 100 having a rigid frame formed by a pair of side plates 101 and 102, top plate 103*a*, and a lower front plate 104. The currency handling system 10 also has an operator interface 32*a*. As shown in FIG. 2*a* the operator interface panel comprises a LCD display and physical keys or buttons. Alternatively or additionally, the operator interface panel may comprise a touch screen such as a full graphics display.

The input receptacle 36 for receiving a stack of bills to be processed is formed by downwardly sloping and converging walls 105 and 106 formed by a pair of removable covers 107 and 108. The rear wall 106 supports a removable hopper (extension) 109 which includes a pair of vertically disposed side walls 110*a* and 110*b* which complete the receptacle for the stack of currency bills to be processed.

From the input receptacle, the currency bills are moved in seriatim from the bottom of the stack along a curved guideway 111 which receives bills moving downwardly and rearwardly and changes the direction of travel to a forward direction. The curvature of the guideway 111 corresponds substantially to the curved periphery of a drive roll 123 so as to form a narrow passageway for the bills along the rear side of the drive roll. The exit end of the guideway 111 directs the bills onto a linear path where the bills are scanned and stacked. The bills are transported and stacked with the narrow dimension of the bills maintained parallel to the transport path and the direction of movement at all times.

Stacking of the bills is effected at the forward end of the linear path, where the bills are fed into a pair of driven stacking wheels 112 and 113. These wheels project upwardly through a pair of openings in a stacker plate 114 to receive the bills as they are advanced across the downwardly sloping upper surface of the plate. The stacker wheels 112 and 113 are supported for rotational movement about a shaft 115 journalled on the rigid frame and driven by a motor 116. The flexible blades of the stacker wheels deliver the bills into the output receptacle 117 at the forward end of the stacker plate 114. During operation, a currency bill which is delivered to the stacker plate 114 is picked up by the flexible blades and becomes lodged between a pair of adjacent blades which, in combination, define a curved enclosure which decelerates a bill entering therein and serves as a means for supporting and transferring the bill into the output receptacle 117 as the stacker wheels 112, 113 rotate. The mechanical configuration of the stacker wheels, as well as the manner in which they cooperate with the stacker plate, is conventional and, accordingly, is not described in detail herein.

Returning now to the input region of the system as shown in FIGS. 2*a*–2*d*, 5*a*–*b,* and 6*a*, bills that are stacked on the bottom wall 105 of the input receptacle are stripped, one at a time, from the bottom of the stack. The lowermost bill is picked by a pair of auxiliary feed wheels 120 mounted on a drive shaft 121 which, in turn, is supported across the side walls 101, 102. The auxiliary feed wheels 120 project through a pair of slots formed in the cover 107. Part of the periphery of each wheel 120 is provided with a raised high-friction, serrated surface 122 which engages the bottom bill of the input stack as the wheels 120 rotate, to initiate feeding movement of the bottom bill from the stack. The serrated surfaces 122 project radially beyond the rest of each wheel's periphery so that the wheels "jog" the bill stack during each revolution so as to agitate and loosen the bottom currency bill within the stack, thereby facilitating the stripping of the bottom bill from the stack.

The auxiliary feed wheels 120 feed each stripped bill onto a drive roll 123 mounted on a driven shaft 124 supported across the side walls 101 and 102. The drive roll 123 includes a central smooth friction surface 125 formed of a material such as rubber or hard plastic. This smooth friction surface 125 is sandwiched between a pair of grooved surfaces 126 and 127 having serrated portions 128 and 129 formed from a high-friction material. This feed and drive arrangement is described in detail in U.S. Pat. No. 5,687,963.

In order to ensure firm engagement between the drive roll 123 and the currency bill being fed, an idler roll 130 urges each incoming bill against the smooth central surface 125 of the drive roll 123. The idler roll 130 is journalled on a pair of arms which are pivotally mounted on a support shaft 132. Also mounted on the shaft 132, on opposite sides of the idler roll 130, are a pair of grooved stripping wheels 133 and 134. The grooves in these two wheels 133, 134 are registered with the central ribs in the two grooved surfaces 126, 127 of the drive roll 123. The wheels 133, 134 are locked to the shaft 132, which in turn is locked against movement in the direction of the bill movement (counterclockwise for roll 123, clockwise for wheels 133, 134, as viewed in FIG. 2*b*) by a one-way clutch (not shown). Each time a bill is fed into the nip between the guide wheels 133, 134 and the drive roll 123, the clutch is energized to turn the shaft 132 just a few degrees in a direction opposite the direction of bill movement. These repeated incremental movements distribute the wear uniformly around the circumferences of the guide wheels 133, 134. Although the idler roll 130 and the guide wheels 133, 134 are mounted behind the guideway 111, the guideway is apertured to allow the roll 130 and the wheels 133, 134 to engage the bills on the front side of the guideway.

Beneath the idler roll 130, a spring-loaded pressure roll 136 (FIG. 2*b*) presses the bills into firm engagement with the smooth friction surface 125 of the drive roll as the bills curve downwardly along the guideway 111. This pressure roll 136 is journalled on a pair of arms 137 pivoted on a stationary shaft 138. A spring 139 attached to the lower ends of the arms 137 urges the roll 136 against the drive roll 133, through an aperture in the curved guideway 111.

At the lower end of the curved guideway 111, the bill being transported by the drive roll 123 engages a flat transport or guide plate 140. Currency bills are positively driven along the flat plate 140 by means of a transport roll arrangement which includes the drive roll 123 at one end of the plate and a smaller driven roll 141 at the other end of the plate. Both the driver roll 123 and the smaller roll 141 include pairs of smooth raised cylindrical surfaces 142 and 143 which hold the bill flat against the plate 140. A pair of O-rings fit into grooves 144 and 145 formed in both the roll 141 and the roll 123 to engage the bill continuously between the two rolls 123 and 141 to transport the bill while helping to hold the bill flat against the transport plate 140.

The flat transport or guide plate 140 is provided with openings through which the raised surfaces 142 and 143 of both the drive roll 123 and the smaller driven roll 141 are subjected to counter-rotating contact with corresponding pairs of passive transport rolls 150 and 151 having high-friction rubber surfaces. The passive rolls 150, 151 are mounted on the underside of the flat plate 140 in such a manner as to be freewheeling about their axes and biased into counter-rotating contact with the corresponding upper rolls 123 and 141. The passive rolls 150 and 151 are biased into contact with the driven rolls 123 and 141 by means of a pair of H-shaped leaf springs (not shown). Each of the four rolls 150, 151 is cradled between a pair of parallel arms of one of the H-shaped leaf springs. The central portion of each leaf spring is fastened to the plate 140, which is fastened rigidly to the frame of the system, so that the relatively stiff arms of the H-shaped springs exert a constant biasing pressure against the rolls and push them against the upper rolls 123 and 141.

The points of contact between the driven and passive transport rolls are preferably coplanar with the flat upper surface of the plate 140 so that currency bills can be positively driven along the top surface of the plate in a flat manner. The distance between the axes of the two driven transport rolls, and the corresponding counter-rotating passive rolls, is selected to be just short of the length of the narrow dimension of the currency bills. Accordingly, the bills are firmly gripped under uniform pressure between the upper and lower transport rolls within the scanhead area, thereby minimizing the possibility of bill skew and enhancing the reliability of the overall scanning and recognition process.

The positive guiding arrangement described above is advantageous in that uniform guiding pressure is maintained on the bills as they are transported through the sensor or scanhead area, and twisting or skewing of the bills is substantially reduced. This positive action is supplemented by the use of the H-springs for uniformly biasing the passive rollers into contact with the active rollers so that bill twisting or skew resulting from differential pressure applied to the bills along the transport path is avoided. The O-rings function as simple, yet extremely effective means for ensuring that the central portions of the bills are held flat.

As shown in FIG. 2*c,* the optical encoder 32 is mounted on the shaft of the roller 141 for precisely tracking the position of each bill as it is transported through the system, as discussed in detail below in connection with the optical sensing and correlation technique. The encoder 32 also allows the system to be stopped in response to an error occurring or the detection of a "no call" bill. A system employing an encoder to accurately stop a scanning system is described in detail in U.S. Pat. No. 5,687,963, which is incorporated herein by reference in its entirety.

The single pocket currency system 10 described above in connection with FIGS. 2*a*–2*d*, is small and compact, such that it may be rested upon a tabletop or countertop. According to one embodiment, the single-pocket currency handling system 10 has a small size housing 100. The small size housing 100 provides a currency handling system 10 that occupies a small area or "footprint." The footprint is the area that the system 10 occupies on the table top and is calculated by multiplying the width (W1) and the depth (D1). Because the housing 100 is compact, the currency handling system 10 may be readily used at any desk, work station or teller station. Additionally, the small size housing 100 is light weight allowing the operator to move it between different work stations. According to one embodiment the currency handling system 10 has a height (H1) of about 9½ inches (24.13 cm), width (W1) of about 11 inches (27.94 cm), and a depth (D1) of about 12 inches (30.48 cm) and weighs approximately 15–20 pounds. In this embodiment, therefore, the currency handling system 10 has a "footprint" of about 11 inches by 12 inches (27.94 cm by 30.48 cm) or approximately 132 square inches (851.61 $cm^2$) which is less than one square foot, and a volume of approximately 1254 cubic inches (20,549.4 $cm^3$) which is less than one cubic foot. Accordingly, the system is sufficiently small to fit on a typical tabletop. The system is able to accommodate various currency, including German currency which is quite long in the X dimension (compared to U.S. currency). The width of the system is therefore sufficient to accommodate a German bill which is about 7.087 inches (180 mm) long. The system can be adapted for longer currency by making the transport path wider, which can make the overall system wider.

One of the contributing factors to the footprint size of the currency handling system 10 is the size of the currency bills to be handled. For example, in the embodiment described above, the width is less than about twice the length of a U.S. currency bill and the depth is less than about 5 times the width of a U.S. currency bill. Other embodiments of the single pocket currency handling system 10 have a height (H1) ranging from 7 inches to 12 inches, a width (W1) ranging from 8 inches to 15 inches, and a depth (D1) ranging from 10 inches to 15 inches and a weight ranging from about 10–30 pounds.

As best seen in FIG. 2*b,* the currency handling system 10 has a relatively short transport path between the input receptacle and the output receptacle. The transport path beginning at point TB1 (where the idler roll 130 engages the drive roll 123) and ending at point TE1 (where the second driven transport roll 141 and the passive roll 151 contact) has an overall length of about 4½ inches. The distance from point TM1 (where the passive transport roll 150 engages the drive roll 123) to point TE1 (where the second driven transport roll 141 and the passive roll 151 contact) is somewhat less than 2½ inches, that is, less than the width of a U.S. bill. Thus, The distance from point TB1 (where the idler roll 130 engages the drive roll 123) to point TM1 (where the passive transport roll 150 engages the drive roll 123) is about 2 inches.

Figure 3A:
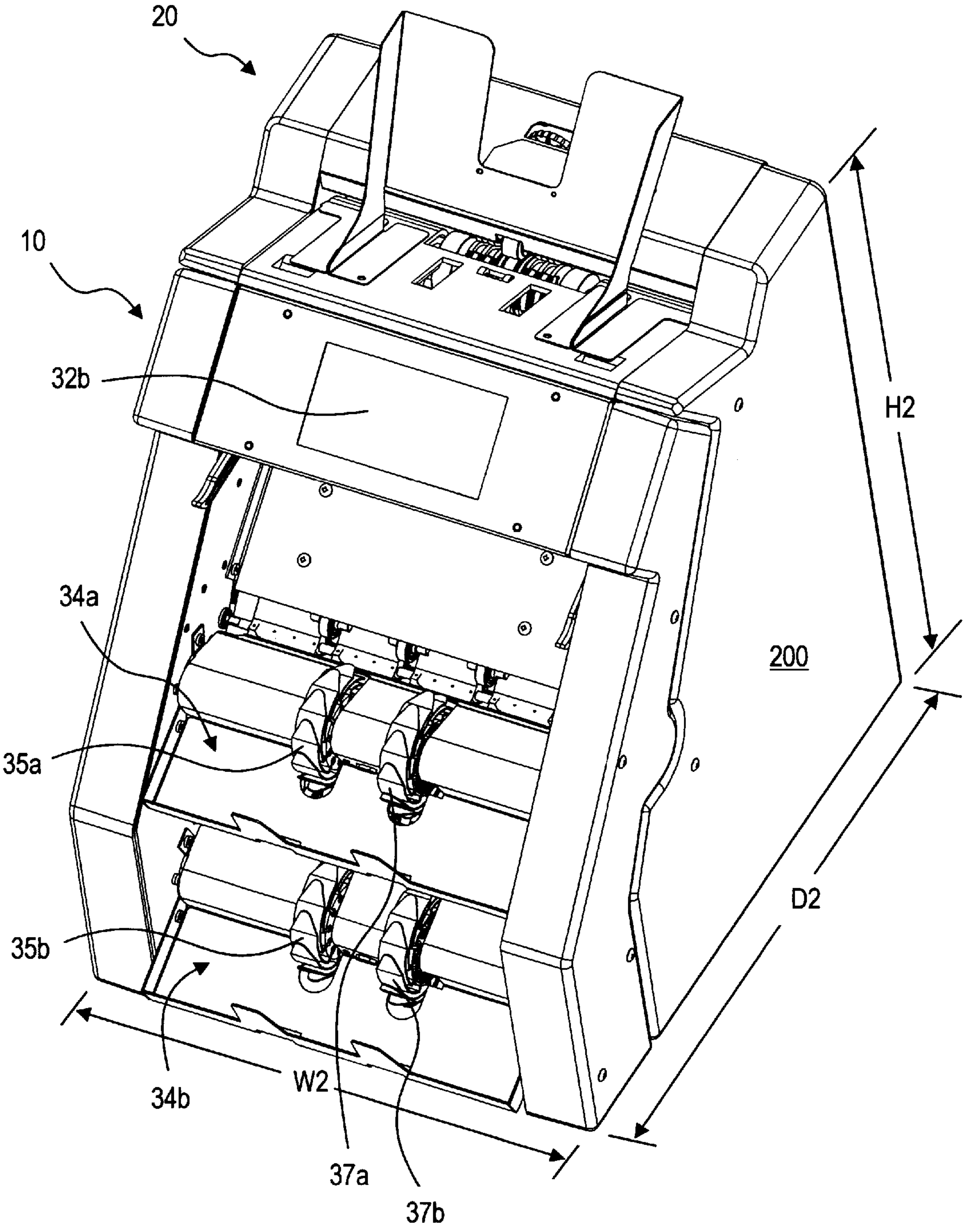
FIG. 3*a* is a perspective view of a two-pocket currency handling system according to one embodiment of the present invention.
Figure 3B:
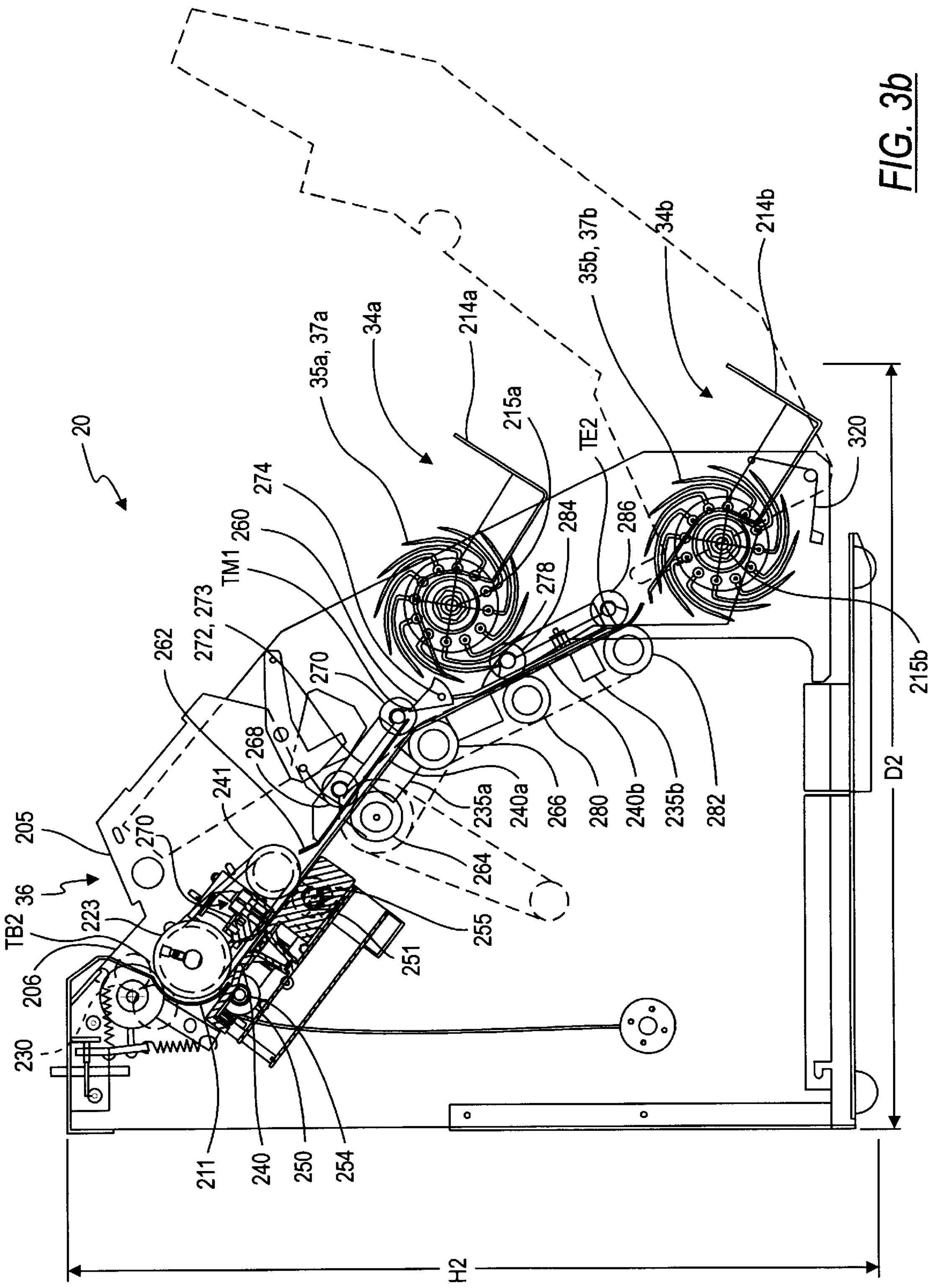
FIG. 3*b* is a sectional side view of the two-pocket currency handling system of FIG. 3*a* depicting various transport rolls in side elevation.

Turning to FIGS. 3*a* and 3*b*, FIG. 3*a* is a perspective view of a two-pocket currency handling system 20 according to one embodiment of the present invention and FIG. 3*b* is a sectional side view of the two-pocket currency handling system of FIG. 3*a* depicting various transport rolls in side elevation. Furthermore, FIGS. 4*a,* 4*b* and 4*c* portray other multi-pocket embodiments of the present invention in which the currency handling system includes three-, four- and six-pockets, respectively. Each of the multi-pocket embodiments shown respectively in FIGS. 3a–3b and 4a–4c are described in detail in co-pending U.S. patent application Ser. No. 08/864,423, filed May 28, 1997, entitled "Method and Apparatus for Document Processing", assigned to the assignee of the present invention and incorporated herein by reference in its entirety. The currency handling systems depicted in FIGS. 3a–3b and 4a–4c differ from the currency handling systems described in U.S. patent application Ser. No. 08/864,423 in that the systems depicted in FIGS. 3a–3b and 4a–4c employ a color scanhead as described in detail below.

As with the single pocket currency system 10 described above in connection with FIGS. 2a–2d, the multi-pocket currency handling systems 20, 30, 40 and 60 shown in FIGS. 3a–3b and 4a–4c are small and compact, such that they may be rested upon a tabletop. According to one embodiment, the two pocket currency handling system 20 enclosed within a housing 200 has a small footprint that may be readily used at any desk, work station or teller station. Additionally, the currency handling system is light weight allowing it to be moved between different work stations. According to one embodiment, the two-pocket currency handling system 20 has a height (H2) of about 18 inches, width (W2) of about 13½ inches, and a depth (D2) of about 17¼ inches and weighs approximately 70 pounds. Accordingly, the currency handling system 10 has a footprint of about 13½ inches by about 17 inches or approximately 230 square inches or about 1½ square feet and a volume of about 4190 cubic inches or slightly more than 2⅓ cubic feet, which is sufficiently small to conveniently fit on a typical tabletop. One of the contributing factors to the footprint size of the currency handling system 20 is the size of the currency bills to be handled. For example in the embodiment described above the width is approximately 2¼ times the length of a U.S. currency bill and the depth is approximately 7 times the width of a U.S. currency bill.

According to another embodiment, the two-pocket currency handling system 20 has a height (H2) ranging from 15–20 inches, a width (W2) ranging from 10–15 inches, and a depth (D2) ranging from 15–20 inches and a weight ranging from about 35–50 pounds. The currency handling system 10 has a footprint ranging from 10–15 inches by 15–20 inches or approximately 150–300 square inches and a volume of about 2250–6000 cubic inches, which is sufficiently small to conveniently fit on a typical tabletop.

Figure 4A:
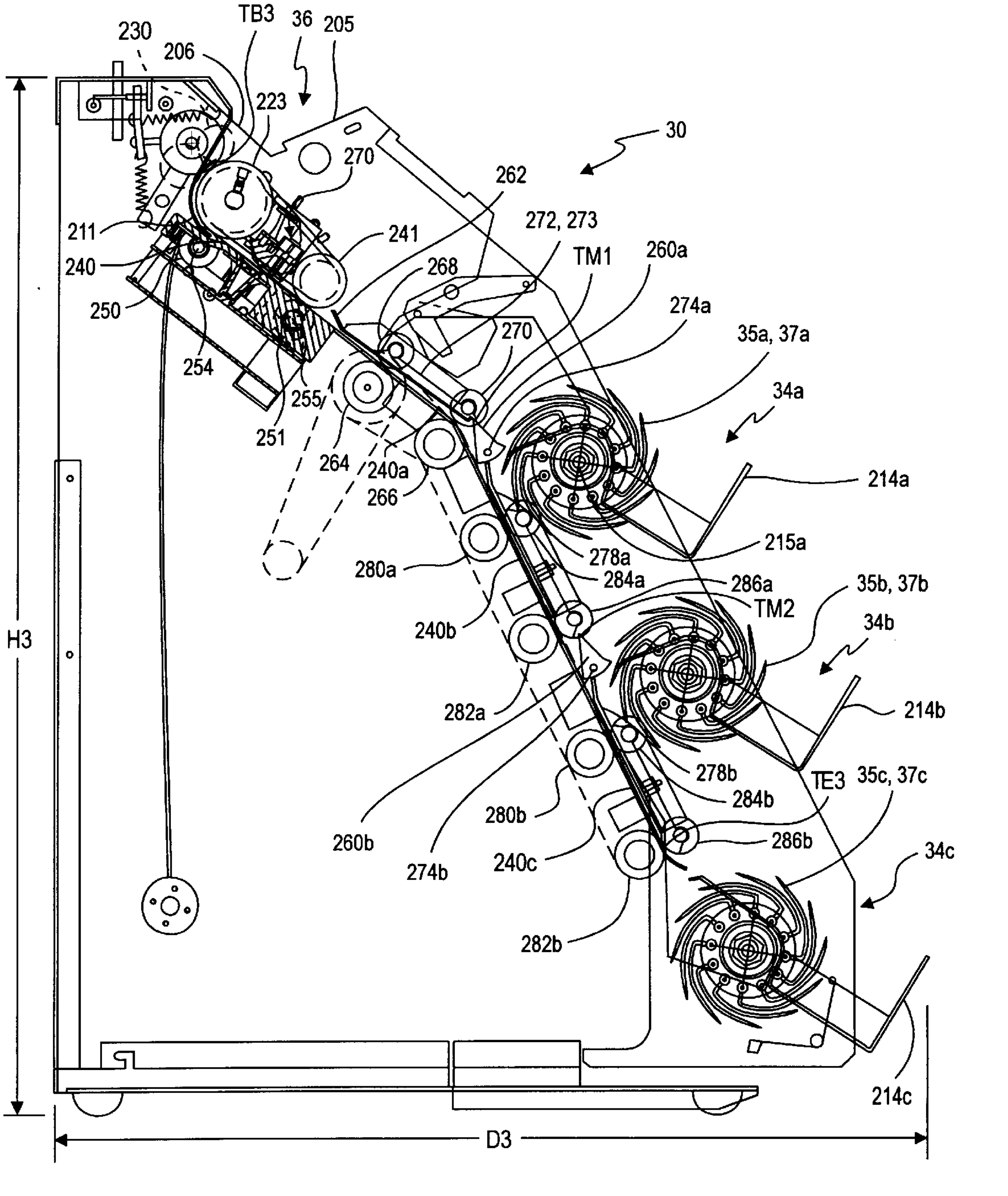
FIG. 4*a* is a sectional side view of a three-pocket currency handling system depicting various transport rolls in side elevation.
Figure 4B:
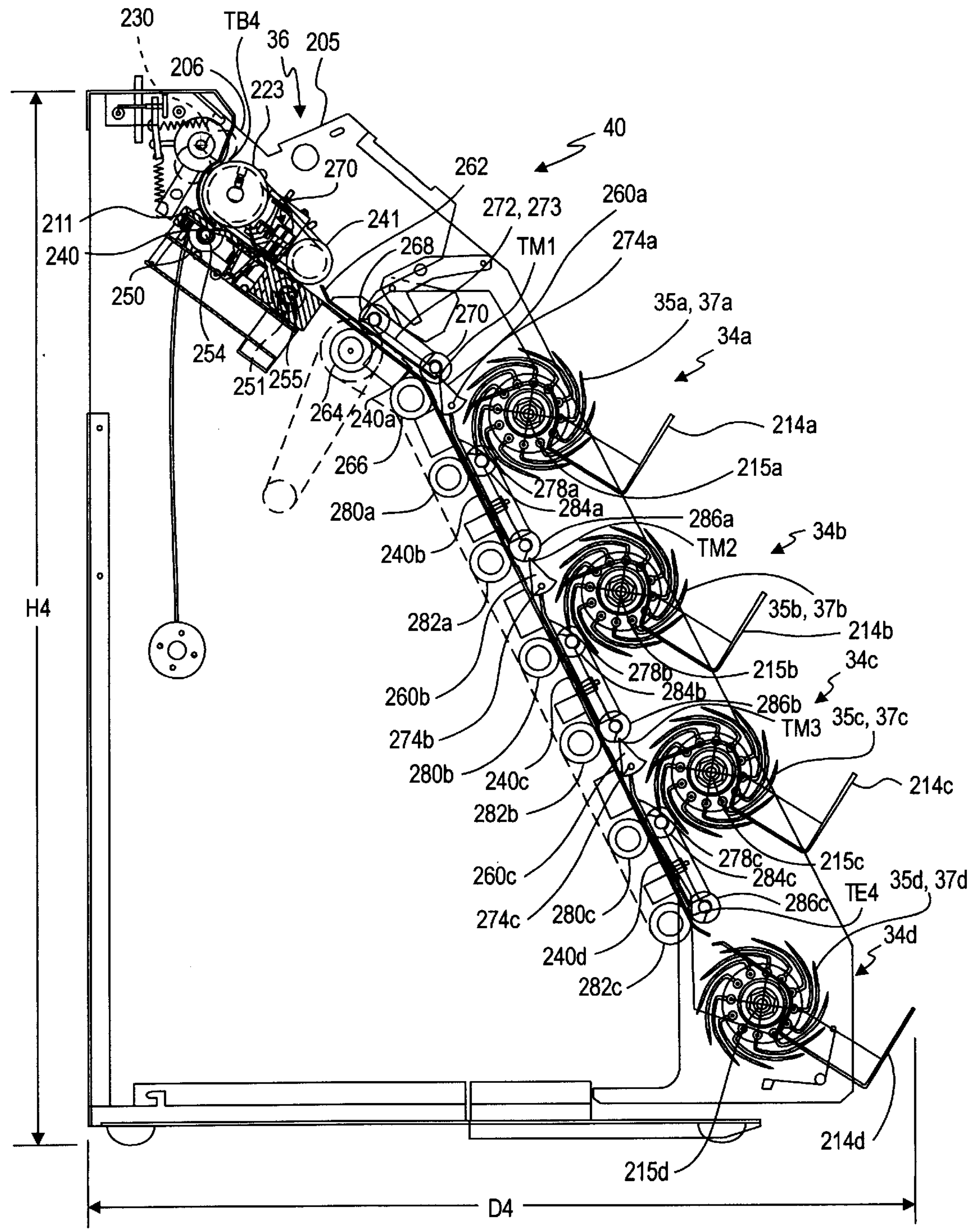
FIG. 4*b* is a sectional side view of a four-pocket currency handling system depicting various transport rolls in side elevation.
Figure 4C:
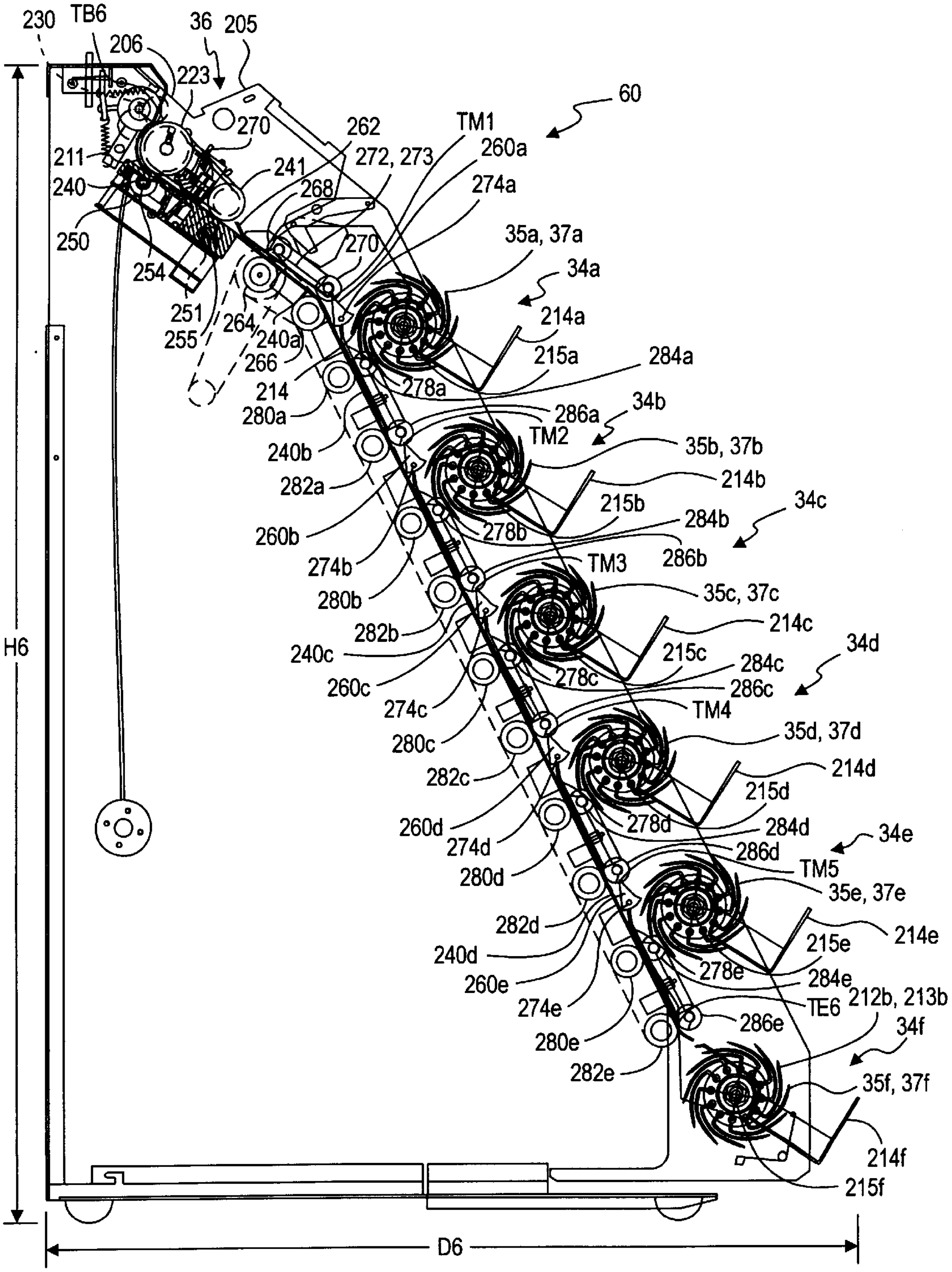
FIG. 4*c* is a sectional side view of a six-pocket currency handling system depicting various transport rolls in side elevation.

According to another embodiment, the small size housing 200 may have a height (H2) of about 20 inches or less, width (W2) of about 20 inches or less, and a depth (D2) of about 20 inches or less and weighs approximately 50 pounds or less. As best seen in FIG. 3b, the currency handling system 20 has a short transport path between the input receptacle and the output receptacle. The transport path has a length of about 10½ inches between the beginning of the transport path at point TB2 (where the idler roll 230 engages the drive roll 223) and the tip of the diverter 260 at point TM1 and has an overall length of about 15½ inches from point TB2 to point TE2 (where the rolls 286 and 282 contact). Similarly, the three-, four- and six-pocket systems 30, 40, 60 (FIGS. 4a–4c), in some embodiments, are constructed with generally the same footprint as the two pocket systems, allowing them to be rested upon a typical tabletop or countertop. Generally, however, where the three-, four- and six-pocket systems are constructed with the same footprint as the two-pocket system, they will be "taller" than the two-pocket system, with the relative heights of the respective systems corresponding generally to the number of pockets. Thus, in general, where the multi-pocket systems have approximately the same size footprint, the six-pocket system 60 (FIG. 4c) will be taller than the four-pocket system 40 (FIG. 4b), which in turn will be taller than the three-pocket system 30 (FIG. 4a) and the two-pocket system 20 (FIGS. 3a and 3b). As shown in FIGS. 4a–4c, the three, four and six pocket currency handling systems have the same width as the two pocket currency handling system shown in FIG. 3a, namely, about 13½ inches. The three pocket currency handling system 30 of FIG. 4a has a height H3 of about 23 inches and a depth D3 of about 19¾ inches. The transport path of the three-pocket system has a length of about 10½ inches between the beginning of the transport path at point TB3 (where the idler roll 230 engages the drive roll 223) and the tip of the diverter 260a at point TM1, a length of about 16½ inches between the beginning of the transport path at point TB3 and the tip of the diverter 260b at point TM2, and has an overall length of about 21¼ inches from point TB3 to point TE3 (where the rolls 286b and 282b contact).

According to another embodiment, the three pocket currency handling system has a height H3 ranging from 20–25 inches and a depth D3 ranging from 15–25 inches. The transport path of the three-pocket system has a length ranging from 8–12 inches between the beginning of the transport path at point TB3 (where the idler roll 230 engages the drive roll 223) and the tip of the diverter 260a at point TM1, a length ranging from 12–18 inches between the beginning of the transport path at point TB3 and the tip of the diverter 260b at point TM2, and has an overall length ranging from 18–25 inches from point TB3 to point TE3 (where the rolls 286b and 282b contact).

The four pocket currency handling system 40 of FIG. 4b has a height H4 of about 28½ inches and a depth D4 of about 22¼ inches. The transport path of the four-pocket system has a length of about 10½ inches between the beginning of the transport path at point TB4 (where the idler roll 230 engages the drive roll 223) and the tip of the diverter 260a at point TM1, a length of about 16½ inches between the beginning of the transport path at point TB4 and the tip of the diverter 260b at point TM2, a length of about 22½ inches between the beginning of the transport path at point TB4 and the tip of the diverter 260c at point TM3, and an overall length of 27.193 inches from point TB4 to point TE4 (where the rolls 286c and 282c contact).

In another embodiment, the four pocket currency handling system has a height H4 ranging from 25–30 inches and a depth D4 ranging from 20–25 inches. The transport path of the four-pocket system has a length ranging from 8–12 inches between the beginning of the transport path at point TB4 (where the idler roll 230 engages the drive roll 223) and the tip of the diverter 260a at point TM1, a length ranging from 12–20 inches between the beginning of the transport path at point TB4 and the tip of the diverter 260b at point TM2, a length ranging from 18–26 inches between the beginning of the transport path at point TB4 and the tip of the diverter 260c at point TM3, and an overall length ranging from 22–32 inches from point TB4 to point TE4 (where the rolls 286c and 282c contact).

The six pocket currency handling system 60 of FIG. 4c has a height H6 of about 39¼ inches and a depth D6 of about 27¼ inches. The transport path of the six-pocket system has a length of about 10½ inches between the beginning of the transport path at point TB6 (where the idler roll 230 engages the drive roll 223) and the tip of the diverter 260a at point TM1, a length of about 16½ inches between the beginning of the transport path at point TB6 and the tip of the diverter 260b at point TM2, a length of about 22½ inches between the beginning of the transport path at point TB6 and the tip of the diverter 260*c* at point TM3, a length of about 28¼ inches between the beginning of the transport path at point TB6 and the tip of the diverter 260*d* at point TM4, a length of about 34 inches between the beginning of the transport path at point TB6 and the tip of the diverter 260*e* at point TM5, and an overall length of about 39 inches from point TB6 to point TE6 (where the rolls 286*e* and 282*e* contact).

In another embodiment, the six pocket currency handling system has a height H6 ranging from 35–45 inches and a depth D6 ranging from 22–32 inches. The transport path of the six-pocket system has a length ranging from 8–12 inches between the beginning of the transport path at point TB6 (where the idler roll 230 engages the drive roll 223) and the tip of the diverter 260*a* at point TM1, a length ranging from 12–20 inches between the beginning of the transport path at point TB6 and the tip of the diverter 260*b* at point TM2, a length ranging from 18–26 inches between the beginning of the transport path at point TB6 and the tip of the diverter 260*c* at point TM3, a length ranging from 22–32 inches between the beginning of the transport path at point TB6 and the tip of the diverter 260*d* at point TM4, a length ranging from 30–40 inches between the beginning of the transport path at point TB6 and the tip of the diverter 260*e* at point TM5, and an overall length ranging from 32–42 inches from point TB6 to point TE6 (where the rolls 286*e* and 282*e* contact).

Referring now to FIGS. 3*a*, 3*b*, 4*a*, 4*b* and 4*c*, parts and components similar to those in the embodiment of FIGS. 2*a*–2*d* are designated by similar reference numerals.

For example, parts designated by 100 series reference numerals in FIGS. 2*a*–2*d* are designated by similar 200 series reference numerals in FIGS. 3*a*–3*b* and 4*a*–4*c*, while parts which we duplicated one or more times, are designated by like reference numerals with suffixes a, b, c, etc. The mechanical portions of the multi-pocket currency handling systems include a housing 200 having the input receptacle 36 for receiving a stack of bills to be processed. The receptacle 36 is formed by downwardly sloping and converging walls 205 and 206 (see FIG. 3*b*) formed by a pair of removable covers (not shown) which snap onto a frame. The converging wall 206 supports a removable hopper (not shown) that includes vertically disposed side walls (not shown). One embodiment of an input receptacle was described and illustrated in detail above and applies to the multi-pocket currency handling systems 20, 30, 40, 60. The multi-pocket currency handling systems 20, 30, 40, 60 also include an operator interface 32*b* as described for the single pocket currency handling device 10.

From the input receptacle 36, the currency bills in each of the multi-pocket systems (FIGS. 3*a*–3*b*, 4*a*–4*c*) are moved in seriatim from the bottom of a stack of bills along a curved guideway 211, which receives bills moving downwardly and rearwardly and changes the direction of travel to a forward direction. The curvature of the guideway 211 corresponds substantially to the curved periphery of a drive roll 223 so as to form a narrow passageway for the bills along the rear side of the drive roll 223. An exit end of the curved guideway 211 directs the bills onto the transport plate 240 which carries the bills through an evaluation section and to one of the output receptacles 34.

In the two-pocket embodiment (FIG. 3*b*), for example, stacking of the bills is accomplished by a pair of driven stacking wheels 35*a* and 37*a* for the first or upper output receptacle 34*a* and by a pair of stacking wheels 35*b* and 37*b* for the second or bottom output receptacle 34*b*. The stacker wheels 35*a*, 37*a* and 35*b*, 37*b* are supported for rotational movement about respective shafts 215*a*, b journalled on a rigid frame and driven by a motor (not shown). Flexible blades of the stacker wheels 35*a* and 37*a* deliver the bills onto a forward end of a stacker plate 214*a*. Similarly, the flexible blades of the stacker wheels 35*b* and 37*b* deliver the bills onto a forward end of a stacker plate 214*b*. A diverter 260 directs the bills to either the first or second output receptacle 34*a*, 34*b*. When the diverter is in a lower position, bills are directed to the first output receptacle 34*a*. When the diverter 260 is in an upper position, bills proceed in the direction of the second output receptacle 34*b*.

The multi-pocket document evaluation devices in FIGS. 4*a*–4*c* have a transport mechanism which includes a series of transport plates or guide plates 240 for guiding currency bills to one of a plurality of output receptacles 214. The transport plates 240 according to one embodiment are substantially flat and linear without any protruding features. Before reaching the output receptacles 214, a bill is moved past the sensors or scanhead to be, for example, evaluated, analyzed, authenticated, discriminated, counted and/or otherwise processed.

The multi-pocket document evaluation devices move the currency bills in seriatim from the bottom of a stack of bills along the curved guideway 211 which receives bills moving downwardly and rearwardly and changes the direction of travel to a forward direction. An exit end of the curved guideway 211 directs the bills onto the transport plate 240 which carries the bills through an evaluation section and to one of the output receptacles 214. A plurality of diverters 260 direct the bills to the output receptacles 214. When a diverter 260 is in its lower position, bills are directed to the corresponding output receptacle 214. When a diverter 260 is in its upper position, bills proceed in the direction of the remaining output receptacles.

The multi-pocket currency evaluation devices of FIGS. 3*a*–3*b* and 4*a*–4*c* according to one embodiment includes passive rolls 250, 251 which are mounted to shafts 254, 255 on an underside of the first transport plate 240 and are biased into counter-rotating contact with their corresponding driven upper rolls 223 and 241. These embodiments include one or more follower plates 262, 278, etc. which are substantially free from surface features and are substantially smooth like the transport plates 240. The follower plates 262 and 278 are positioned in spaced relation to respective transport plates 240 so as to define a currency pathway therebetween. In one embodiment, follower plates 262 and 278 have apertures only where necessary for accommodation of passive rolls 268, 270, 284, and 286.

The follower plate 262 works in conjunction with the upper portion of the associated transport plate 240 to guide a bill from the passive roll 251 to a driven roll 264 and then to a driven roll 266. The passive rolls 268, 270 are biased by H-springs into counter-rotating contact with the corresponding driven rolls 264 and 266.

It will be appreciated that any of the stacker arrangements heretofore described may be utilized to receive currency bills, after they have been evaluated by the system. Without departing from the invention, however, bills transported through the system in learn mode, rather than being transported from the input receptacle to the output receptacle(s), could be transported from the input receptacle past the sensors, then in reverse manner delivered back to the input receptacle.

I. Scanning Region

Figure 5A:
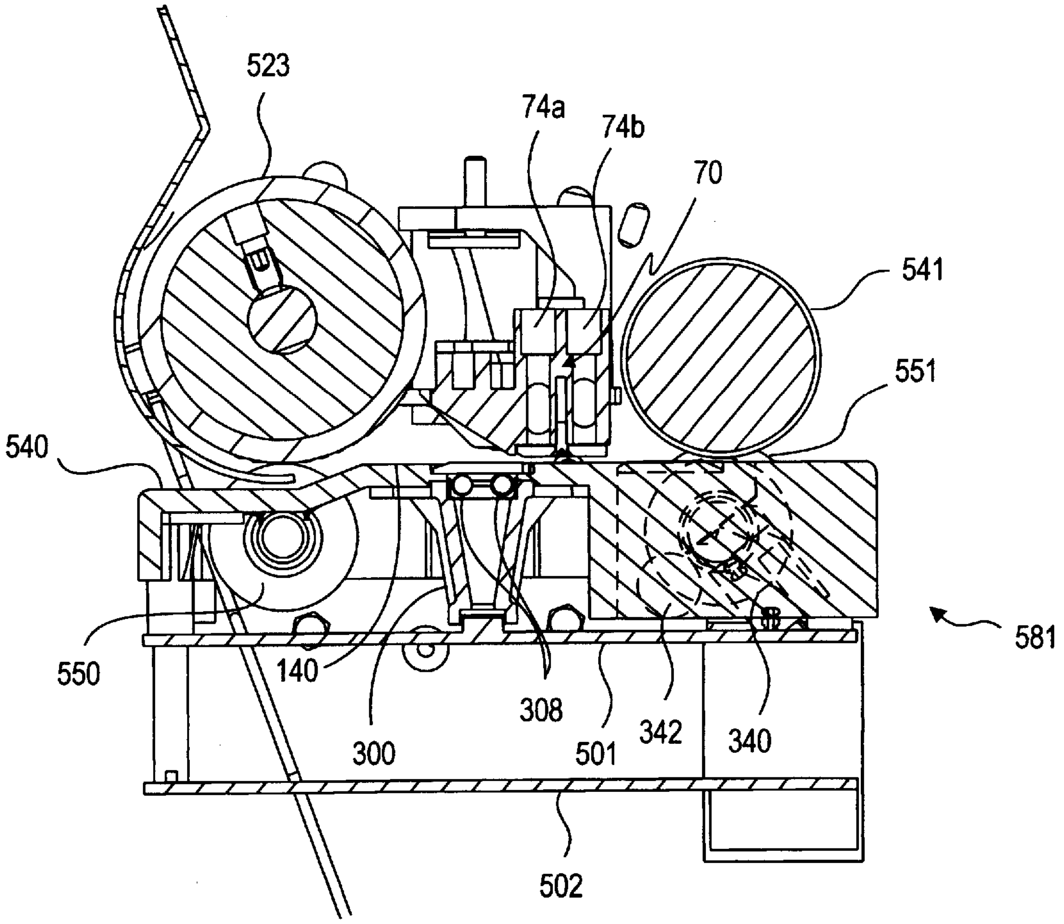
FIG. 5*a* is an enlarged sectional side view depicting the scanning region according to one embodiment of the present invention.

FIG. 5*a* is an enlarged sectional side view depicting the scanning region according to one embodiment of the present invention. According to various embodiments, this scanhead arrangement is employed in the currency handling systems described above in connection with FIGS. 1–4*c*. According to the depicted embodiment, the scanning region along the transport path comprises both a standard optical scanhead 70 and a full color scanhead 300. Driven transport rolls 523 and 541 in cooperation with passive rolls 550 and 551 engage and transport bills past the scanning region in a controlled manner. The transport mechanics are described in more detail in U.S. Pat. No. 5,687,963. The standard scanhead 70 differs somewhat in its physical appearance from that described in U.S. Pat. No. 5,687,963 mentioned above and incorporated herein by reference in its entirety but otherwise is identical in terms of operation and function. The upper standard scanhead 70 is used to scan one side of bills while the lower full color scanhead 300 is used to scan the other side of bills. These scanheads are coupled to processors. For example, the upper scanhead 70 is coupled to a 68HC16 processor by Motorola of Schaumburg, Ill. The lower full color scanhead 300 is coupled to a TMS 320C32 DSP processor by Texas Instruments of Dallas, Tex. According to one embodiment that will be described in more detail below, when processing U.S. bills, the upper scanhead 70 is used in the manner described in U.S. Pat. No. 5,687,963 while the full color scanhead 300 is used in a manner described later herein.

Figure 5B:
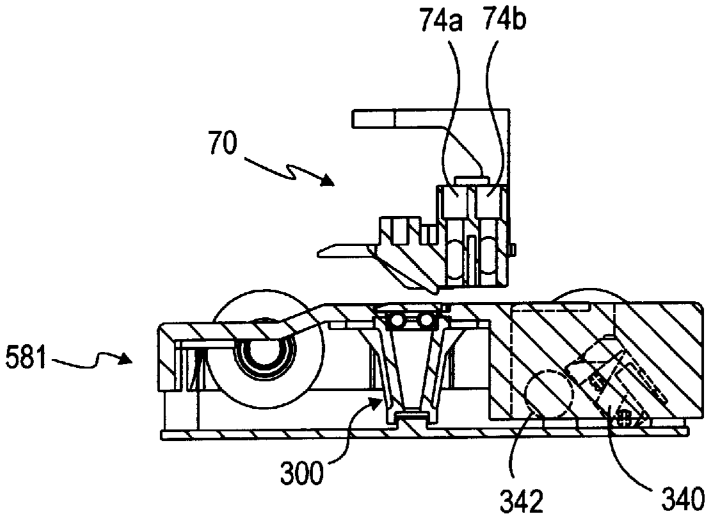
FIG. 5*b* is a sectional side view depicting the scanheads according to one embodiment of the present invention.
Figure 5C:
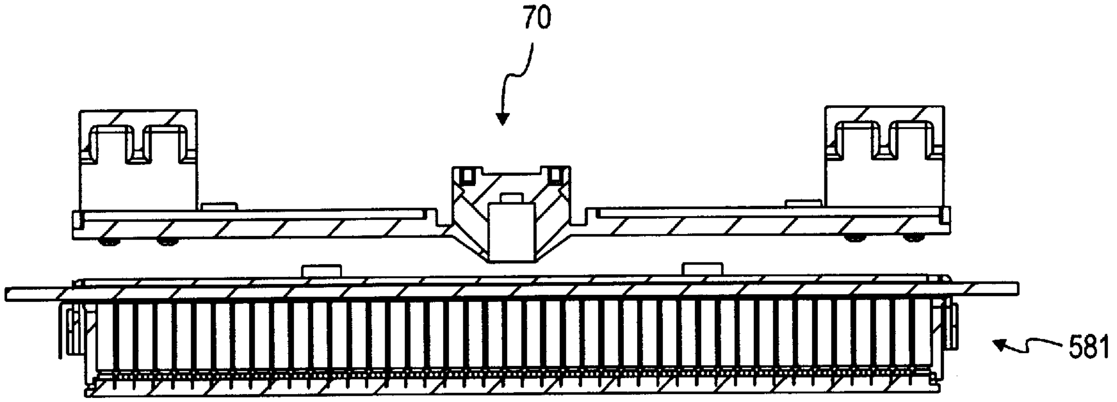
FIG. 5*c* is a front view depicting the scanheads of FIG. 5*b* according to one embodiment of the present invention.

FIG. 5*b* is an enlarged sectional side view depicting the scanheads of FIG. 5*a* without some of the rolls associated with the transport path. Again, depicted in this illustration, is the standard scanhead 70 and a color module 581 comprising the color scanhead 300 and an UV sensor 340 and its accompanying UV light tube 342. The details of how the UV sensor 340 operates are described in U.S. Pat. No. 5,640,463 and U.S. patent application Ser. No. 08/798,605 which are incorporated herein by reference in their entirety. FIG. 5*c* illustrates the scanheads of FIGS. 5*a* and 5*b* in a front view.

A. Standard Scanhead

Figure 15A:
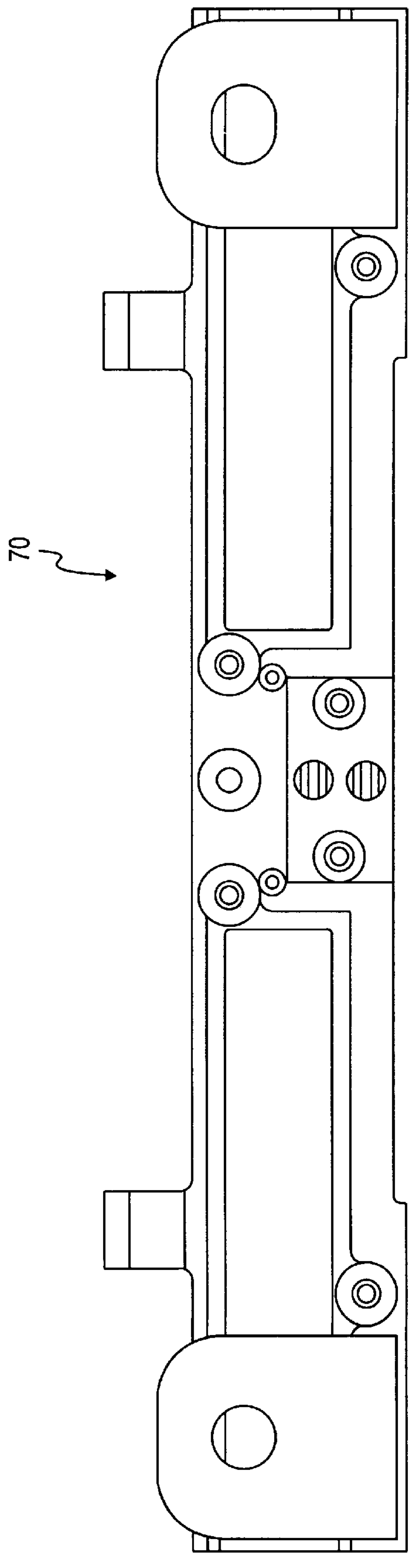
FIG. 15*a* is a top view of the standard scanhead of FIG. 5*a* (with size detector element)
Figure 15B:
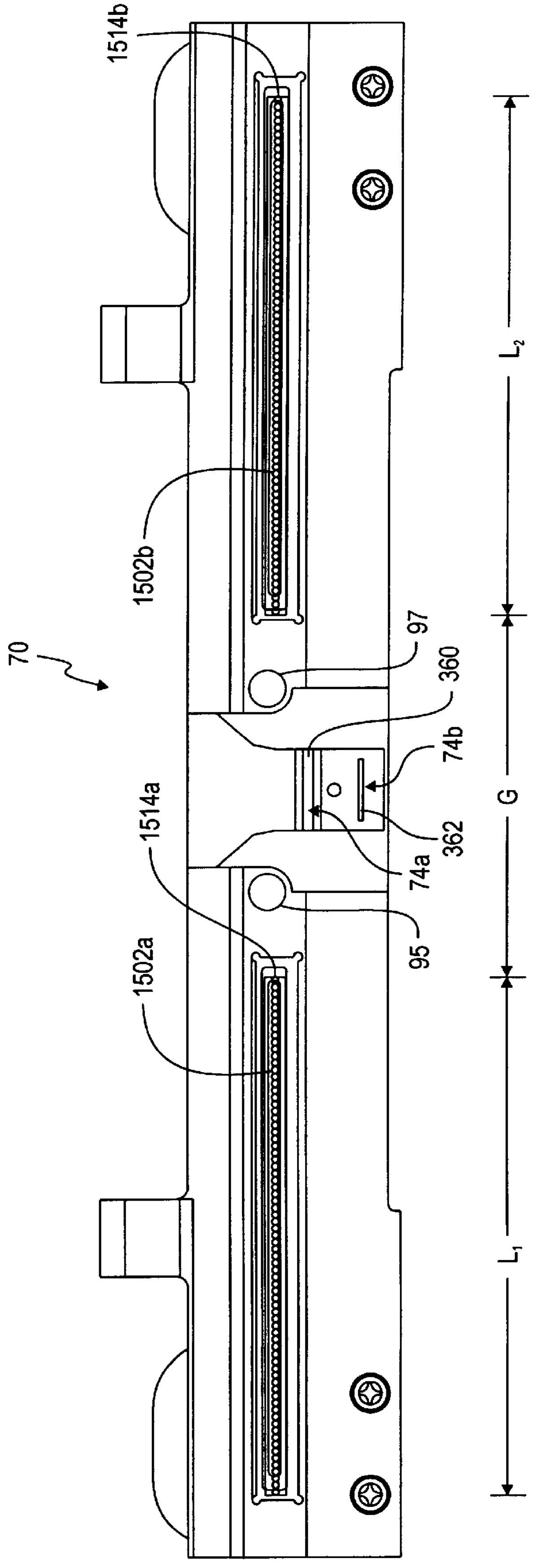
FIG. 15*b* is a bottom view of the standard scanhead of FIGS. 5*a* and 15*a* (with size detector element)

According to one embodiment, the standard scanhead 70 (also shown in FIGS. 15*a* and 15*b*) includes two standard photodetectors 74*a* and 74*b* (see FIGS. 5*a* and 5*b*) and two photodetectors 95 and 97 (the density sensors), illustrated in FIG. 15*b*. Two light sources are provided for the photodetectors as described in more detail in U.S. Pat. No. 5,295,196 incorporated herein by reference. The standard scanhead employs a mask having two rectangular slits 360 and 362 (see FIG. 15*b*) therein for permitting light reflected off passing bills to reach the photodetectors 74*a* and 74*b*, which are behind the slits 360, 362, respectively. One photodetector 74*b* is associated with a narrow slit 362 and may optionally be used to detect the fine borderline present on U.S. currency, when suitable cooperating circuits are provided. The other photodetector 74*a* associated with a wider slit 360 may be used to scan the bill and generate optical patterns used in the discrimination process.

Figure 8:
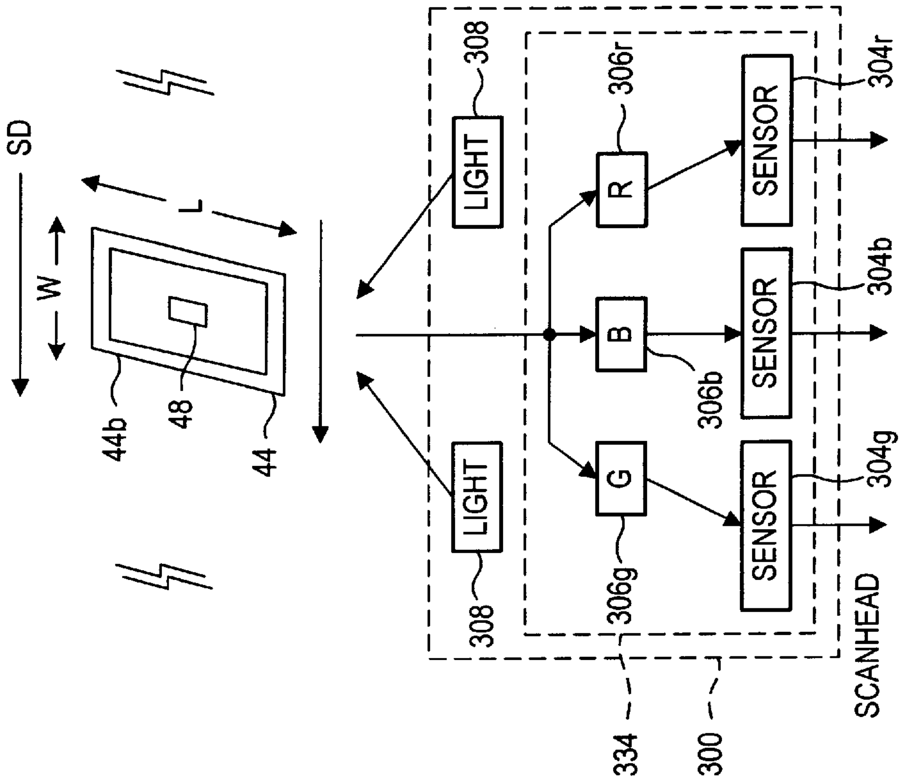
FIG. 8 is a functional block diagram of a full color scanhead.
Figure 7:
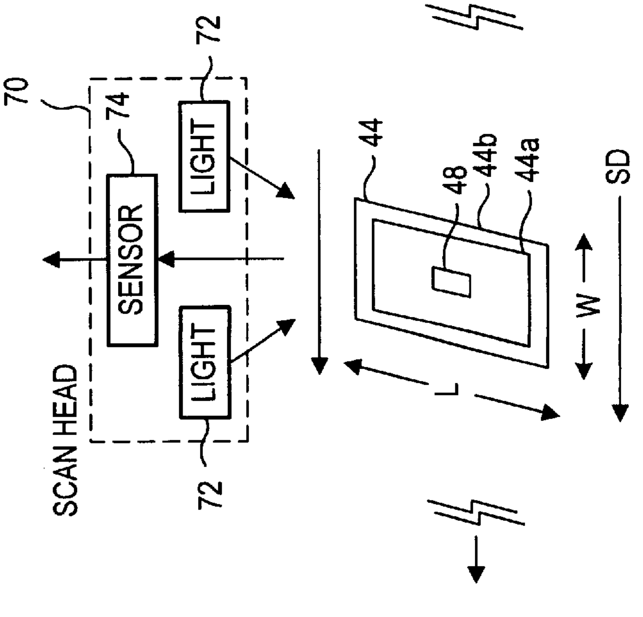
FIG. 7 is a functional block diagram of a standard optical scanhead.

FIG. 7 is a functional block diagram of the standard optical scanhead 70, and FIG. 8 is a functional block diagram of the full color scanhead 300 of FIG. 5. The standard scanhead 70 is an optical scanhead that scans for characteristic information from a currency bill 44. According to one embodiment, the standard optical scanhead 70 includes a sensor 74 having, for example, two photodetectors each having a pair of light sources 72 directing light onto the bill transport path so as to illuminate a substantially rectangular area 48 upon the surface of the currency bill 44 positioned on the transport path adjacent the scanhead 70. As illustrated in FIGS. 15*a,b,* one of the photodetectors 74*b* is associated with a narrow rectangular slit 362 and the other photodetector 74*a* is associated with a wider rectangular slit 360. Light reflected off the illuminated area 48 is sensed by the sensor 74 positioned between the two light sources 72. The analog output of the photodetectors 74 is converted into a digital signal by means of the analog-to-digital (ADC) converter unit 52 (FIG. 20) whose output is fed as a digital input to the central processing unit (CPU) 54 as described above in connection with FIG. 1. Alternatively, especially in embodiments of currency handling system designed to process currency other than U.S. currency, a single photodetector 74*a* having the wider slit 360 may be employed without photodetector 74*b*.

Figure 9A:
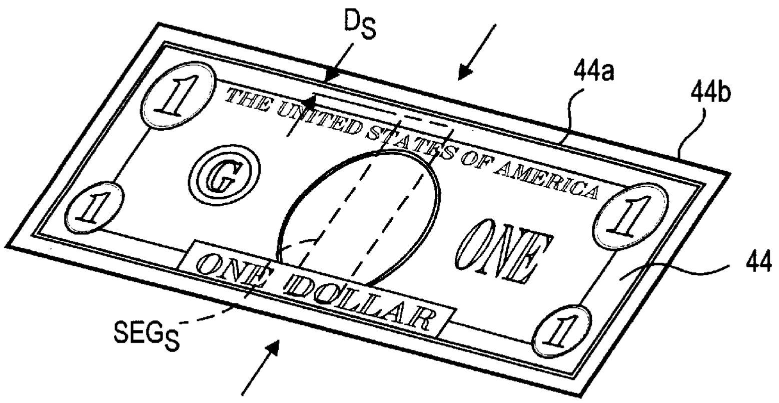
FIG. 9*a* is a perspective view of a U.S. currency bill and an area to be optically scanned on the bill.

According to one embodiment, the bill transport path is defined in such a way that the transport mechanism 38 (FIG. 1) moves currency bills with the narrow dimension of the bills being parallel to the transport path and the scan direction SD. As a bill 44 traverses the scanhead 70, the illuminated area 48 moves to define a coherent light strip which effectively scans the bill across the narrow dimension (W) of the bill. In the embodiment depicted, the transport path is so arranged that a currency bill 44 is scanned across a central section of the bill along its narrow dimension, as shown in FIG. 9*a*. The scanhead functions to detect light reflected from the bill 44 as the bill 44 moves past the scanhead 70 to provide an analog representation of the variation in reflected light, which, in turn, represents the variation in the dark and light content of the printed pattern or indicia on the surface of the bill 44. This variation in light reflected from the narrow dimension scanning of the bills serves as a measure for distinguishing, with a high degree of confidence, among a plurality of currency denominations which the system is programmed to handle. The standard optical scanhead 70 and standard intensity scanning process is described in detail in U.S. Pat. No. 5,687,963 entitled “Method and Apparatus for Discriminating and Counting Documents,” assigned to the assignee of the present invention and incorporated herein by reference in its entirety.

The standard optical scanhead 70 produces a series of such detected reflectance signals across the narrow dimension of the bill, or across a selected segment thereof, and the resulting analog signals are digitized under control of the PROCESSOR 54 to yield a fixed number of digital reflectance data samples. The data samples are then subjected to a normalizing routine for processing the sampled data for improved correlation and for smoothing out variations due to “contrast” fluctuations in the printed pattern existing on the bill surface. The normalized reflectance data represents a characteristic pattern that is unique for a given bill denomination and provides sufficient distinguishing features among characteristic patterns for different currency denominations.

In order to ensure strict correspondence between reflectance samples obtained by narrow dimension scanning of successive bills, the reflectance sampling process is preferably controlled through the PROCESSOR 54 (FIG. 1) by means of an optical encoder 14 (FIG. 1) which is linked to the bill transport mechanism 38 (FIG. 1) and precisely tracks the physical movement of the bill 44 past the scanhead 70. More specifically, the optical encoder 14 is linked to the rotary motion of the drive motor which generates the movement imparted to the bill along the transport path. In addition, the mechanics of the feed mechanism ensure that positive contact is maintained between the bill and the transport path, particularly when the bill is being scanned by the scanhead. Under these conditions, the optical encoder 14 is capable of precisely tracking the movement of the bill 44 relative to the portion of the bill 48 illuminated by the scanhead 70 by monitoring the rotary motion of the drive motor.

According to one embodiment, in the case of U.S. currency bills, the output of the sensor 74*a* is monitored by the PROCESSOR 54 to initially detect the presence of the bill adjacent the scanhead and, subsequently, to detect the starting point of the printed pattern on the bill, as represented by the borderline 44*a* which typically encloses the printed indicia on U.S. currency bills. Once the borderline 44*a* has been detected, the optical encoder 14 is used to control the timing and number of reflectance samples that are obtained from the output of the sensor 74*b* as the bill 44 moves across the scanhead 70.

According to another embodiment, in the case of currency bills other than U.S. currency bills, the outputs of the sensor 74 are monitored by the PROCESSOR 54 to initially detect the leading edge 44*b* of the bill 44 adjacent the scanhead. Because most currencies of currency systems other than the U.S. do not have the borderline 44*a*, the PROCESSOR 54 must detect the leading edge 44*b* for non U.S. currency bills. Once the leading edge 44*b* has been detected, the optical encoder 14 is used to control the timing and number of reflectance samples that are obtained from the outputs of the sensors 74 as the bill 44 moves across the scanhead 70.

The use of the optical encoder 14 for controlling the sampling process relative to the physical movement of a bill 44 across the scanhead 70 is also advantageous in that the encoder 14 can be used to provide a predetermined delay following detection of the borderline 44*a* or leading edge 44*b* prior to initiation of samples. The encoder delay can be adjusted in such a way that the bill 44 is scanned only across those segments which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill (see segment $SEG_S$ of FIG. 9*a*), provides sufficient data for distinguishing among the various U.S. currency denominations. Accordingly, the optical encoder 14 can be used to control the scanning process so that reflectance samples are taken for a set period of time and only after a certain period of time has elapsed after the borderline 44*a* is detected, thereby restricting the scanning to the desired central portion of the narrow dimension of the bill 48.

Figure 9B:
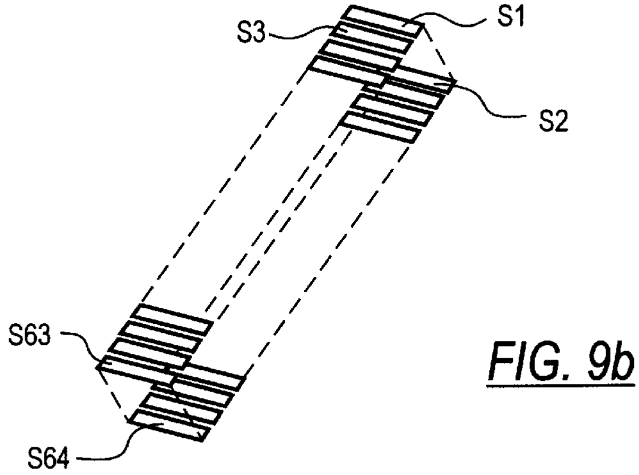
FIG. 9*b* is a diagrammatic perspective illustration of the successive areas scanned during the traversing movement of a single bill across an optical scanhead according to one embodiment of the present invention.
Figure 9C:
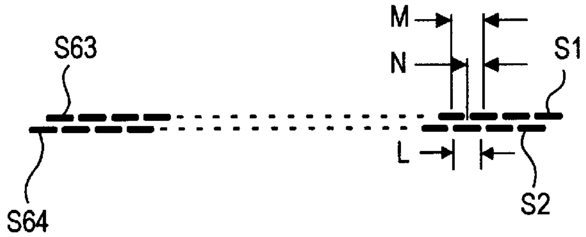
FIG. 9*c* is a diagrammatic side elevation view of the scan area to be optically scanned on a bill according to one embodiment of the present invention.

FIGS. 9*a*–9*c* illustrate the standard intensity scanning process for U.S. currency bills in more detail. Referring to FIG. 9*a*, as a bill 44 is advanced in a direction parallel to the narrow edges of the bill, scanning via a slit in the scanhead 70 is effected along a segment $SEG_s$ of the central portion of the bill 44. This segment $SEG_S$ begins a fixed distance $D_s$ inboard of the borderline 44*a*. As the bill 44 traverses the scanhead 70, a portion or area of the segment $SEG_S$ is illuminated, and the sensor 74 produces a continuous output signal which is proportional to the intensity of the light reflected from the illuminated portion or area at any given instant. This output is sampled at intervals controlled by the encoder, so that the sampling intervals are precisely synchronized with the movement of the bill across the scanhead.

As illustrated in FIGS. 9*b*–9*c*, it is preferred that the sampling intervals be selected so that the areas that are illuminated for successive samples overlap one another. The odd-numbered and even-numbered sample areas have been separated in FIGS. 9*b* and 9*c* to more clearly illustrate this overlap. For example, the first and second areas S1 and S2 overlap each other, the second and third areas S2 and S3 overlap each other, and so on. Each adjacent pair of areas overlap each other. In the illustrative example, this is accomplished by sampling areas that are 0.050 inch (0.127 cm) wide, L, at 0.029 inch (0.074 cm) intervals, along a segment $SEG_S$ that is 1.83 inch (4.65 cm) long (64 samples). The center-to-center distance N between two adjacent samples is 0.029 inches and the center-to-center distance M between two adjacent even or odd samples is 0.058 inches. Sampling is initiated at a distance $D_S$ of 0.389 inches inboard of the leading edge 44*b* of the bill.

Figure 9D:
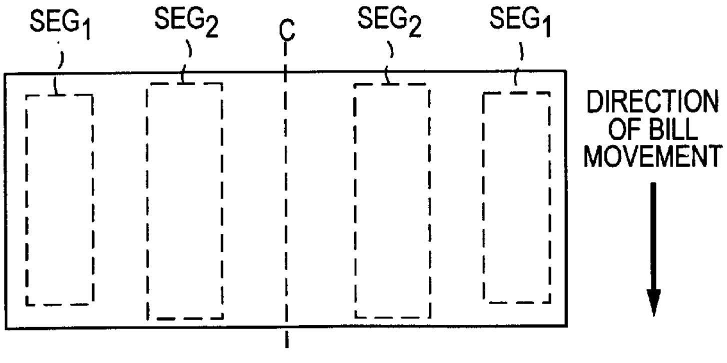
FIG. 9*d* is a top plan view of a bill indicating a plurality areas to be optically scanned on the bill.

While it has been determined that the scanning of the central area of a U.S. bill provides sufficiently distinct patterns to enable discrimination among the plurality of U.S. currency denominations, the central area or the central area alone may not be suitable for bills originating in other countries. For example, for bills originating from Country 1, it may be determined that segment $SEG_1$ (FIG. 9*d*) provides a more preferable area to be scanned, while segment $SEG_2$, (FIG. 9*d*) is more preferable for bills originating from Country 2. Alternatively, in order to sufficiently discriminate among a given set of bills, it may be necessary to scan bills which are potentially from such set along more than one segment, e.g., scanning a single bill along both $SEG_1$ and $SEG_2$. To accommodate scanning in areas other than the central portion of a bill, multiple standard optical scanheads may be positioned next to each other along a direction lateral to the direction of bill movement. Such an arrangement of standard optical scanheads permit a bill to be scanned along different segments. Various multiple scanhead arrangements are described in more detail in U.S. Pat. No. 5,652,802 entitled "Method and Apparatus for Document Identification" assigned to the assignee of the present application and incorporated herein by references in its entirety.

The standard optical sensing and correlation technique is based upon using the above process to generate a series of stored intensity signal patterns using genuine bills for each denomination of currency that the currency handling system 10 is programmed to recognize. According to one embodiment, four sets of master intensity signal samples are generated and stored within the memory 56 (see FIG. 1) for each scanhead for each detectable currency denomination. In the case of U.S. currency, the sets of master intensity signal samples for each bill are generated from standard optical scans, performed on one or both surfaces of the bill and taken along both the "forward" and "reverse" directions relative to the pattern printed on the bill.

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $10 bill in U.S. currency, two patterns may be stored for each of the "forward" and "reverse" directions, each pair of patterns for the same direction represent two scan areas that are slightly displaced from each other along the long dimension of the bill. Once the master patterns have been stored, the pattern generated by scanning a bill under test is compared by the PROCESSOR 54 with each of the master patterns of stored standard intensity signal samples to generate, for each comparison, a correlation number representing the extent of correlation, i.e., similarity between corresponding ones of the plurality of data samples, for the sets of data being compared.

When using the upper standard scanhead 70, the PROCESSOR 54 is programmed to identify the denomination of the scanned bill as the denomination that corresponds to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. Such methods are disclosed in U.S. Pat. Nos. 5,295,196 entitled "Method and Apparatus for Currency Discrimination and Counting" and U.S. Pat. No. 5,687,963 which are incorporated herein by reference in their entirety. If a "positive" call can not be made for a scanned bill, an error signal is generated.

When master characteristic patterns are being generated, the reflectance samples resulting from the scanning by scanhead 70 of one or more genuine bills for each denomination are loaded into corresponding designated sections within the memory 56. During currency discrimination, the reflectance values resulting from the scanning of a test bill are sequentially compared, under control of the correlation program stored within the memory 56, with the corresponding master characteristic patterns stored within the memory 56. A pattern averaging procedure for scanning bills and generating master characteristic patterns is described in U.S. Pat. No. 5,633,949 entitled "Method and Apparatus for Currency Discrimination," which is incorporated herein by reference in its entirety.

B. Full Color Scanhead

Returning to FIG. 8, there is shown a functional block diagram of one cell 334 of the color scanhead 300 according to one embodiment of the present invention. As will be described in more detail below, the color scanhead may comprise a plurality of such cells. The illustrative cell includes a pair of light sources 308 (e.g. fluorescent tubes) directing light onto the bill transport path. A single light source, e.g., single fluorescent tube or other light source, could be used without departing from the invention. The light sources 308 illuminate a substantially rectangular area 48 upon a currency bill 44 to be scanned. The cell comprises three filters 306 and three sensors 304. Light reflected off the illuminated area 48 passes through filters 306*r*, 306*b* and 306*g* positioned below the two light sources 308. Each of the filters 306*r*, 306*b* and 306*g* transmits a different component of the reflected light to corresponding sensors or photodiodes 304*r*, 304*b* and 304*g*, respectively.

In one embodiment, the filter 306*r* transmits only a red component of the reflected light, the filter 306*b* transmits only a blue component of the reflected light and the filter 306*g* transmits only a green component of the reflected light to the corresponding sensors 304*r*, 304*b* and 304*g*, respectively. The specific wavelength ranges transmitted by each filter beginning at 10% transmittance are:

Red 580 nm to 780 nm,

Blue 400 nm to 510 nm,

Green 480 nm to 580 nm.

The specific wavelength ranges transmitted by each filter beginning at 80% transmittance are:

Red 610 nm to 725 nm,

Blue 425 nm to 490 nm,

Green 525 nm to 575 nm.

Upon receiving their corresponding color components of the reflected light, the sensors 304*r*, 304*b* and 304*g* generate red, blue and green analog outputs, respectively, representing the variations in red, blue and green color content in the bill 44. These red, blue and green analog outputs of the sensors 304*r*, 304*b* and 304*g*, respectively, are amplified by the amplifier 58 (FIG. 1) and converted into a digital signal by the analog-to-digital converter (ADC) unit 52 whose output is fed as a digital input to the central processing unit (CPU) 54 as described above in conjunction with FIG. 1.

Similar to the operation of the standard optical scanhead 70 embodiment described above, the bill transport path is defined in such a way that the transport mechanism 38 moves currency bills with the narrow dimension of the bills being parallel to the transport path and the scan direction. The color scanhead 300 functions to detect light reflected from the bill as the bill moves past the color scanhead 300 to provide an analog representation of the color content in reflected light, which, in turn, represents the variation in the color content of the printed pattern or indicia on the surface of the bill. The sensors 304*r*, 304*b* and 304*g* generate the red, blue and green analog representations of the red, blue and green color content of the printed pattern on the bill. This color content in light reflected from the scanned portion of the bills serves as a measure for distinguishing among a plurality of currency types and denominations which the system is programmed to handle.

According to one embodiment, the outputs of an edge sensor (to be described below in connection with FIG. 13) and the green sensors 304*g* of one of the color cells are monitored by the PROCESSOR 54 to initially detect the presence of the bill 44 adjacent the color scanhead 300 and, subsequently, to detect the edge 44*b* of the bill. Once the edge 44*b* has been detected, the optical encoder 14 is used to control the timing and number of red, blue and green samples that are obtained from the outputs of the sensors 304*r*, 304*b* and 304*g* as the bill 44 moves past the color scanhead 300.

Figure 10A:
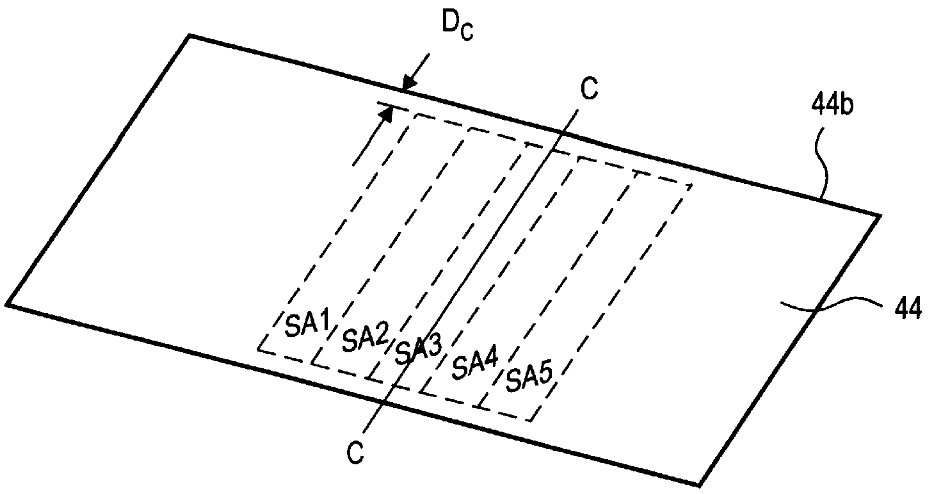
FIG. 10*a* is a perspective view of a bill and a plurality areas to be color scanned on the bill.
Figure 10B:
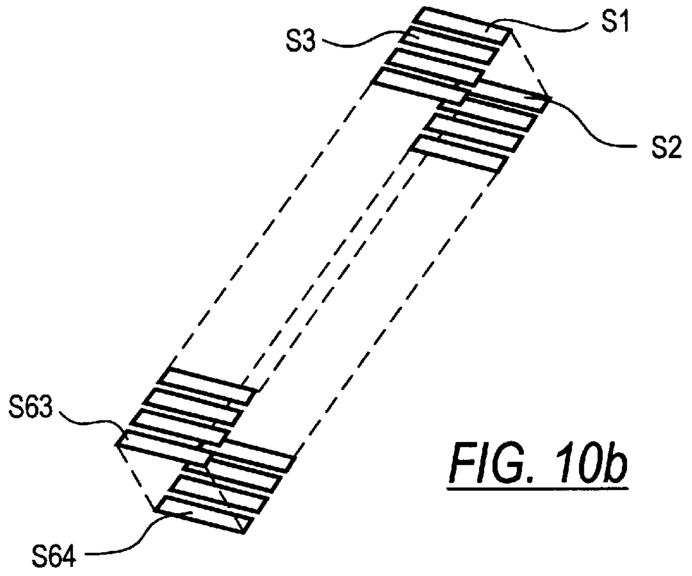
FIG. 10*b* is a diagrammatic perspective illustration of the successive areas scanned during the traversing movement of a single bill across a color scanhead according to one embodiment of the present invention.

In order to ensure strict correspondence between the red, blue and green signals obtained by narrow dimension scanning of successive bills, as illustrated in FIG. 10*b*, the color sampling process is preferably controlled through the PROCESSOR 54 by means of the optical encoder 14 (see FIG. 1) which is linked to the bill transport mechanism 38 and precisely tracks the physical movement of the bill 44 across the color scanhead 300. Bill tracking and control using the optical encoder 14 and the mechanics of the transport mechanism are accomplished as described above in connection with the standard scanhead. The use of the optical encoder 14 for controlling the sampling process relative to the physical movement of a bill 44 past the color scanhead 300 is also advantageous in that the encoder 14 can be used to provide a predetermined delay following detection of the bill edge 44*b* prior to initiation of samples. The encoder delay can be adjusted in such a way that the bill 44 is scanned only across those segments which contain the most distinguishable printed indicia relative to the different currency denominations.

Figure 10C:
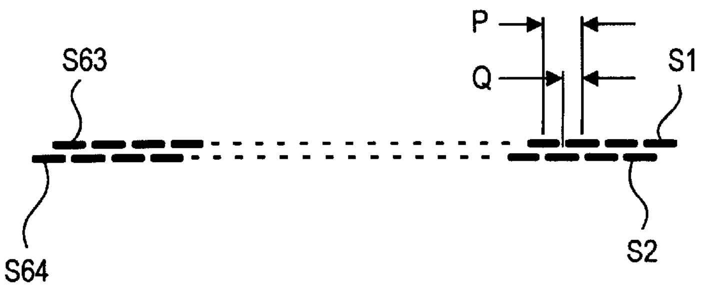
FIG. 10*c* is a diagrammatic side elevation view of the scan area to be color scanned on a bill according to one embodiment of the present invention.

FIGS. 10*a*–10*c* illustrate the color scanning process. Referring to FIG. 10*a*, as a bill 44 is advanced in a direction parallel to the narrow edges of the bill, five adjacent color cells 334 (e.g., cells 334*a*–334*e* of FIG. 13*b* to be described below) in the color scanhead 300 scan along scan areas, segments or strips SA1, SA2, SA3, SA4 and SA5, respectively, of a central portion of the bill 44. As the bill 44 traverses the color scanhead 300, each color cell 334 views its respective scan area, segment or strip SA1, SA2, SA3, SA4 and SA5, and its sensors 304*r*, 304*b* and 304*g* continuously produce red, blue and green output signals which are proportional to the red, blue and green color content of the light reflected from the illuminated area or strip at any given instant. These red, blue and green outputs are sampled at intervals controlled by the encoder 14, so that the sampling intervals are precisely synchronized with the movement of the bill 44 across the color scanhead 300. FIG. 10*b* illustrates how 64 incremental sample areas S1–S64 are sampled using 64 sampling intervals along one of the five color cell scan areas SA1, SA2, SA3, SA4 or SA5.

To account for the lateral shifting of bills in the transport path, it is preferred to store two or more patterns for each denomination of currency. The patterns represent scanned areas that are slightly displaced from each other along the lateral dimension of the bill.

In one embodiment, only three of the five color cells 334 (e.g., cells 334*a*, 334*c* and 334*e* of FIG. 13*b*) in the color scanhead 300 are used to scan U.S. currency. Thus, only the scan areas SA1, SA3 and SA5 of FIG. 10*a* are scanned.

As illustrated in FIGS. 10*b* and 10*c*, in similar fashion to the above-described operation in FIGS. 9*a*–9*b*, the sampling intervals arc preferably selected so that the successive samples overlap one another. The odd-number and even numbered sample areas have been separated in FIGS. 10*b* and 10*c* to more clearly illustrate this overlap. For example the first and second areas S1 and S2 overlap each other, the second and third areas overlap each other and so on. Each adjacent pair of areas overlap each other. For example, this is accomplished by sampling areas that are 0.050 inch (0.127 cm) wide, L, at 0.035 inch intervals, along a segment S that is 2.2 inches (5.59 cm) long to provide 64 samples across the bill. The center-to-center distance Q between two adjacent samples is 0.035 inches and the center-to-center distance P between two adjacent even or odd samples is 0.07 inches. Sampling is initiated at a distance $D_C$ of ¼ inch inboard of the leading edge 44*b* of the bill.

Figure 11:
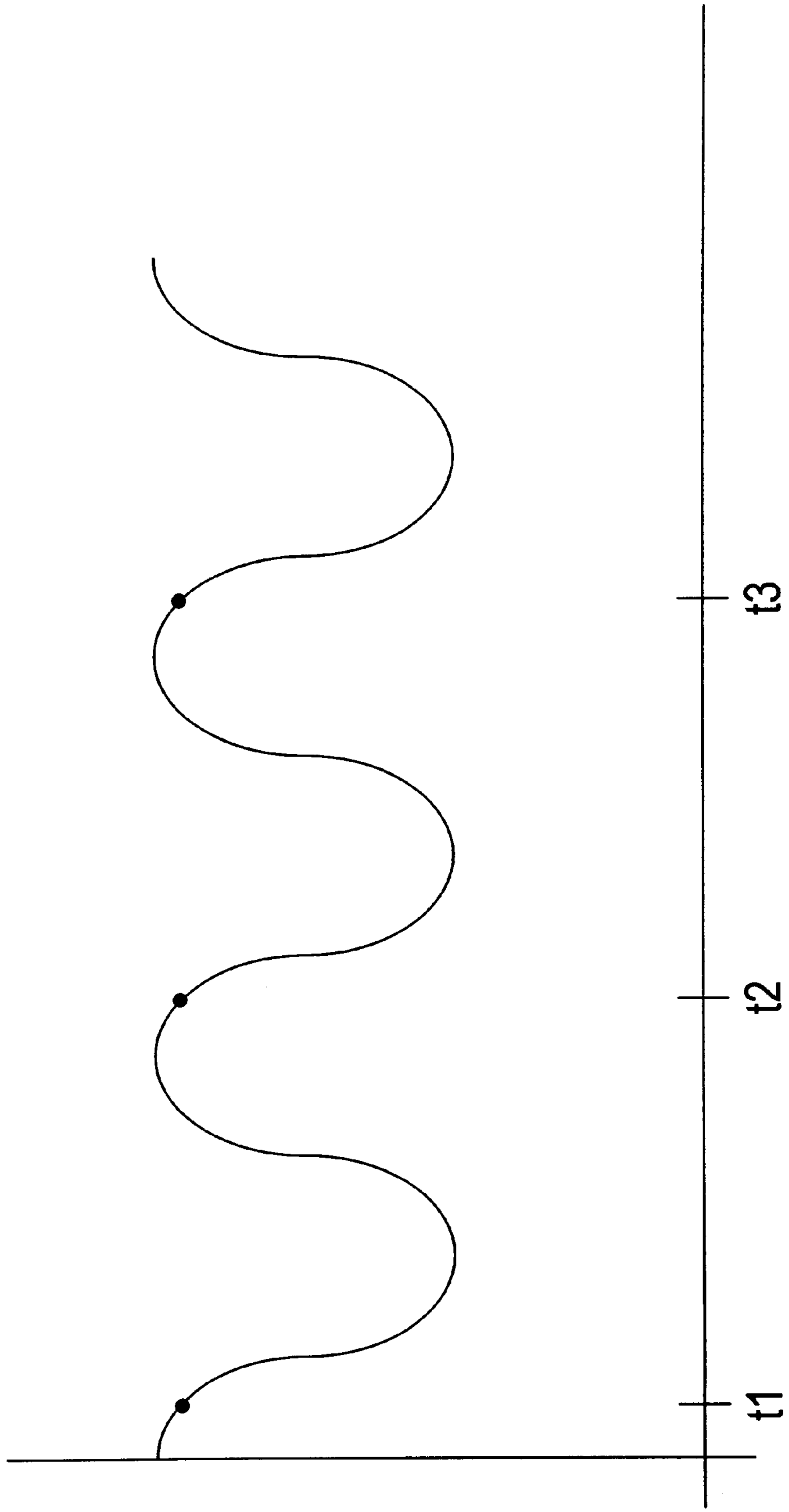
FIG. 11 is a timing diagram illustrating the operation of the sensors sampling data according to an embodiment of the present invention.

In one embodiment, the sampling is synchronized with the operating frequency of the fluorescent tubes employed as the light sources 308 of the color scanhead 300. According to one embodiment, fluorescent tubes manufactured by Stanley of Japan having a part number of CBY26-220NO are used. These fluorescent tubes operate at a frequency of 60 KHz, so the intensity of light generated by the tubes varies with time. To compensate for noise, the sampling of the sensors 304 is synchronized with the tubes' frequency. FIG. 11 illustrates the synchronization of the sampling with the operating frequency of the fluorescent tubes. The sampling by the sensors 304 is controlled so that the sensors 304 sample a bill at the same point during successive cycles, such as at times t1, t2, t3, and etc.

In a preferred embodiment, the color sensing and correlation technique is based upon using the above process to generate a series of stored hue and brightness signal patterns using genuine bills for each denomination of currency that the system is programmed to discriminate. The red, blue and green signals from each of the color cells 334 are first summed together to obtain a brightness signal. For example, if the red, blue and green sensors produced 2 v, 2 v, and 1 v respectively, the brightness signal would equal 5 v. If the total output from the sensors is 10 v when exposed to a white sheet of paper, then the brightness percentage corresponding to a 5 v brightness signal would be 50%. Using the red, blue and green signals, a red hue, a blue hue and a green hue can be determined. A hue signal indicates the percentage of total light that a particular color of light constitutes. For example, dividing the red signal by the sum of the red, blue and green signals provides the red hue signal, dividing the blue signal by the sum of the red, blue and green signals provides the blue hue signal, and dividing the green signal by the sum of the red, blue and green signals provides the green hue signal. In an alternative embodiment, the individual red, blue and green output signals may be used directly for a color pattern analysis.

Figure 12A:
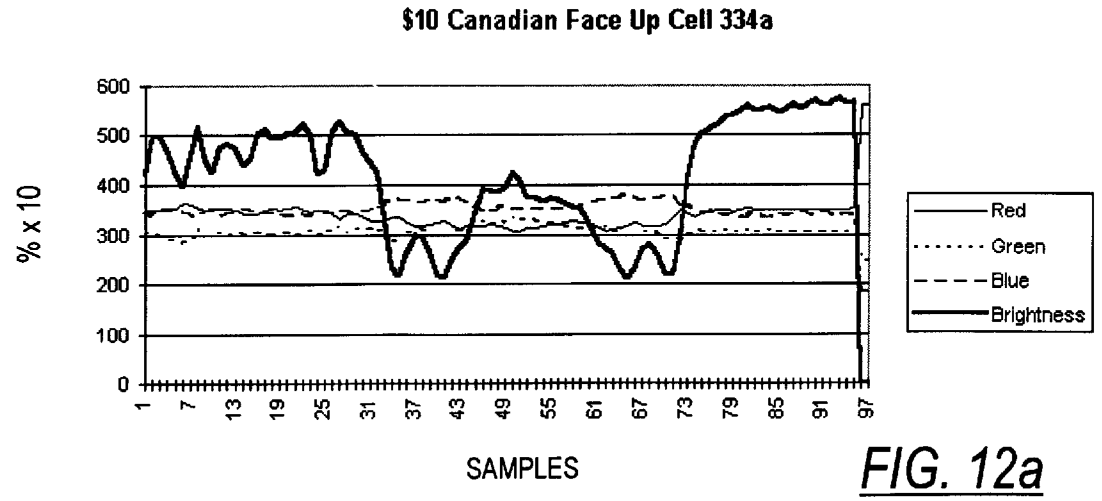
FIGS. 12*a*–12*e* are graphs of color information obtained by the color scanhead in FIG. 13.
Figure 12B:
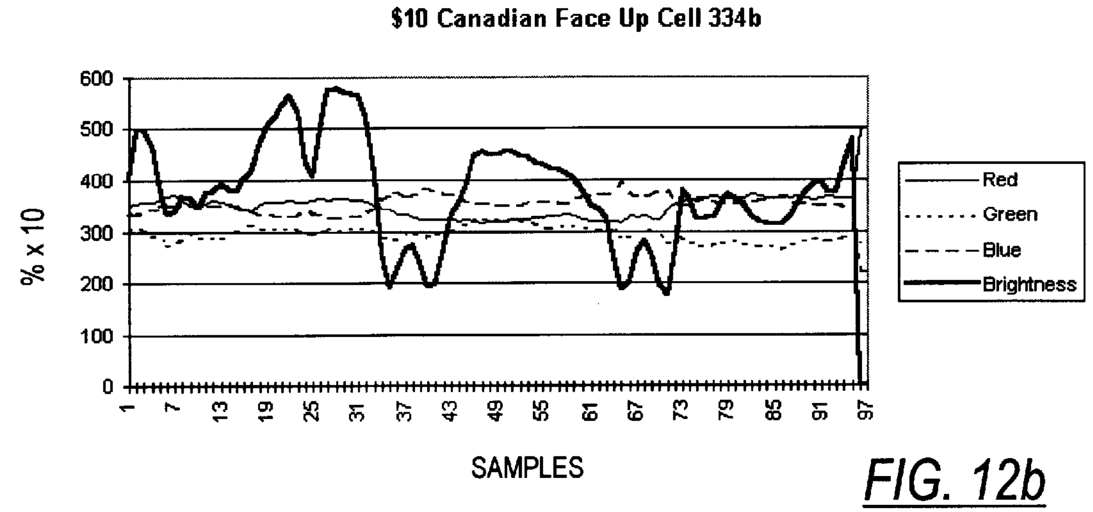
Figure 12C:
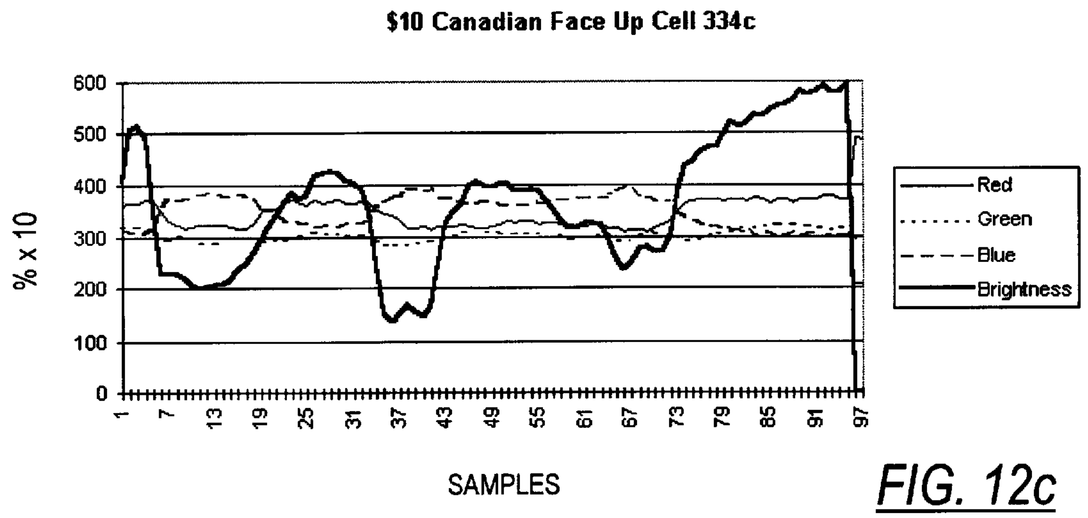
Figure 12D:
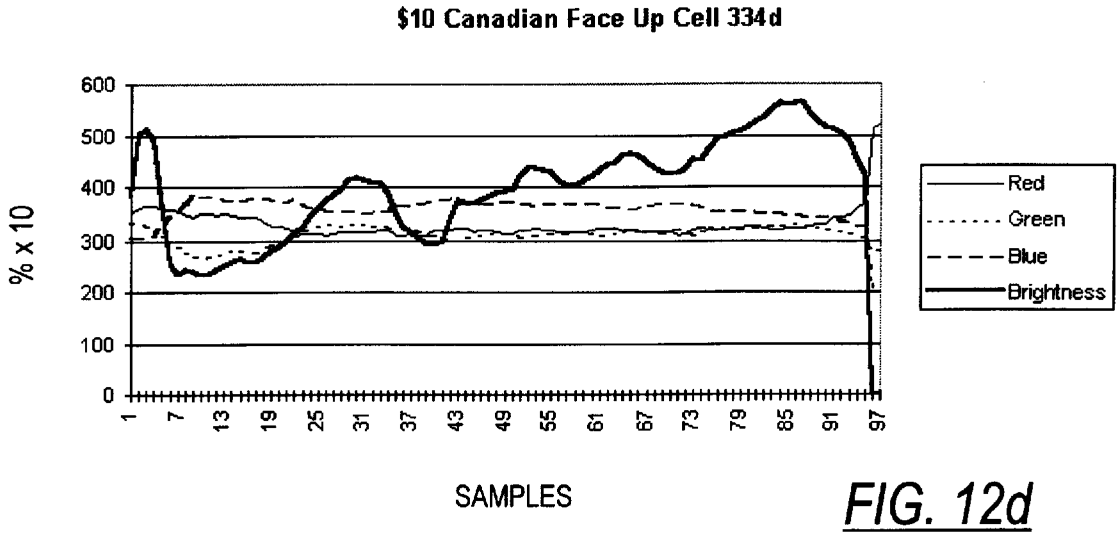
Figure 12E:
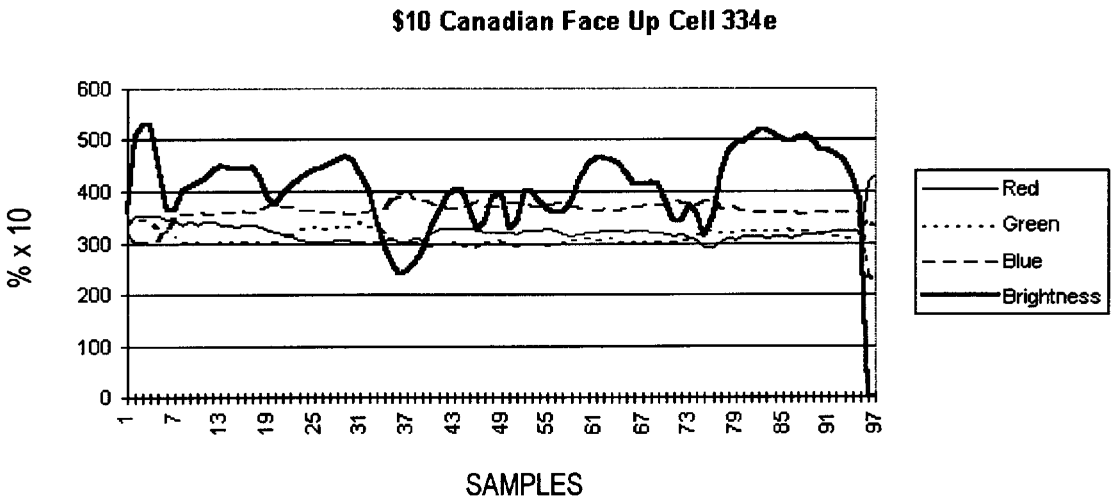

FIGS. 12*a*–*e* illustrate graphs of hue and brightness signal patterns obtained by color scanning a front side of a $10 Canadian bill with the color scanhead 300 of FIG. 13 (to be discussed below). FIG. 12*a* corresponds to the hues and brightness signal patterns generated from the color outputs of color cell 334*a*, FIG. 12*b* corresponds to outputs of color cell 334*b*, FIG. 12*c* corresponds to outputs of color cell 334*c*, FIG. 12*d* corresponds to outputs of color cell 334*d*, and FIG. 12*e* corresponds to outputs of color cell 334*e*. On the graphs, the y-axis is the percentage of brightness and the percentage of the three hues, on a scale of zero to one thousand, representing percent times 10 (%×10). The x-axis is the number of samples taken for each bill pattern. See the normalization and/or correlation discussion below.

According to one embodiment of the color sensing and correlation technique, four sets of master red hues, master green hues and master brightness signal samples are generated and stored within the memory 56 (see FIG. 1), for each programmed currency denomination, for each color sensing cell. The four sets of samples correspond to four possible bill orientations "forward," "reverse," "face up" and "face down." In the case of Canadian bills, the sets of master hue and brightness signal samples for each bill are generated from color scans, performed on the front (or portrait) side of the bill and taken along both the "forward" and "reverse" directions relative to the pattern printed on the bill. Alternatively, the color scanning may be performed on the back side of Canadian currency bills or on either surface of other bills. Additionally, the color scanning may be performed on both sides of a bill by a pair of color scanheads 300 such as a pair of scanheads 300 of FIG. 13 located on opposite sides of the transport plate 140.

In adapting this technique to Canadian currency, for example, master sets of stored hue and brightness signal samples are generated and stored for eight different denominations of Canadian bills, namely, $1, $2, $5, $10, $20, $50, $100 and $1,000. Thus, for each denomination, master patterns are stored for the red, green and brightness patterns for each of the four possible bill orientations (face up feet first, face up head first, face down feet first, face down head first) and for each of three different bill positions (right, center and left) in the transport path. This yields 36 patterns for each denomination. Accordingly, when processing the eight Canadian denominations, a set of 288 different master patterns are stored within the memory 56 for subsequent correlation purposes.

II. Brightness Normalizing Technique

A simple normalizing procedure is utilized for processing raw test brightness samples into a form which is conveniently and accurately compared to corresponding master brightness samples stored in an identical format in memory 56. More specifically, as a first step, the mean value $\overline{X}$ for the set of test brightness samples (containing "n" samples) is obtained for a bill scan as below:

$$\overline{X} = \sum_{i=0}^{n} \frac{X_i}{n} \qquad 1$$

Subsequently, a normalizing factor Sigma ("s") is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n} \qquad 2$$

In the final step, each raw brightness sample is normalized by obtaining the difference between the sample and the above-calculated mean value and dividing it by the square root of the normalizing factor s as defined by the following equation:

$$X_n = \frac{X_i - \overline{X}}{(\sigma)^{1/2}} \quad 3$$

III. Physical Embodiment of a Multi-cell Color Scanhead

A physical embodiment of a full color, multi-cell compatible scanhead will now be described in connection with FIGS. 13*a*–13*g*. The scanhead 300 includes a body 302 that has a plurality of filter and sensor receptacles 303 along its length as best seen in FIG. 13*b*. Each receptacle 303 is designed to receive a color filter 306 (which may be a clear piece of glass) and a sensor 304, one set of which is shown in an exploded view in FIG. 13*b* (also see in FIG. 13*f*). A filter 306 is positioned proximate a sensor 304 to transmit light of a given wavelength range of wavelengths to the sensor 304. As illustrated in FIG. 13*b*, one embodiment of the scanhead housing 302 can accommodate forty-three sensors 304 and forty-three filters 306.

A set of three filters 306 and three sensors 304 comprise a single color cell 334 on the scanhead 300. According to one embodiment, three adjacent receptacles 303 having three different primary color filters therein constitute one full color cell, e.g., 334*a*. However, as described elsewhere herein, only two color filters and sensors may be utilized, with the value of the third primary color content being derived by the processor. By primary colors it is meant colors from which all other colors may be generated, which includes both additive primary colors (red, green, and blue) and subtractive primary colors (magenta, yellow, and cyan). According to one embodiment, the three color filters 306 are standard red, green, and blue dichroic color separation glass filters. One side of each glass filter is coated with a standard hot mirror for infrared light blocking. According to one embodiment, each filter is either a red filter, part number 1930, a green filter, part number 1945, or a blue filter, part number 1940 available from Reynard Corporation of San Clemente, Calif. According to one embodiment, the sensors 304 are photodiodes, part number BPW-34, made by Centronics Corp. of Newbury Park, Calif. According to one embodiment, sensors that have a large sensor area are chosen. The sensors 304 provide the color analog output signals to perform the color scanning as described above. The color scanhead 300 is preferably positioned proximate the bill transport plate (see 140 in FIG. 2*b*, 240 in FIGS. 3*b*, 4*a*, 4*b* and 4*c* and 540 in FIG. 5*a*). The scanhead 300 further includes a reference sensor 350, described in more detail below in connection with section V. STANDARD MODE/LEARN MODE.

Figure 13A:
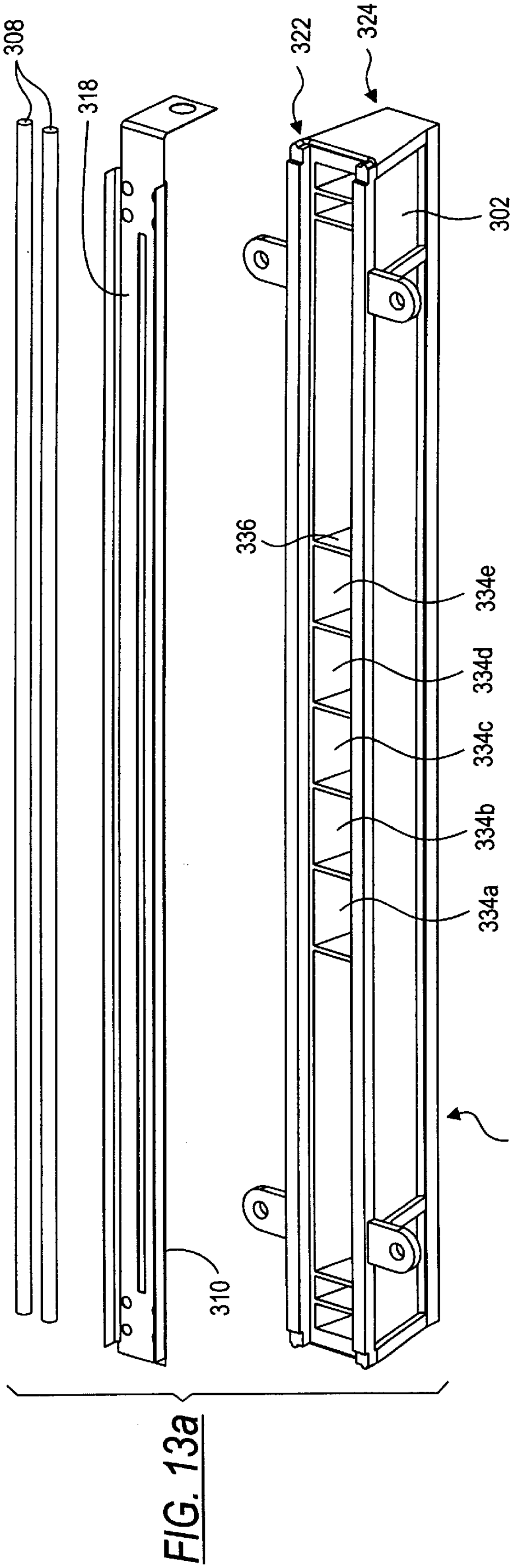
FIG. 13*a* is a top perspective view of one embodiment of a color scanhead for use in the currency handling systems of FIGS. 1–4.
Figure 13B:
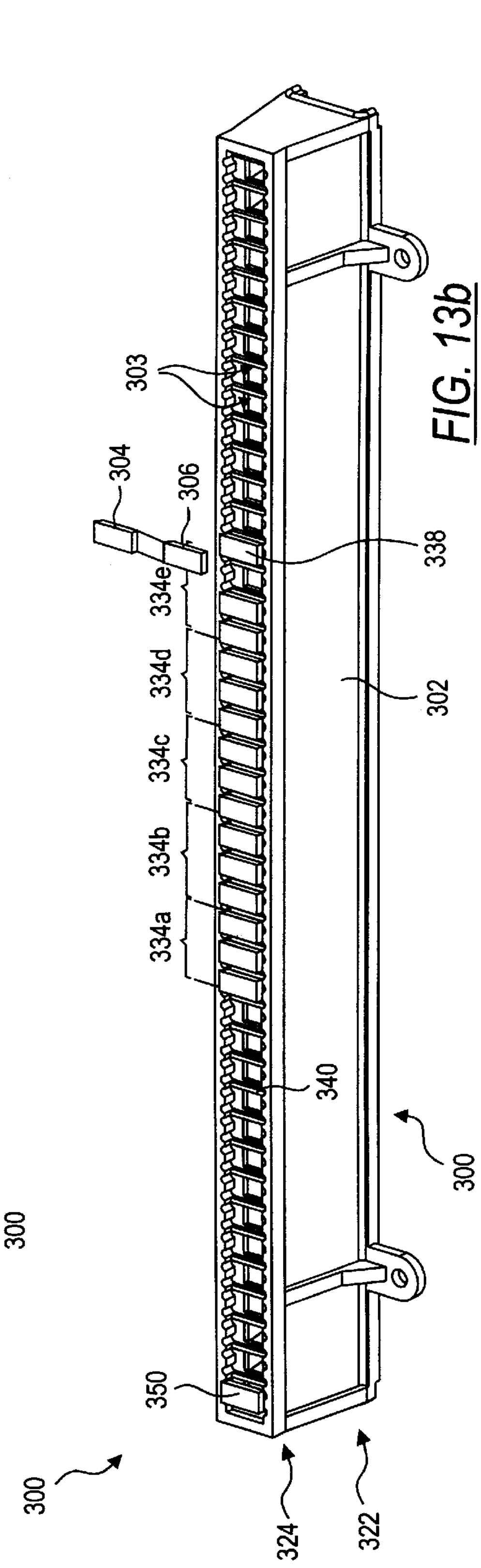
FIG. 13*b* is a bottom perspective view of the color scanhead of FIG. 13*a;*
Figure 13C:
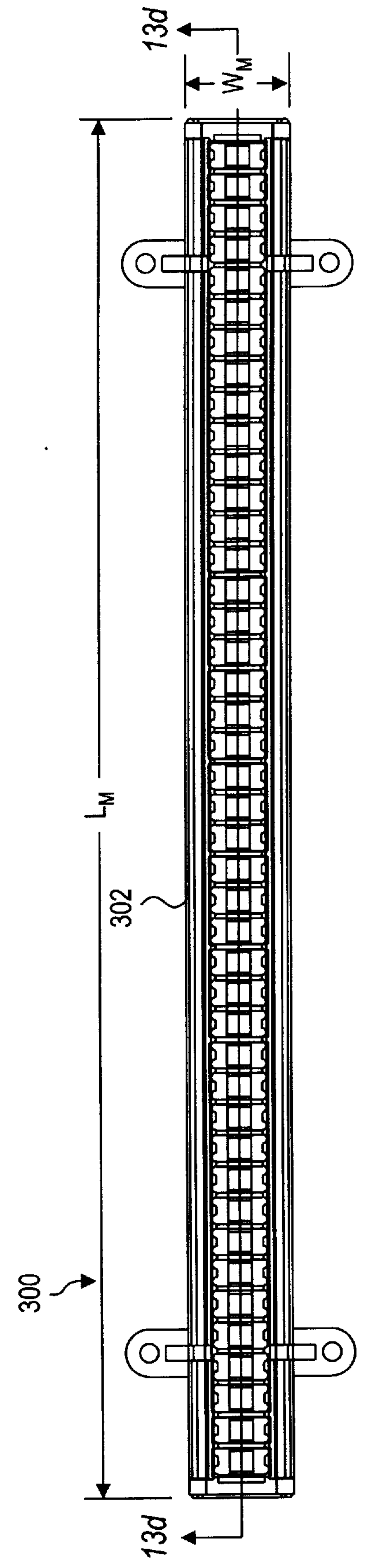
FIG. 13*c* is a bottom view of the color scanhead of FIG. 13*a;*
Figure 13D:
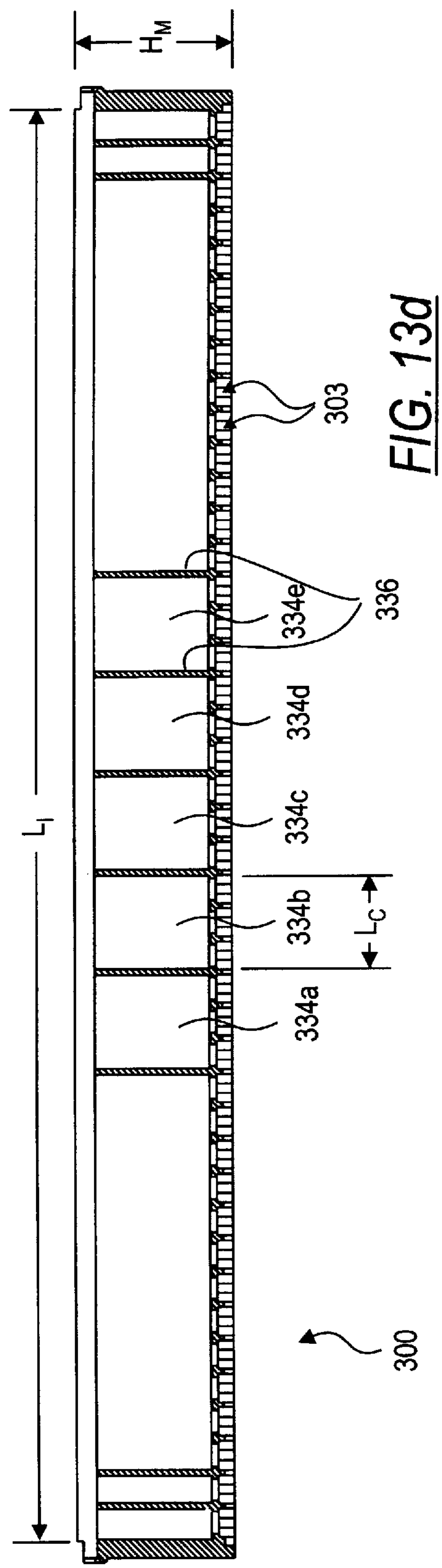
FIG. 13*d* is a sectional side view of the color scanhead of FIG. 13*c;*
Figure 13E:
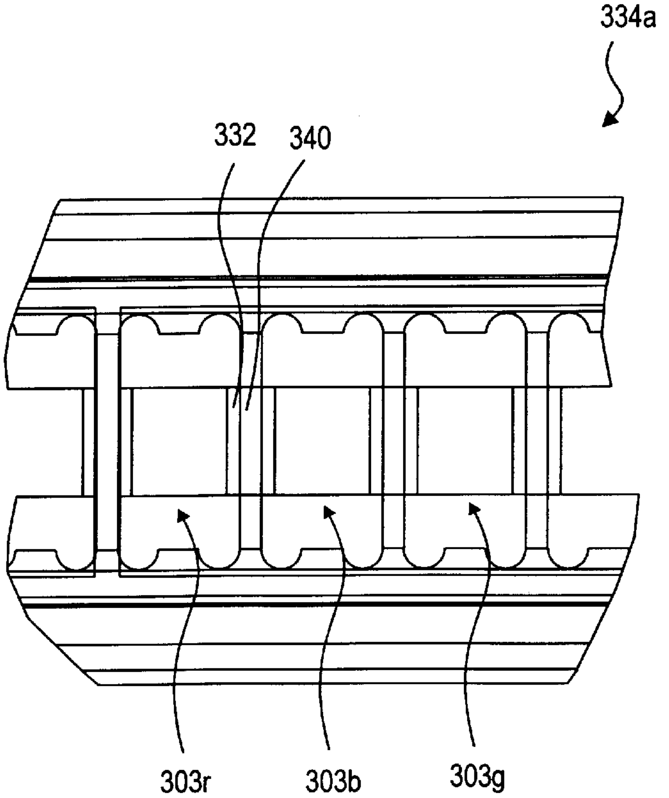
FIG. 13*e* is an enlarged bottom view of a section of the color scanhead of FIG. 13*b;*
Figure 13F:
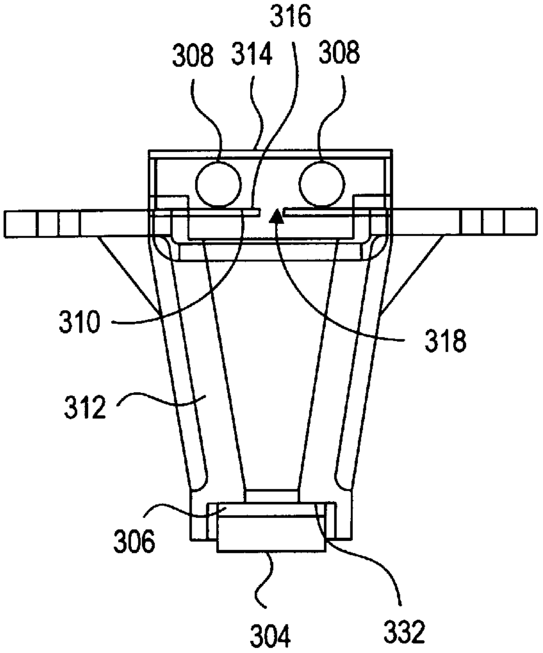
FIG. 13*f* is a sectional end view of the color scanhead of FIG. 13*a;*

As seen in FIG. 13*f*, the sensors 304 and filters 306 are positioned within the filter and sensor receptacles 303 in the body 302 of the scanhead 300. Each of the receptacles has ledges 332 for holding the filters 306 in the desired positions. The sensors 304 are positioned immediately behind their corresponding filters 306 within the receptacle 303.

FIG. 13*e* illustrates one full color cell such as cell 334*a* on the scanhead 300. The color cell 334*a* comprises a receptacle 303*r* for receiving a red filter 306*r* (not shown) adapted to pass only red light to a corresponding red sensor 304*r* (not shown). As mentioned above, the specific wavelength ranges transmitted by each filter beginning at 10% transmittance are:

Red 580 nm to 780 nm,

Blue 400 nm to 510 nm,

Green 480 nm to 580 nm.

The specific wavelength ranges transmitted by each filter beginning at 80% transmittance are:

Red 610 nm to 725 nm,

Blue 425 nm to 490 nm,

Green 525 nm to 575 nm.

The cell further comprises a blue receptacle 303*b* for receiving a blue filter 306*b* (not shown) adapted to pass only blue light to a corresponding blue sensor 304*b*, and a green receptacle 303*g* for receiving a green filter 306*g* (not shown) adapted to pass only green light to a corresponding green sensor 304*g*. Additionally, there are sensor partitions 340 between adjacent filter and sensor receptacles 303 to prevent a sensor in one receptacle, e.g., receptacle 303*b*, from receiving light from filters in adjacent receptacles, e.g., 303*r* or 303*g*. In this way, the sensor partitions eliminate cross-talk between a sensor and filters associated with adjacent receptacles. Because the sensor partitions 340 prevent sensors 304 from receiving wavelengths other than their designated color wavelength, the sensors 304 generate analog outputs representative of their designated colors. Other full color cells such as cells 334*b*, 334*c*, 334*d* and 334*e* are constructed identically.

As seen in FIGS. 13*a* and 13*d*, cells are divided from each other by cell partitions 336 which extend between adjacent color cells 334 from the sensor end 324 to the mask end 322. These partitions ensure that each of the sensors 304 in a color cell 334 receives light from a common portion of the bill. The cell partitions 336 shield the sensors 304 of a color cell 334 from noisy light reflected from areas outside of that cell's scan area such as light from the scan area of an adjacent cell or light from areas outside the scan area of any cell. To further facilitate the viewing of a common portion of a bill by all the sensors in a color cell 334, the sensors 304 are positioned 0.655 inches from the slit 318 This distance is selected based on the countervening considerations that (a) increasing the distance reduces the intensity of light reaching the sensors and (b) decreasing the distance decreases the extent to which the sensors in a cell see the same area of a bill. Placing the light source on the document side of the slit 318 makes the sensors more forgiving to wrinkled bills because light can flood the document since the light is not restricted by the mask 310. Because the light does not have to pass through the slits of a mask, the light intensity is not reduced significantly when there is a slight (e.g., 0.03") wrinkle in a document as it passes under the scanhead 300.

Referring to FIG. 13*b*, the dimensions [l, w, h] of the filters 306 are 0.13, 0.04, 0.23 inches and the dimensions of the filter receptacles 303 are 0.141×0.250 inches and of the sensors 304 are 0.174×0.079×0.151 inches. The active area of each sensor 304 is 0.105×0.105 inches.

Each sensor generates an analog output signal representative of the characteristic information detected from the bill. Specifically, the analog output signals from each color cell 334 are red, blue and green analog output signals from the red, blue and green sensors 304*r*, 304*b* and 304*g*, respectively (see FIG. 8). These red, blue and green analog output signals are amplified by the amplifier 58 and converted into digital red, blue and green signals by means of the analog-to-digital converter (ADC) unit 52 whose output is fed as a digital input to the central processing unit (CPU) 54 as described above in conjunction with FIG. 1. These signals are then processed as described above to identify the denomination and/or type of bill being scanned. According to one embodiment, the outputs of an edge sensor 338 and the green sensor of the left color cell 334*a* are monitored by the PROCESSOR 54 to initially detect the presence of the bill 44 adjacent the color scanhead 300 and, subsequently, to detect the bill edge 44*b*.

As seen in FIG. 13*a*, a mask 310 having a narrow slit 318 therein covers the top of the scanhead. The slit 318 is 0.050 inches wide. A pair of light sources 308 illuminate a bill 44 as it passes the scanhead 300 on the transport plate 140. The illustrated light sources 308 are fluorescent tubes providing white light with a high intensity in the red, blue and green wavelengths. As mentioned above, the fluorescent tubes 308 may be part number CBY26-220NO manufactured by Stanley of Japan. These tubes have a spectrum from about 400 mm to 725 mm with peaks for blue, green and red at about 430 mm, 540 mm and 612 mm, respectively. As can be seen in FIG. 13*f*, the light from the light sources 308 passes through a transparent glass shield 314 positioned between the light sources 308 and the transport plate 140. The glass shield 314 assists in guiding passing bills flat against the transport plate 140 as the bills pass the scanhead 300. The glass shield 314 also protects the scanhead 300 from dust and contact with the bill. The glass shield 314 may be composed of, for example, soda glass or any other suitable material.

Because light diffuses with distance, the scanhead 302 is designed to position the light sources 308 close to the transport path 140 to achieve a high intensity of light illumination on the bill. In one embodiment, the tops of the fluorescent tubes 308 are located 0.06 inches from the transport path 140. The mask 310 of the scanhead 300 also assists in illuminating the bill with the high intensity light. Referring to FIG. 13*f*, the mask 310 has a reflective surface 316 facing to the light sources 308. The reflective side 316 of the mask 310 directs light from the light sources 308 upwardly to illuminate the bill. The reflective side 316 of the mask 310 may be chrome plated or painted white to provide the necessary reflective character. The combination of the two fluorescent light tubes 308 and the reflective side 316 of the mask 310 enhances the intensity or brightness of light on the bill while keeping the heat generated within the currency handling system 10 at acceptable levels.

The light intensity on the bill must be sufficiently high to cause the sensors 304 to produce output signals representative of the characteristic information on the bill. Alternatives to the pair of fluorescent light tubes may be used, such as different types of light sources and/or additional light sources. However, the light sources should flood the area of the bill scanned by the scanhead 300 with high intensity light while minimizing the heat generated within the currency handling system. Adding more light sources may suffer from the disadvantages of increasing the cost and size of the currency handling system.

Light reflected off the illuminated bill enters a manifold 312 of the scanhead 300 by passing through the narrow slit 318 in the mask 310. The slit 318 passes light reflected from the scan area or the portion of the bill directly above the slit 318 into the manifold 312. The reflective side 316 of the mask 310 blocks the majority of light from areas outside the scan area from entering the manifold 312. In this manner, the mask serves as a noise shield by preventing the majority of noisy light or light from outside the scan area from entering the manifold 312. In one embodiment, the slit has a width of 0.050 inch and extends along the 6.466 inch length the scanhead 300. The distance between the slit and the bill is 0.195 inch, the distance between the slit and the sensor is 0.655 inch, and the distance between the sensor and the bill is 0.85 inch. The ratio between the sensor-to-slit distance and the slit-to-bill distance is 3.359:1. By positioning the slit 318 away from the bill, the slit 318 passes light reflected from a greater area of the bill. Increasing the scan area yields outputs corresponding to an average of a larger scan area. One advantage of employing fewer samples of larger areas is that the currency handling system is able to process bills at a faster rate, such as at a rate of 1200 bills per minute. Another advantage of employing larger sample areas is that by averaging information from larger areas, the impact of small deviations in bills which may arise from, for example, normal wear and/or small extraneous markings on bills, is reduced. That is, by averaging over a larger area the sensitivity of the currency handling system to minor deviations or differences in color content is reduced. As a result, the currency handling system is able to accurately discriminate bills of different denominations and types even if the bills are not in perfect condition.

Figure 13G:
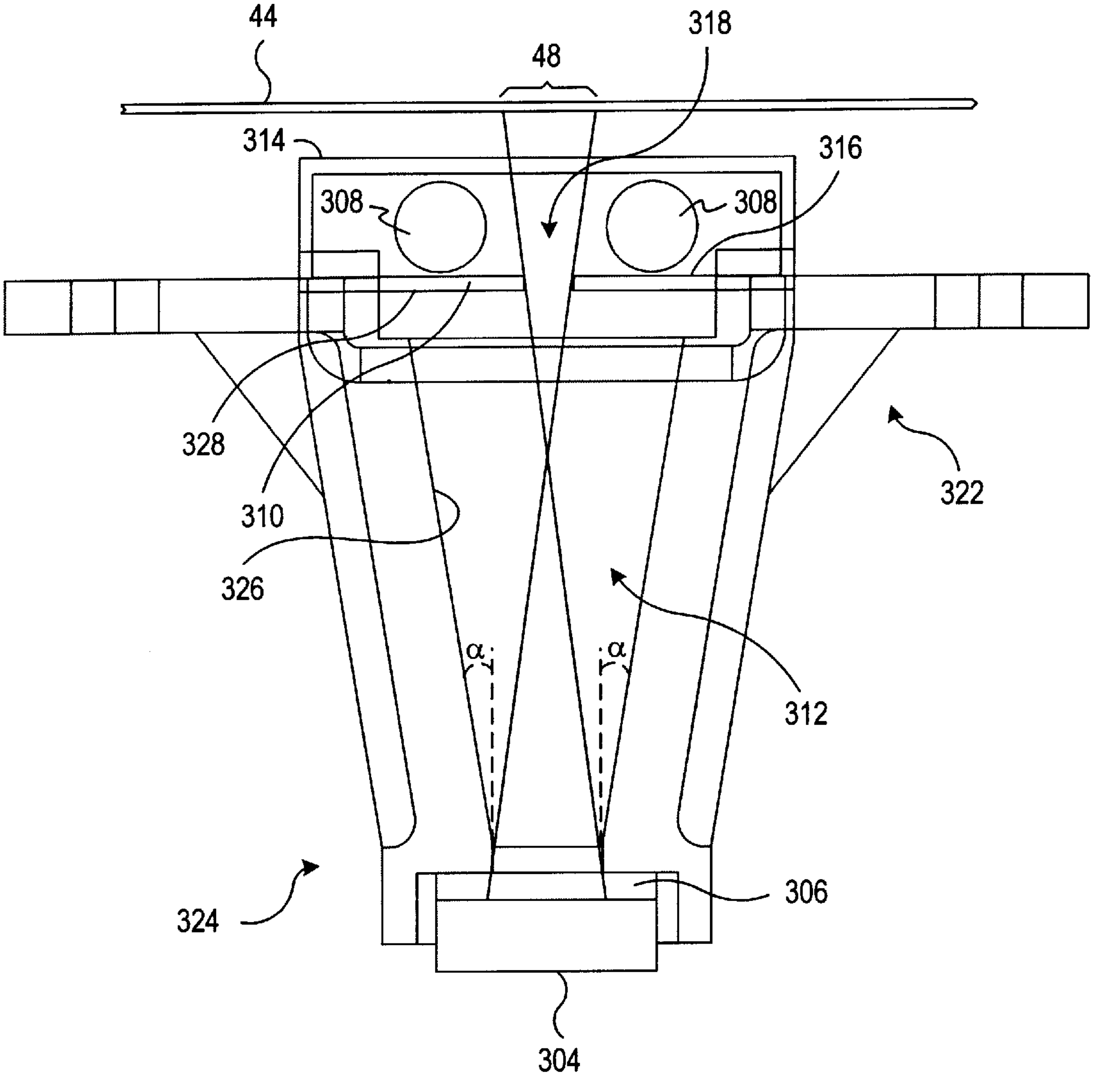
FIG. 13*g* is an illustration of the light trapping geometry of the manifold of the scanhead of FIG. 13*a;*

FIG. 13*g* illustrates the light trapping geometry of the manifold 312 is provided. Light reflected from the scan area 48 of the bill 44 travels through the slit 318 and into the manifold 312. The light passes through the manifold 312 and the filter 306 to the sensor 304. However, because the light reflected from the bill includes light reflected perpendicular to and at other angles to the bill 44, the light passing through the slit 318 includes some light reflected from areas outside the scan area 48. To prevent noisy light or light from outside the scan area 48 from being detected by the sensors 304, the manifold 312 has a light trapping geometry. By reducing the amount of noisy light received by the sensors 304, the magnitude of intensity of the light needed to illuminate the bill to provide accurate sensors outputs is reduced.

The light trapping geometry of the manifold 312 reflects the majority of noisy light away from the sensors 304. To reflect "noisy" light away from the sensors 304, the walls 326 of the manifold 312 have a back angle $\alpha$. To form the back angle, the width of the slit end 322 of the manifold 312 is made larger than the width of the sensor end 324 of the manifold 312. In one embodiment, the slit end 322 is 0.331 inches wide and the sensor end 324 is 0.125 inches wide to form a back angle of 10.5 degrees. Because of the light trapping geometry, the majority of the reflected light entering the manifold 312 that does not directly pass to the sensor 304 will be reflected off the back angled walls 326 away from the sensors 304. Furthermore, the walls 326 of the manifold 312 are either fabricated from or coated with a light absorbing material to prevent the noisy light from traveling to the sensors 304. Additionally, the interior surface of the manifold walls may be textured to further prevent the noisy light from traveling to the sensors 304. Moreover, the manifold side 328 of the mask 310 may be coated with a light absorbing material such as black paint and/or provided with a textured surface to prevent the trapped light rays from being reflected toward the sensor 304. The mask 310 is grounded so that it can act as an electrical noise shield. Grounding the mask 310 shields the sensors 304 from electromagnetic radiation noise emitted by the fluorescent tubes 308, thus further reducing electrical noise.

As best seen in FIGS. 13*c* and 13*d*, in one embodiment, the scanhead 300 has a length $L_M$ of 7.326 inches, a height $H_M$ of 0.79 inches, and a width $W_M$ of 0.5625 inches. Each cell has a length $L_C$ of ½ inches and the scanhead has an overall interior length $L_I$ of 7.138 inches. In the embodiment depicted in FIG. 13*d*, the scanhead 300 is populated with five full color cells 334*a*, 334*b*, 334*c*, 334*d* and 334*e* laterally positioned across the center of the length of the scanhead 300 and one edge sensor 338 at the left of the first color site 334*a*. See also FIG. 13*b*. The edge sensor 338 comprises a single sensor without a corresponding filter to detect the intensity of the reflected light and hence acts as a bill edge sensor.

While the embodiment shown in FIG. 13*d* depicts an embodiment populated with five full color cells, because the body 302 of the scanhead 300 has sensor and filter receptacles 303 to accommodate up to forty-three filters and/or sensors, the scanhead 300 may be populated with a variety of color cell configurations located in a variety of positions along the length of the scanhead 300. For example, in one embodiment only one color cell 334 may be housed anywhere on the scanhead 300. In other situations up to fourteen color cells 334 may be housed along the length of the scanhead 300. Additionally, a number of edge sensors 338 may be located in a variety of locations along the length of the scanhead 300.

Moreover, if all of the receptacles 303 were populated, it would be possible to select which color cells to use or process to scan particular bills or other documents. This selection could be made by a processor based on the position of a bill as sensed by the position sensors (FIG. 15*b*). This selection could also be based on the type of currency being scanned, e.g., country, denomination, series, etc., based upon an initial determination by other sensor(s) or upon appropriate operator input.

According to one embodiment, the cell partitions 336 may be formed integrally with the body 302. Alternatively, the body 302 may be constructed without cell partitions, and configured such that cell partitions 336 may be accepted into the body 302 at any location between adjacent receptacles 303. Once inserted into the body 302, a cell partition 336 may become permanently attached to the body 302. Alternatively, cell partitions 336 may be removeably attachable to the body such as by being designed to snap into and out of the body 302. Embodiments that permit cell partitions 336 to be accepted at a number of locations provide for a very flexible color scanhead that can be readily adapted for different scanning needs such as for scanning currency bills from different countries.

For example, if information that facilitates distinguishing bills of different denominations from a first country such as Canada can be obtained by scanning central regions of bills, five cells such as 334*a*–334*e* can be positioned near the center of the scanhead as in FIG. 13*b*. Alternatively, if information that facilitates distinguishing bills of different denominations from a second country such as Turkey can be obtained by scanning regions near the edges of bills, cells can be positioned near the edges of the scanhead.

In this manner, standard scanhead components can be manufactured and then assembled into various embodiments of scanheads adapted to scan bills from different countries or groups of countries based on the positioning of cell locations. Accordingly, a manufacturer can have one standard scanhead body 302 part and one standard cell partition 336 part. Then by appropriately inserting cell partitions into the body 302 and adding the appropriate filters and sensors, a scanhead dedicated to scanning a particular set of bills can be easily assembled.

For example, including a single edge sensor, such as sensor 338, and only a single color cell located in the center of the scanhead, such as cell 334*c*, U.S. bills can be discriminated; Canadian bills can be discriminated if cells 334*a*–334*e* are populated and Euro currency can be discriminated using only cells 334*a* and 334*e*. Therefore, a single currency handling system employing a scanhead populated with color cells 334*a*–334*e* and edge sensor 338 can be used to process and discriminate U.S., Canadian, and Euro currency.

Alternatively, a universal scanhead can be manufactured that is fully populated with cells across the entire length of the scanhead. For example, the scanhead 300 may comprise fourteen color cells and one edge cell. Then a single scanhead may be employed to scan many types of currency. The scanning can be controlled based on the type of currency being scanned. For example, if the operator informs the currency handling system, or the currency handling system determines, that Canadian bills are being processed, the outputs of sensors in cells 334*a*–334*e* can be processed. Alternatively, if the operator informs the currency handling system, or the currency handling system determines that Thai bills are being processed, the outputs of sensors in cells near the edges of the scanhead can be processed.

Figure 6A:
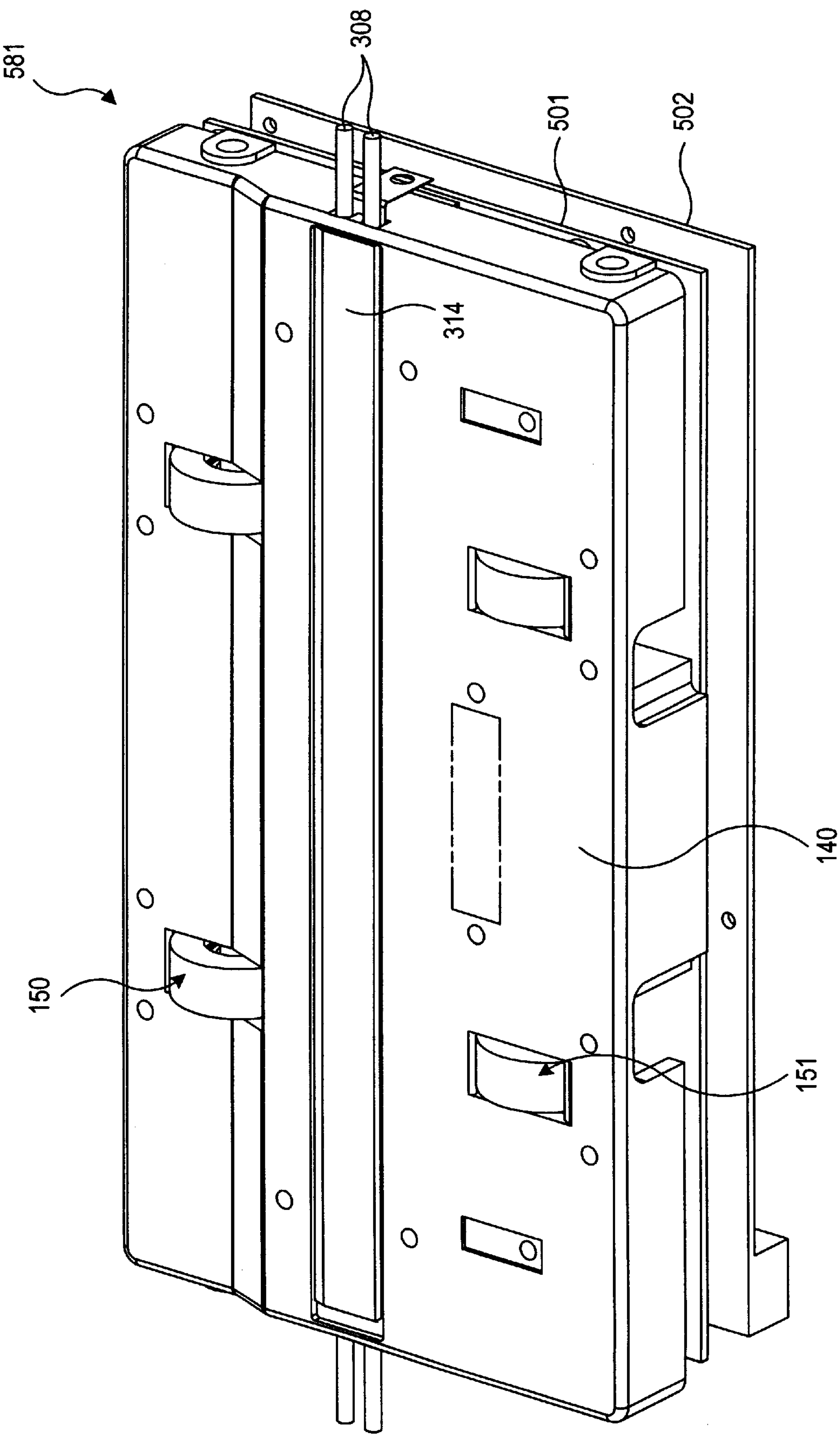
FIG. 6*a* is a perspective view of a color scanhead module.
Figure 6B:
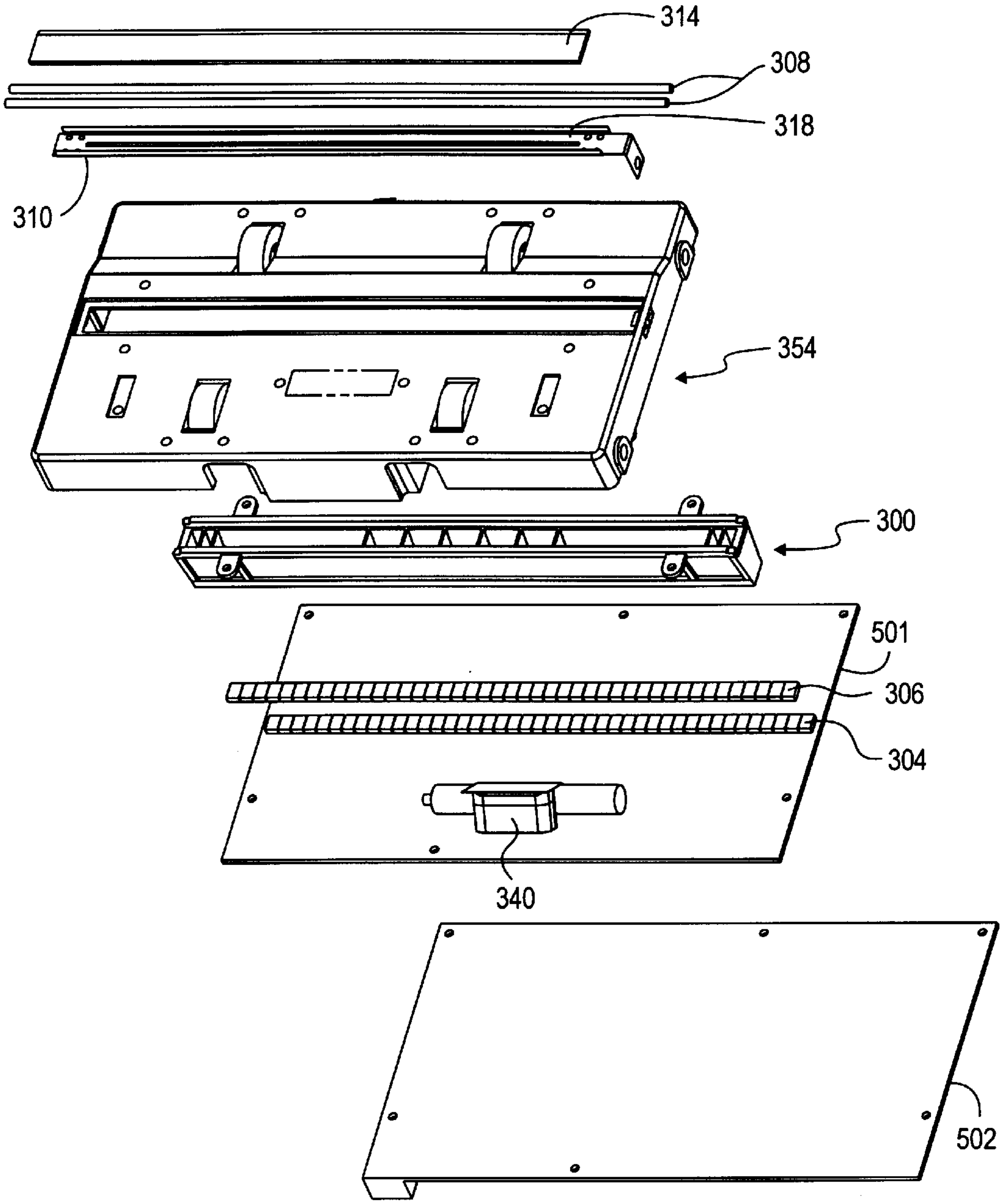
FIG. 6*b* is an exploded perspective view of the color scanhead module of FIG. 6*a;*
Figure 6C:
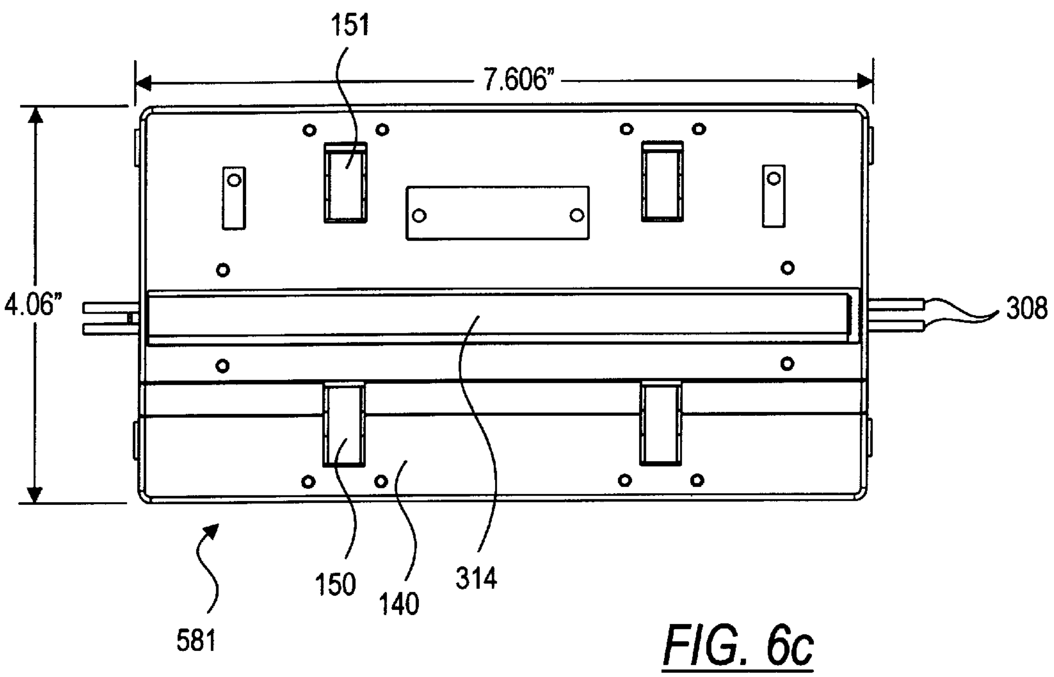
FIG. 6*c* is a top view of the color scanhead module of FIG. 6*a;*
Figure 6D:
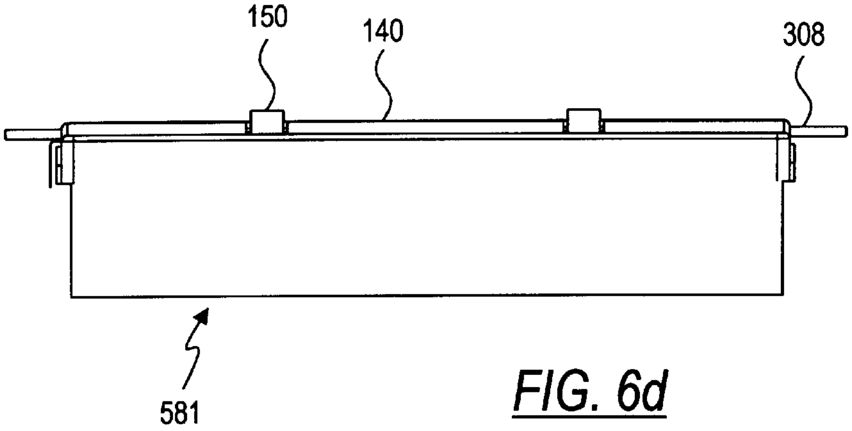
FIG. 6*d* is a front view of the color scanhead module of FIG. 6*a;*
Figure 6E:
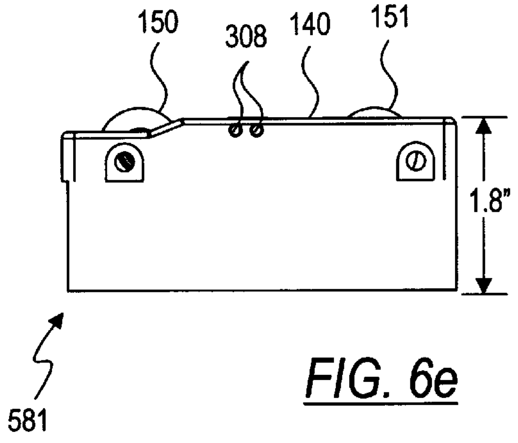
FIG. 6*e* is a side view of the color scanhead module of FIG. 6*a;*

Referring to FIGS. 5*a–c* and 6*a–g*, the full color scanhead 300 forms part of a color scanhead module 581. In addition to the scanhead 300, the scanhead module 581 comprises a transport plate 540, printed circuit boards (PCB) 501 and 502, passive rolls 550 and 551, UV/fluorescence sensor 340, magnetic sensor (not shown), thread sensor (not shown), UV light source 342, fluorescent light tubes 308, color mask 310, glass shield 314, color filters 306, photosensors 304, sensor partitions 336 and other elements and circuits for processing color characteristics. Many of these parts have been described above with reference to FIGS. 13*a–g*. FIG. 6*a* is a perspective view of the color scanhead module 581. As seen in FIGS. 6*c*–6*e*, the module is compact in size having a length $L_{CM}$ of 7.6 inches, a width $W_{CM}$ of 4.06 inches, and a height $H_{CM}$ of 1.8 inches. FIGS. 6*d* and 6*e* are included only to show relative overall size of the module, and therefore show few details. The compact size of the color module contributes to a reduction the size of the overall currency handling system in which it is employed. As described above, reducing the size and weight of the overall currency handling system is desirable in many environments in which the system is to be employed. FIG. 6*b* is a perspective exploded view of the color scanhead module 581. Illustrated in FIG. 6*b*, from the top down, are the transparent glass shield 314, which is positioned above the light sources 308 and the mask 310 having the narrow slit 318 therein. The mask 310 covers the top of the scanhead 300 which is situated in the housing 354 of the color scanhead module 581. The scanhead 300 can be formed integrally with the housing 354 if desired. A first PCB 501 contains the sensors 304 (not shown in FIG. 6*b*) which have filters 306 that rest upon the respective sensors 304 below. Also contained on the first PCB 501, is an UV sensor 340. A second PCB 502 is disposed below the first PCB 501 and contains further circuitry for processing the data from the sensors 304.

Each sensor generates an analog output signal representative of the characteristic information detected from the bill. The analog output signals from each color cell 334 comprises red, blue and green analog output signals from their respective red sensor 304*r*, blue sensor 304*b* and green sensor 304*g*. As described above in connection with FIG. 1, these red, blue and green analog output signals are amplified by the amplifier 58 and converted into digital red, blue and green signals by means of the analog-to-digital converter (ADC) unit 52 whose output is fed as a digital input to the central processing unit (CPU) 54. These signals are then processed as described above to discriminate the denomination and/or type of bill being scanned. According to one embodiment, the outputs of the edge sensor 338 and the green sensor of the left color cell 334*e* are monitored by the PROCESSOR 54 to initially detect the presence of the bill 44 adjacent the color scanhead 300 and, subsequently, to detect the edge of the bill 44*b* as described above in connection with FIG. 8.

Figure 6F:
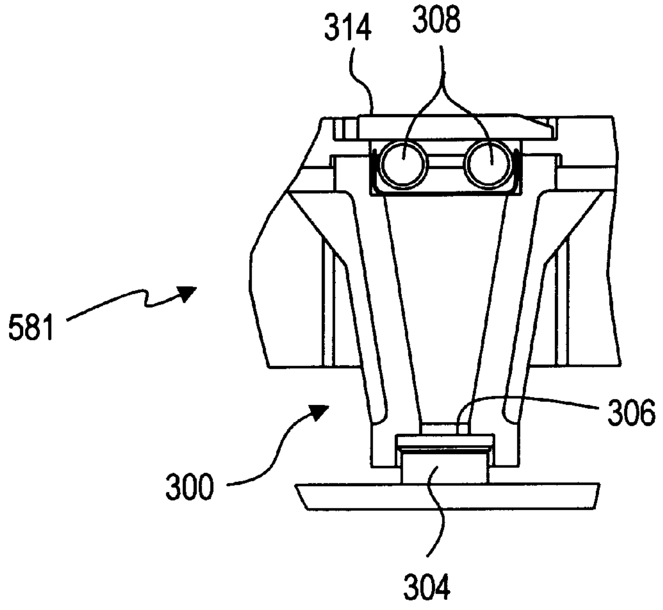
FIG. 6*f* is an end view of a color scanhead.
Figure 6G:
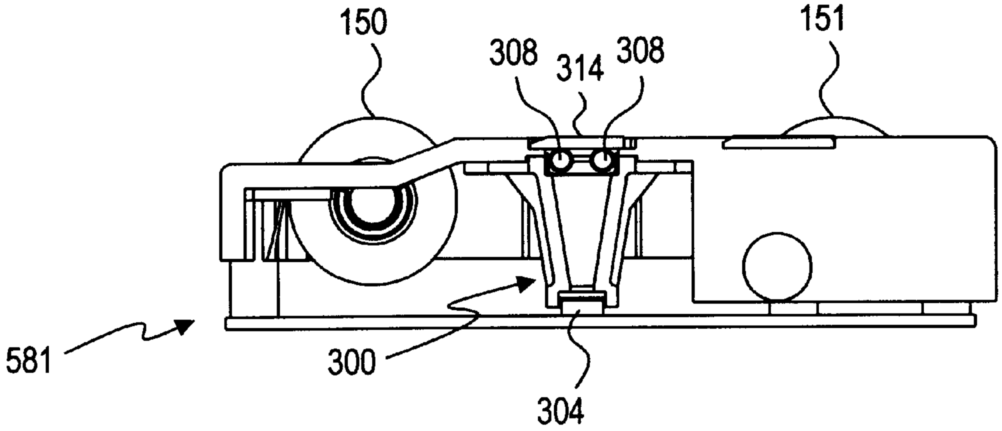
FIG. 6*g* is a side view of the color scanhead module of FIG. 6*a* including the color scanhead of FIG. 6*f;*

As seen in FIG. 6*a,* the mask 310 having the narrow slit 318 therein covers the top of the scanhead. The slit 318 is 0.050 inches wide. The pair of light sources 308 illuminate a bill 44 as it passes the scanhead 300 on the transport plate 140. In one embodiment, the light sources 308 are fluorescent tubes providing white light with a high intensity in the red, blue and green wavelengths. As mentioned above, according to one embodiment the fluorescent tubes are part number CBY26-220NO manufactured by Stanley of Japan. Those florescent tubes have a spectrum from about 400 nm to 725 nm with peaks for blue, green and red at about 430 nm, 540 nm and 612 nm, respectively. As seen in FIGS. 6*f–g,* the light from the light sources 308 passes through the transparent glass shield 314 positioned between the light sources 308 and the transport plate 140. The glass shield 314 assists in guiding passing bills flat against the transport plate 140 as the bills pass the scanhead 300. The glass shield 314 also protects the scanhead 300 from dust and contact with the bill. The glass shield 314 may be composed of, for example, soda glass or any other suitable material.

IV. Other Sensors

A. Magnetic

Figure 14:
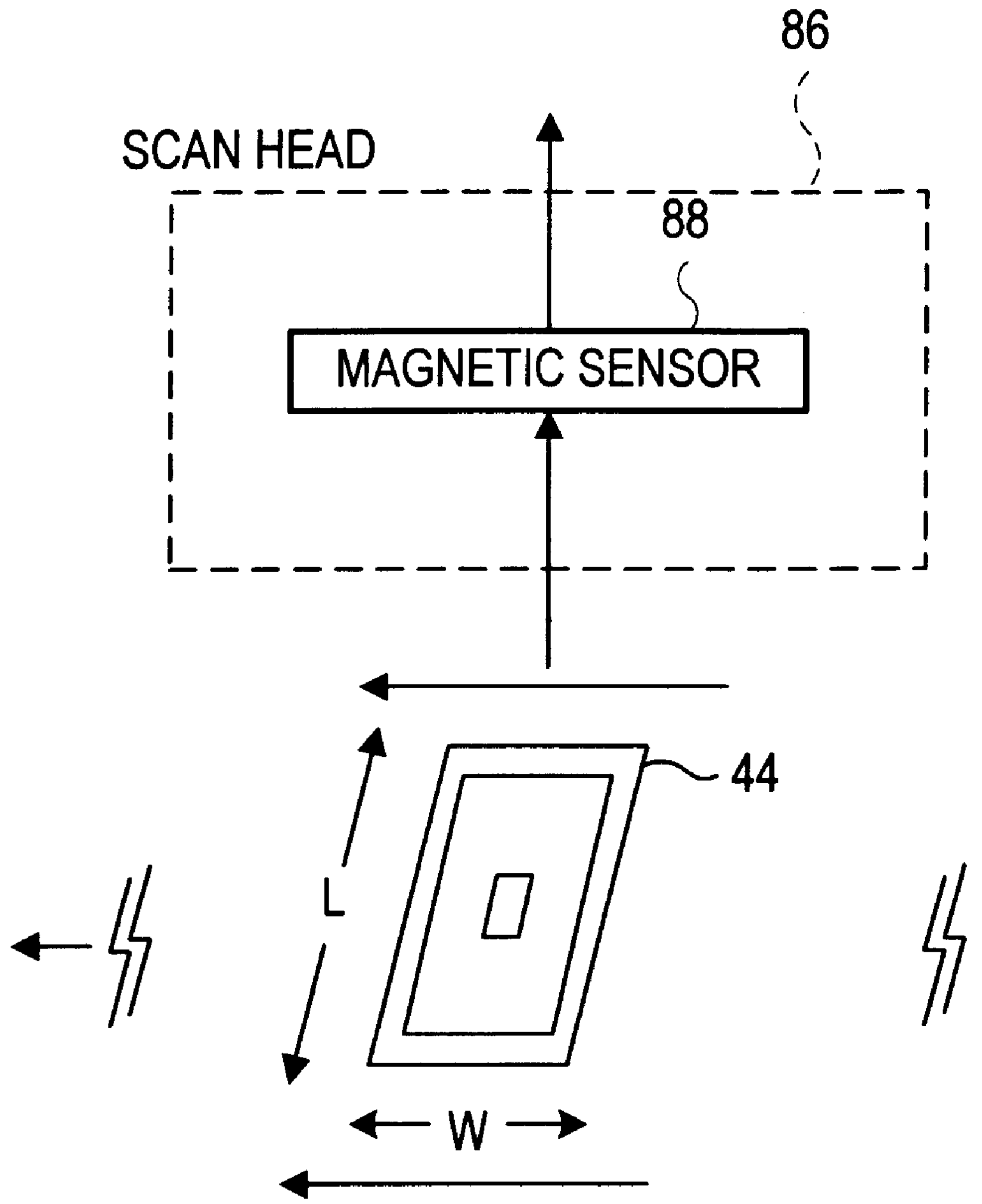
FIG. 14 is a functional block diagram of a magnetic scanhead.

In addition to the optical and color scanheads described above, the currency handling system 10 may include a magnetic scanhead. FIG. 14 illustrates a scanhead 86 having magnetic sensor 88. A variety of currency characteristics can be measured using magnetic scanning. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

The denomination determined by optical scanning or color scanning of a bill may be used to facilitate authentication of the bill by magnetic scanning, using the relationships set forth in Table 1.

TABLE 1

| Sensitivity Denomination | 1 | 2 | 3 | 4 | 5 |
|---|---|---|---|---|---|
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

Table 1 depicts relative total magnetic content thresholds for various denominations of genuine bills. Columns 1–5 represent varying degrees of sensitivity selectable by a user of a device employing the present invention. The values in Table 1 are set based on the scanning of genuine bills of varying denominations for total magnetic content and setting required thresholds based on the degree of sensitivity selected. The information in Table 1 is based on a total magnetic content of 1000 for a genuine $1. The following discussion is based on a sensitivity setting of 4. In this example it is assumed that magnetic content represents the second characteristic tested. If the comparison of first characteristic information, such as reflected light intensity or color content of reflected light, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

B. Size

Figure 17:
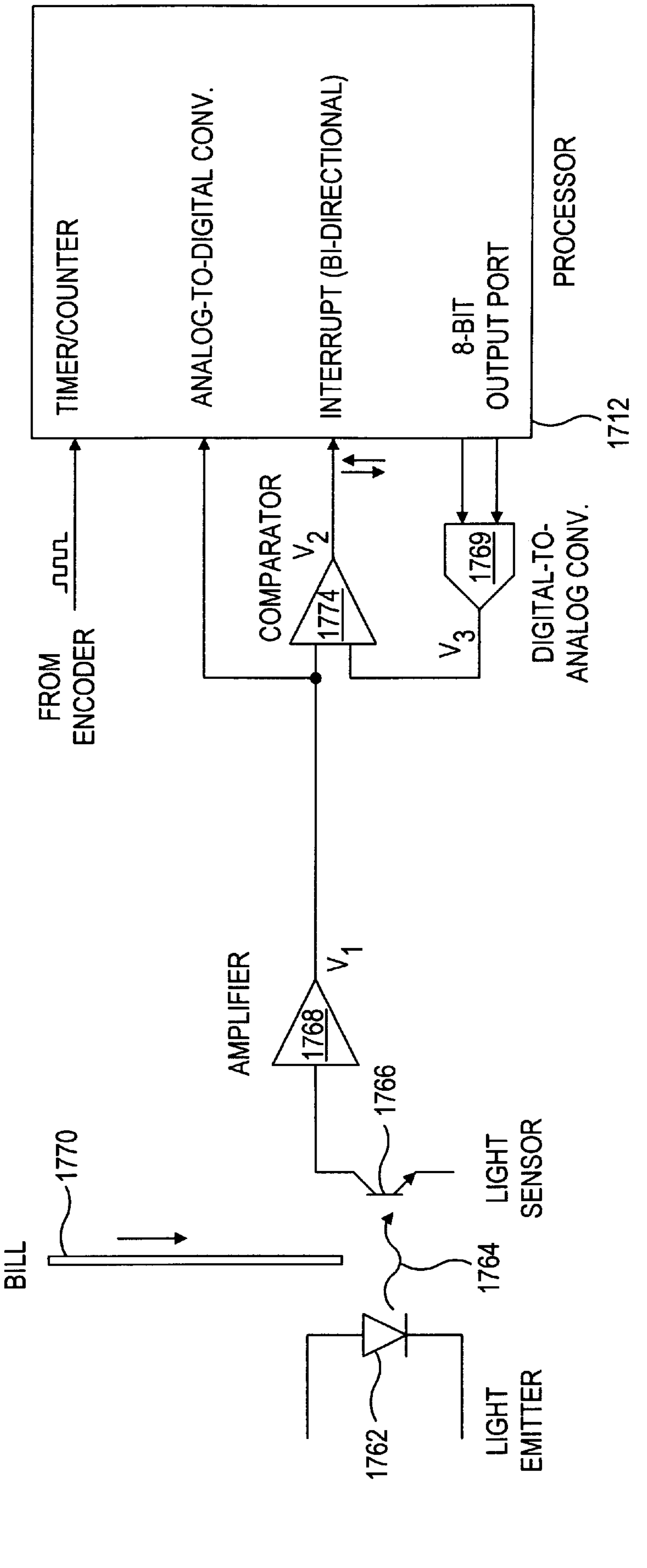
FIG. 17 is a block diagram of a digital size detection system for measuring the narrow (or "Y") dimension of a bill.
Figure 19:
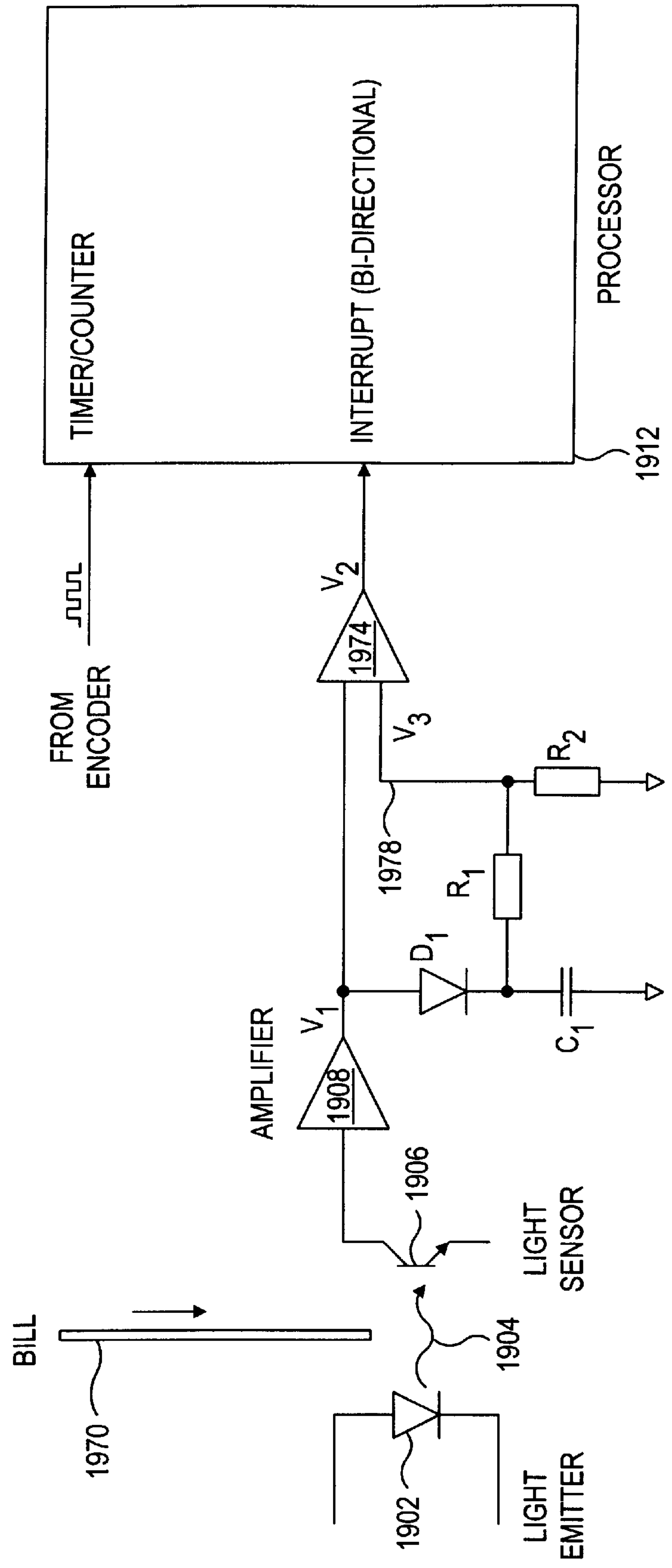
FIG. 19 is a block diagram of an analog size detection system for measuring the narrow (or "Y") dimension of a bill.

In addition to intensity, color and magnetic scanning as described above, the currency handling system 10 may determine the size of a currency bill. The “X” size dimension of a currency bill is determined by reference to FIGS. 15*a* and 15*b* which illustrate the upper standard scanhead 70 for optically sensing the size and/or position of a currency bill under test. The “Y” dimension may be determined by either of the systems shown in FIGS. 17 and 19. The scanhead 70 may be used alternatively or in addition to any of the other sensing systems heretofore described. The scanhead 70, like the systems of FIGS. 17 and 19, is particularly useful in foreign markets in which the size of individual bills varies with their denomination. The scanhead 70 is also useful in applications which require precise bill position information such as, for example, where a bill attribute is located on or in the bill (e.g., color, hologram, security thread, etc.).

The scanhead 70 includes two photo-sensitive linear arrays 1502*a*, 1502*b*. Each of the linear arrays 1502*a*, 1502*b* consists of multiple photosensing elements (or “pixels”) aligned end-to-end. The arrays 1502*a*, 1502*b*, having respective lengths $L_1$ and $L_2$, are positioned such that they are co-linear and separated by a gap “G.” In one embodiment, each linear array 1502*a* and 1502*b* comprises a 512-element Texas Instruments model TSL 218 array, commercially available from Texas Instruments, Inc., Dallas, Tex. In the TSL 218 arrays, each pixel represents an area of about 5 mils in length, and thus the arrays 1502*a*, 1502*b* have respective lengths $L_1$ and $L_2$ of 2½ inches. In one embodiment, the gap G between the arrays is about 2 inches. In this embodiment, therefore, the distance between the left end of array 1502*a* and the right end of array 1502*b* is seven inches ($L_1$+$L_2$+G), thus providing the scanhead 70 with the ability to accommodate bills of at least seven inches in length. It will be appreciated that the scanhead 70 may be designed with a single array and/or may use array(s) having fewer or greater numbers of elements, having a variety of alternative lengths $L_1$ and $L_2$ and/or having a variety of gap sizes (including, for instance, a gap size of zero).

The operation of the scanhead 70 is best illustrated in FIGS. 5*a–c*. The arrays 1502*a*, 1502*b* (not visible in FIGS. 5*a–c*) of the upper head assembly 70 are positioned above the transport path and the lower color scanhead 300. The light source 308, which in the illustrated embodiment comprises a pair of fluorescent light tubes, is positioned below the upper head assembly 70 and the transport path. In one embodiment, the arrays 1502*a*, 1502*b* are positioned directly above one of the tubes 308. It will be appreciated that the illustrated embodiment may be applied to systems having non-horizontal (e.g., vertical) transport paths by positioning the scanhead 70 and light source 308 on opposite sides (e.g., top and bottom) of the transport path.

The individual pixels in the arrays 1502*a*, 1502*b* are adapted to detect the presence or absence of light transmitted from the light tubes 308. In one embodiment, gradient index lens arrays 1514*a*, 1514*b*, manufactured by NSG America, Somerset, N.J., part no. SLA-20B144-570-1-226/236, are mounted between the light tubes 308 and the respective sensor arrays 1502*a*, 1502*b*. The gradient index lens arrays 1514*a*, 1514*b* maximize the accuracy of the scanhead 70 by focusing light from the light tubes 308 onto the photo-sensing elements and filtering out extraneous light and reflections, which may otherwise adversely affect the accuracy of the scanhead 70. Alternatively, less accurate but relatively reliable measurements may be obtained by replacing the gradient index lens arrays 1514*a*, 1514*b* with simpler, less expensive filters such as, for example, a plate (not shown) with aligned holes or a continuous slot allowing passage of light from the light tubes 308 to the arrays 1502*a*, 1502*b*.

Figure 16:
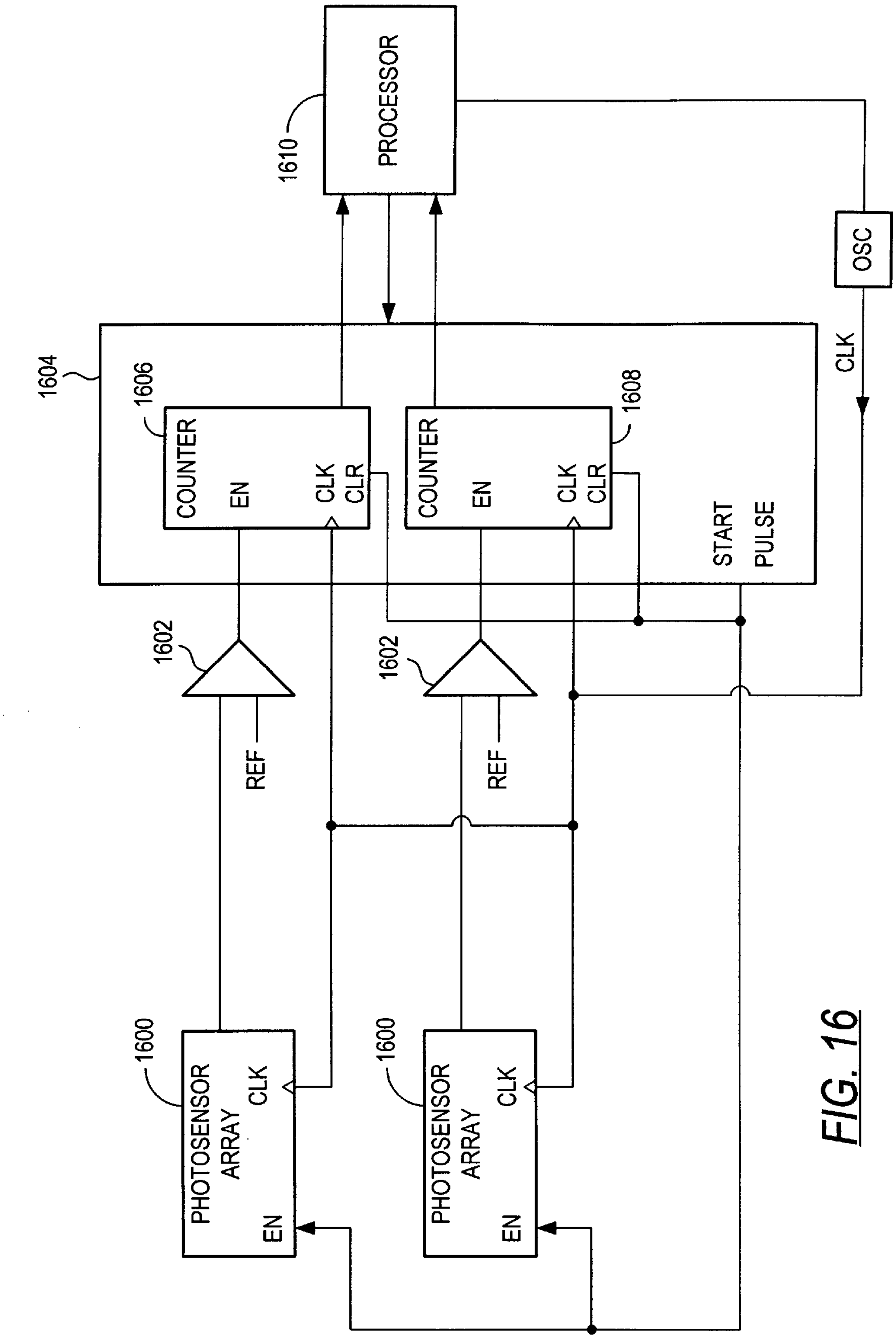
FIG. 16 is a block diagram of a size detection circuit for measuring the long (or "X") dimension of a bill.

When no bill is present between the light tubes 308 and the arrays 1502*a*, 1502*b*, all of the photo-sensing elements are directly exposed to light. When a currency bill is advanced along the transport path between the light tubes 308 and the arrays 1502*a*, 1502*b*, a certain number of the photo-sensing elements will be blocked from light. The number of elements or "pixels" blocked from light will determine the length of the bill. Specifically, in one embodiment, the size of the long dimension of the bill is determined by the circuit of FIG. 16. There, two photosensor arrays 1600 (which may be the arrays 1502*a*, 1502*b*) are connected to two comparators 1602. Each photosensor array 1600 is enabled by a start pulse from a Programmable Logic Device (PLD) 1604. The clock pin (CLK) of each array 1600 is electrically connected to the CLK inputs of right and left counters, 1606 and 1608, in the PLD 1604. Each comparator 1602 is also electrically connected to a source of a reference signal. The output of each comparator 1602 is electrically connected to the enable (EN) inputs of the counters 1606 and 1608. The PLD 1604 is controlled by the PROCESSOR 54. The circuit of FIG. 16 is asynchronous.

The size of a bill is determined by sampling the outputs of the counters 1606 and 1608 after the leading edge of the bill is approximately one inch past the arrays 1502*a*, 1502*b*. The counters 1606 and 1608 count the number of uncovered pixels. The long dimension of the bill is determined by subtracting the number of uncovered pixels in each array from 511 (there are 512 pixels in each array 1600, and the counters 1606 and 1608 count from 0 to 511). The result is the number of covered pixels, each of which has a length of 5 mils. Thus, the number of covered pixels times 5 mils, plus the length of the gap G, gives the length of the bill.

The system 10 also provides bill position information and fold/hole fitness information by using the "X" dimension sensors. These sensors can detect the presence of one or more holes in a document by detecting light passing through the document. And, as described more fully below, these sensors can also be used to measure the light transmittance characteristics of the document to detect folded documents and/or documents that are overlapped.

The "Y" dimension is determined by the optical sensing system of FIG. 17, which determines the Y dimension of a currency bill under test. This size detection system includes a light emitter 1762 which sends a light signal 1764 toward a light sensor 1766. In one embodiment, the sensor 1766 corresponds to sensors 95 and 97 illustrated in FIG. 15. The sensor 1766 produces a signal which is amplified by amplifier 1768 to produce a signal $V_1$ proportional to the amount of light passing between the emitter and sensor. A currency bill 1770 is advanced across the optical path between the light emitter 1762 and light sensor 1766, causing a variation in the intensity of light received by the sensor 1766. As will be appreciated, the bill 1770 may be advanced across the optical path along its longer dimension or narrow dimension, depending on whether it is desired to measure the length or width of the bill.

Figure 18:
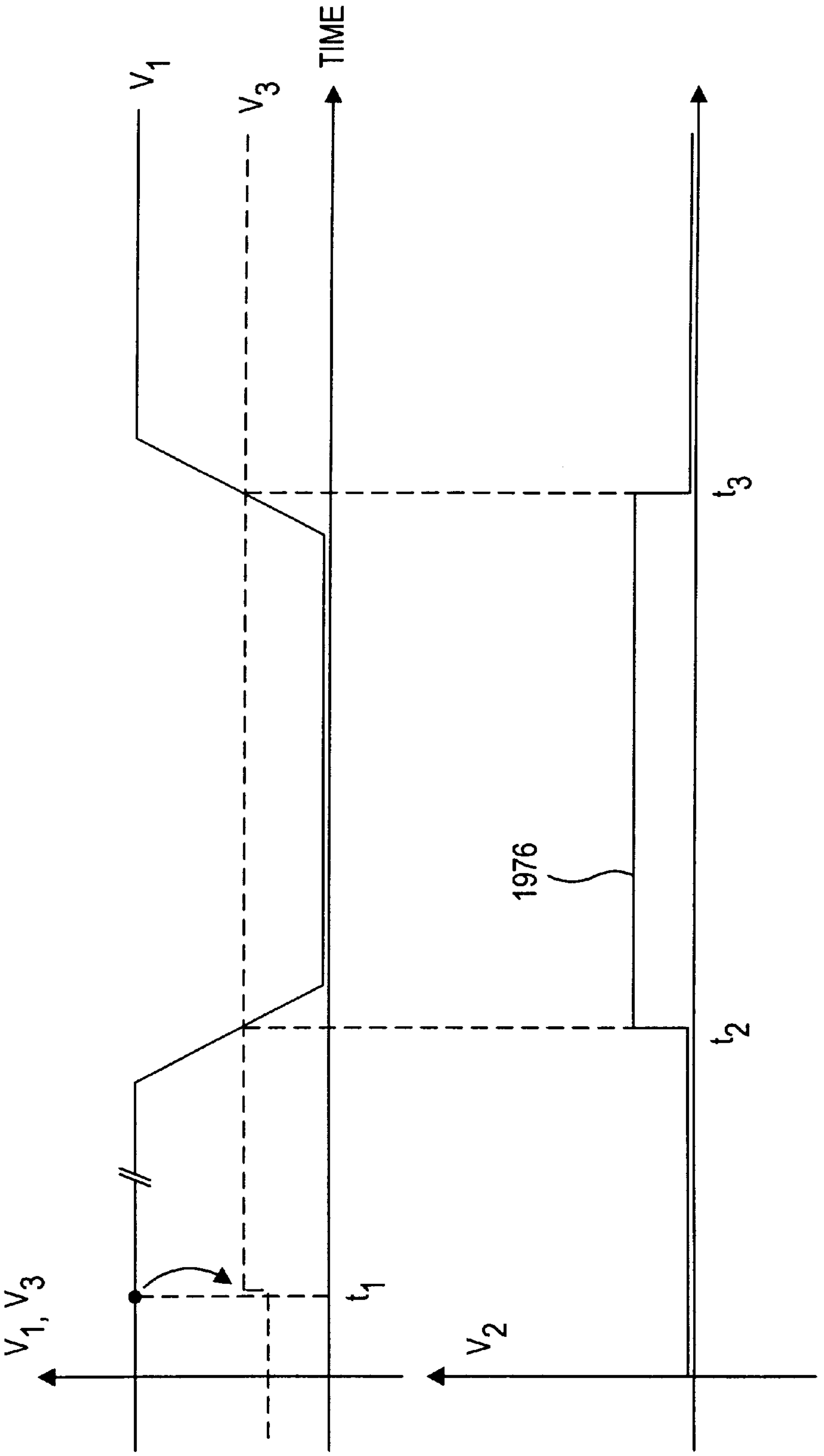
FIG. 18 is a timing diagram illustrating the operation of the size detection method of FIG. 17.

Referring to the timing diagram of FIG. 18, at time $t_1$, before the bill 1770 has begun to cross the path between the light emitter 1762 and sensor 1766, the amplified sensor signal $V_1$ is proportional to the maximum intensity of light received by the sensor 1766. The signal $V_1$ is digitized by an analog-to-digital converter and provided to the processor 1712, which divides it by two to define a value $V_1/2$ equal to one-half of the maximum value of $V_1$. The value $V_1/2$ is supplied to a digital-to-analog converter 1769 to produce an analog signal $V_3$ which is supplied as a reference signal to a comparator 1774. The other input to the comparator 1774 is the amplified sensor signal $V_1$ which represents the varying intensity of light received by the sensor 1766 as the bill 1770 crosses the path between the emitter 1762 and sensor 1766. In the comparator 1774, the varying sensor signal $V_1$ is compared to the reference signal $V_3$, and an output signal is provided to an interrupt device whenever the varying sensor signal $V_1$ falls above or below the reference $V_3$. Alternatively, the system could poll the sensors periodically, for example, every 1 ms.

As can be seen more clearly in the timing diagram of FIG. 18, the interrupt device produces a pulse 1976 beginning at time $t_2$ (when the varying sensor signal $V_1$ falls below the $V_3$ reference) and ending at time $t_3$ (when the varying sensor signal $V_1$ rises above the $V_3$ reference). The length of the pulse 1976 occurring between times $t_2$ and $t_3$ is computed by the processor 1712 with reference to a series of timer pulses from the encoder. More specifically, at time $t_2$, the processor 1712 begins to count the number of timer pulses received from the encoder, and at time $t_3$ the processor stops counting. The number of encoder pulses counted during the interval from time $t_2$ to time $t_3$ represents the width of the bill 1770 (if fed along its narrow dimension) or length of the bill 1770 (if fed along its longer dimension).

It has been found that light intensity and/or sensor sensitivity will typically degrade throughout the life of the light emitter 1762 and the light sensor 1766, causing the amplified sensor signal $V_1$ to become attenuated over time. The signal $V_1$ can be further attenuated by dust accumulation on the emitter or sensor. One of the advantages of the above-described size detection method is that it is independent of such variations in light intensity or sensor sensitivity. This is because the comparator reference $V_3$ is not a fixed value, but rather is logically related to the maximum value of $V_1$. When the maximum value of $V_1$ attenuates due to degradation of the light source, dust accumulation, etc., $V_3$ is correspondingly attenuated because its value is always equal to one-half of the maximum value of $V_1$. Consequently, the width of the pulse derived from the comparator output with respect to a fixed length bill will remain consistent throughout the life of the system, independent of the degradation of the light source 1762 and sensor 1766.

FIG. 19 portrays an alternative circuit which may be used to detect the Y dimension of a currency bill under test. In FIG. 19, the method of size detection is substantially similar to that described in relation to FIG. 17 except that it uses analog rather than digital signals as an input to the comparator 1974. A diode D1 is connected at one end to the output of the amplifier 68 and at another end to a capacitor C1 connected to ground. A resistor R1 is connected at one end between the diode D1 and the capacitor C1. The other end of the resistor R1 is connected to a resistor R2 in parallel with the reference input 1978 of the comparator 1974. If R1 and R2 are equal, the output voltage $V_3$ on the reference input 1978 will be one-half of the peak voltage output from the amplifier 1908. In the comparator 1974, the varying sensor signal $V_1$ is compared to the output voltage $V_3$, and an output signal is provided to an interrupt device whenever the varying sensor signal $V_1$ falls above or below the $V_3$ reference. Thereafter, a pulse 1976 is produced by the interrupt device, and the length of the pulse 1976 is determined by the processor 1912 in the same manner described above. In the circuit of FIG. 19, as in the circuit of FIG. 17, the signal $V_2$ is proportional to $V_1$, and the widths of pulses derived from the comparator output are independent of the degradation of the light source 1902 and sensor 1906.

C. Fold/Hole Detection

Figure 20:
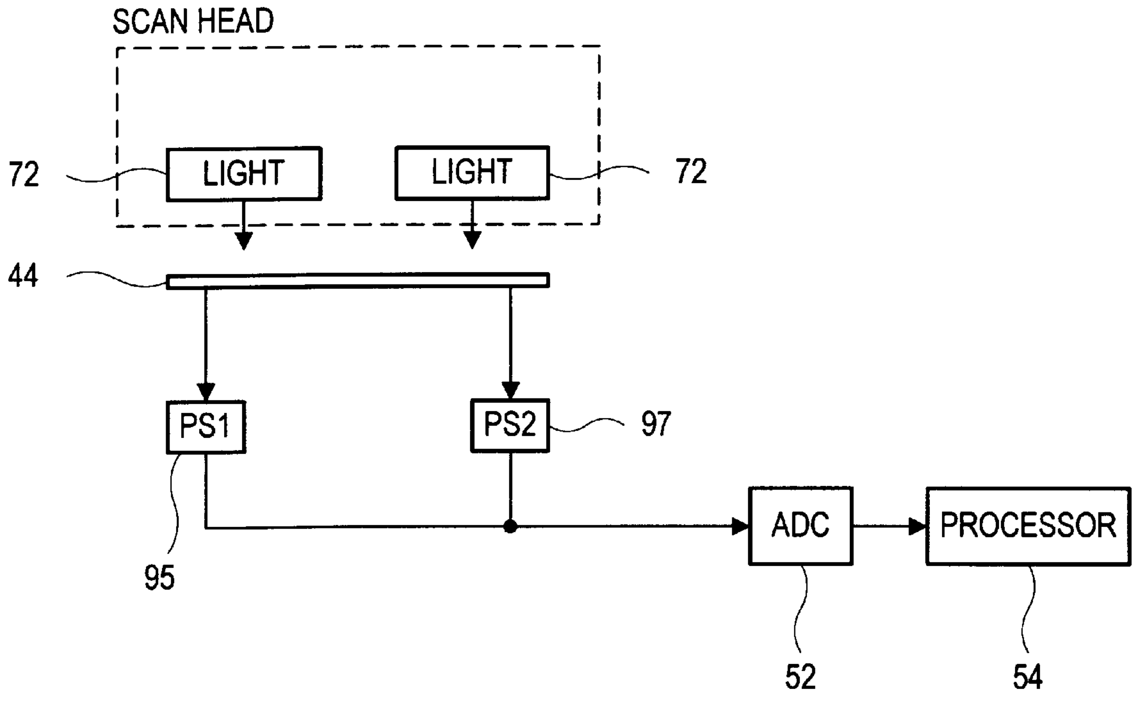
FIG. 20 is a functional block diagram of a fold/hole detection system.

As mentioned above, in addition to detecting the size of the currency bills, the currency handling system 10 may include a system for detecting folded or damaged bills as illustrated in FIG. 20. The two photosensors PS1 and PS2 are used to detect the presence of a folded document or the presence of a document having hole(s) therein, by measuring the light transmittance characteristics of the document (s). Folds and holes are detected by the photosensors PS1 and PS2, such as the "X" sensors 1502*a, b,* which are located on a common transverse axis that is perpendicular to the direction of bill flow. The photosensors PS1 and PS2 include a plurality of photosensing elements or pixels positioned directly opposite a pair of light sources on the other side of the bill, such as the light sources 308 of the color scanhead illustrated in FIG. 13*a*. The "X" sensors detect whether a pixel is covered or exposed to light from the light sources 308. The output of the photosensors determines the presence of folded bills and/or damaged bills such as bills missing a portion of the bill. For example, by using the "X" sensors, a folded bill can be detected in either of two ways. The first way is to store the size of an authentic bill and then detect the size of the bill being processed by counting the number of blocked pixels. If the size is less than the stored size, the system determines that the bill is folded. The second way is to detect the amount of light transmitted through the bill to determine the extent of the fold and where the fold stops. Using the second method, the size of the bill can be determined.

D. Doubles Detection

Doubling or overlapping of bills is detected by the photosensors PS1 and PS2, such as the "Y" sensors 95, 97, which are located on a common transverse axis that is perpendicular to the direction of bill flow. The photosensors PS1 and PS2 are positioned directly opposite a pair of light sources on the other side of the bill, such as the light sources 308 of the color scanhead illustrated in FIG. 13*a*. The photosensors PS1 and PS2 detect transmitted light from the light sources 308 and generate analog outputs which correspond to the sensed light that passes through the bill. Each such output is converted into a digital signal by a conventional ADC converter unit 52 whose output is fed as a digital input to and processed by the system PROCESSOR 54.

The presence of a bill adjacent the photosensors PS1 and PS2 causes a change in the intensity of the detected light, and the corresponding changes in the analog outputs of the photosensors PS1 and PS2 serve as a convenient means for density-based measurements for detecting the presence of "doubles" (two or more overlaid or overlapped bills) encountered during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

E. Normalization

In one embodiment, the currency handling system 10 monitors the intensity of light provided by the light sources. It has been found that the light source and/or sensors of a particular system may degrade over time. Additionally, the light source and/or sensor of any particular system may be affected by dust, temperature, imperfections, scratches, or anything that may affect the brightness of the tubes or the sensitivity of the sensor. Similarly, systems utilizing magnetic sensors will also generally degrade over time and/or be affected by its physical environment including dust, temperature, etc. To compensate for these changes, each currency handling system 10 will typically have a measurement "bias" unique to that system caused by the state of degradation of the light sources or sensors associated with each individual system.

The present invention is designed to achieve a substantially consistent evaluation of bills between systems by "normalizing" the master information and test data to account for differences in sensors between systems. For example, where the master information and the test data comprise numerical values, this is accomplished by dividing both the threshold data and the test data obtained from each system by a reference value corresponding to the measurement of a common reference by each respective system. The common reference may comprise, for example, an object such as a mirror or piece of paper or plastic that is present in each system. The reference value is obtained in each respective system by scanning the common reference with respect to a selected attribute such as size, color content, brightness, intensity pattern, etc. The master information and/or test data obtained from each individual system is then divided by the appropriate reference value to define normalized master information and/or test data corresponding to each system. The evaluation of bills in the standard mode may thereafter be accomplished by comparing the normalized test data to normalized master information.

F. Attributes Sensed

The characteristic information obtained from the scanned bill may comprise a collection of data values each of which is associated with a particular attribute of the bill. The attributes of a bill for which data may be obtained by magnetic sensing include, for example, patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

The attributes of a bill for which data may be obtained by optical sensing include, for example, density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), reflected or transmitted intensity levels of UV light (U.S. Pat. No. 5,640,463) and other patterns of reflectance and transmission (U.S. Pat. No. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325, 364).

In addition to magnetic and optical sensing, other techniques of gathering test data from currency include electrical conductivity sensing, capacitive sensing (U.S. Pat. No. 5,122,754 [watermark, security thread]; U.S. Pat. No. 3,764,899 [thickness]; U.S. Pat. No. 3,815,021 [dielectric properties]; U.S. Pat. No. 5,151,607 [security thread]), and mechanical sensing (U.S. Pat. No. 4,381,447 [limpness]; U.S. Pat. No. 4,255,651 [thickness]). Each of the aforementioned patents relating to optical, magnetic or alternative types of sensing is incorporated herein by reference in its entirety.

V. Standard Mode/Learn Mode

The currency handling system 10 of FIG. 1 may be operated in either a "standard" currency evaluation mode or a "learn" mode. In the standard currency evaluation mode, the data obtained by the scanheads or sensors 70, is compared by the PROCESSOR 54 to prestored master information in the memory 56. The prestored master information corresponds to data generated from genuine "master" currency of a plurality of denominations and/or types. Typically, the prestored data represents an expected numerical value or range of numerical values or a pattern associated with the characteristic information scan of genuine currency. The prestored data may further represent various orientations and/or facing positions of genuine currency to account for the possibility of a bill in the stack being in a reversed orientation or reversed facing position compared to other bills in the stack.

The specific denominations and types of currency from which master information may be expected to be obtained for any particular system 10 will generally depend on the market in which the system 10 is used (or intended to be used). In European market countries, for example, with the advent of Euro currency (EC currency), it may be expected that both EC currency and a national currency will circulate in any given country. In Germany, for a more specific example, it may be expected that both EC currency and German deutsche marks (DMs) will circulate. With the learn mode capability of the present invention, a German operator may obtain master information associated with both EC and DM currency and store the information in the memory 56.

Of course, the "family" of desirable currencies for any particular system 10 or market may include more than two types of currencies. For example, a centralized commercial bank in the European community may handle several types of currencies including EC currency, German DMs, British Pounds, French Francs, U.S. Dollars, Japanese Yen and Swiss Francs. In like manner, the desirable "family" of currencies in Tokyo, Hong Kong or other parts of Asia may include Japanese Yen, Chinese Remimbi, U.S. Dollars, German DMs, British Pounds and Hong Kong Dollars. As a further example, a desirable family of currencies in the United States may include the combination of U.S. Dollars, British Pounds, German DMs, Canadian Dollars and Japanese Yen. With the learn mode capability of the present invention, master information may be obtained from any denomination of currency in any desired "family" by simply repeating the learn mode for each denomination and type of currency in the family.

This may be achieved in successive operations of the learn mode by running currency bills of the designated family, one currency denomination and type at a time, through the scanning system 10 to obtain the necessary master information. The number of bills fed through the system may be as few as one bill, or may be several bills. The bill(s) fed through the system may include good quality bill(s), poor quality bills or both. The master information obtained from the bills defines ranges of acceptability for patterns of bills of the designated denomination and type which are later to be evaluated in "standard" mode.

For example, suppose a single good quality bill of a designated denomination and type is fed through the system 10 in the learn mode. The master information obtained from the bill may be processed to define a range of acceptability for bills of the designated denomination and type. For instance, the master information obtained from the learn mode bill may define a "center" value of the range, with "deltas," plus or minus the center value, being determined by the system 10 to define the upper and lower bounds of the range. Alternatively, a range of acceptability may be obtained by feeding a group of bills through the system 10 one at a time, each bill in the group being of generally "good" quality, but differing in degree of quality from others in the group. In this example, the average value of the notes in the group may define a "center value" of a range, with values plus or minus the center value defining the upper and lower bounds of the range, as described above.

Alternatively, master information obtained from the poorest quality of the learn mode or master bills may be used to define the limits of acceptability for bills of the designated denomination and type, such that bills of the designated denomination and type evaluated in the standard mode will be accepted if they are at least as "good" in quality as the poorest quality of the learn mode or master bills. Still another alternative is to feed one or more poor quality bills through the system 10 to define "unacceptable" bill(s) of the denomination and type, such that bills of the designated denomination and type evaluated in standard mode will not be accepted unless they are better in quality than the poor quality learn mode bills.

Because the currency bills are initially unrecognizable to the currency handling system 10 in the learn mode, the operator must inform the system 10 (by means of operator interface panel 32 or external signal, for example) which denomination and type of currency it is "learning," so that the system 10 may correlate the master information it obtains (and stores in memory) with the appropriate denomination, type and "acceptability" of the bill(s).

For purposes of illustration, suppose that an operator desires to obtain master information for $5 and $10 denominations of U.S. and Canadian Dollars. In one embodiment, this may be achieved by instructing the system 10, by means of an operator interface panel 32 or external signal, to enter the learn mode and that it will be reading a first denomination and type of currency (e.g., $5 denominations of U.S. currency). In one embodiment, the operator may further instruct the system 10 which type of learn mode sensor(s) it should use to obtain the master information and/or what type of characteristic information it should obtain to use as master information. The operator may then insert a single good-quality $5 dollar U.S. bill (or a number of such bills) in the hopper 36 and feed the bill(s) through the system to obtain master information from the bill(s) from a designated combination of learn mode sensors.

In an alternate embodiment, where a single bill is fed through the system 10, suppose that an arbitrary value "x" is obtained from the learn mode sensors. The system 10 may define the value "x" to be a center value of an "acceptable" range for $5 dollar U.S. bills. The system 10 may further define the values "1.2x" and "0.8x" to comprise the upper and lower bounds of the "acceptable" range for $5 dollar U.S. bills. Alternatively, where multiple $5 dollar U.S. bills, each bill being of generally "good" quality, are fed through the system 10, (and again using the arbitrary sensor value "x" for purposes of illustration), suppose that the average sensor value obtained from the bills is "1.1×". The system 10 in this case may define the "acceptable" range for $5 dollar U.S. bills to be centered at the average sensor value "1.1×" with the values "1.3×" and "0.9×x" defining the respective upper and lower bounds of the range. Alternatively, where multiple $5 dollar U.S. bills are fed through the system 10, suppose that sensor values obtained in the learn mode range between "1.4×" and "0.9×". The system 10 may define the values "1.4×" and "0.9×" to be the upper and lower bounds of the "acceptable range" for $5 dollar U.S. bills, without regard to the average value. As still another example, suppose that the operator feeds two poor quality U.S. $5 dollar bills through the system 10, and suppose that sensor readings of "1.5×" and "0.7×" are obtained from the poor quality bills. The system 10 may then determine the range of acceptability for U.S. $5 dollar bills to be between the values of "0.7×" and "1.5×."

Next, after master information has been obtained from U.S. $5 dollar bills, the operator feeds the next bill(s) through the system 10, and the system scans the bills to obtain master information from the bills, in any of the manners heretofore described. In one embodiment, the operator may instruct the system 10 which type of learn mode sensor(s) it should use to obtain the master information. Alternatively, the operator may instruct the system 10 which type of master information is desired, and the system 10 automatically chooses the appropriate learn mode sensor (s). For example, an operator may wish to use optical and magnetic sensors for U.S. currency and optical sensors for Canadian currency.

After the operator has obtained master information from each desired currency denomination and type, the operator instructs the system 10 to enter the "standard" mode, or to depart the "learn" mode. The operator may nevertheless re-enter the learn mode at a subsequent time to obtain master information from other currency denominations, types and/ or series.

It will be appreciated that the sensors used to obtain master information in the learn mode may be either separate from or the same as the sensors used to obtain data in the standard mode.

Not only can the currency handling system 10 in the learn mode add master information of new currency denominations, but the system 10 may also replace existing currency denominations. If a country replaces an existing currency denomination with a new bill type for that denomination, the currency handling system 10 may learn the new bill's characteristic information and replace the previous master information with new master information. For example, the operator may use the operator interface 32 to enter the specific currency denomination to be replaced. Then, the master currency bills of the new bill type may be conveyed through the currency handling system 10 and scanned to obtain master information associated with the new bill's characteristic information, which may then be stored in the memory 56. Additionally, the operator may delete an existing currency denomination stored in the memory 56 through the operator interface 32. In one embodiment, the operator must enter a security code to access the learn mode. The security code ensures that qualified operators may add, replace or delete master information in the learn mode.

Figure 21:
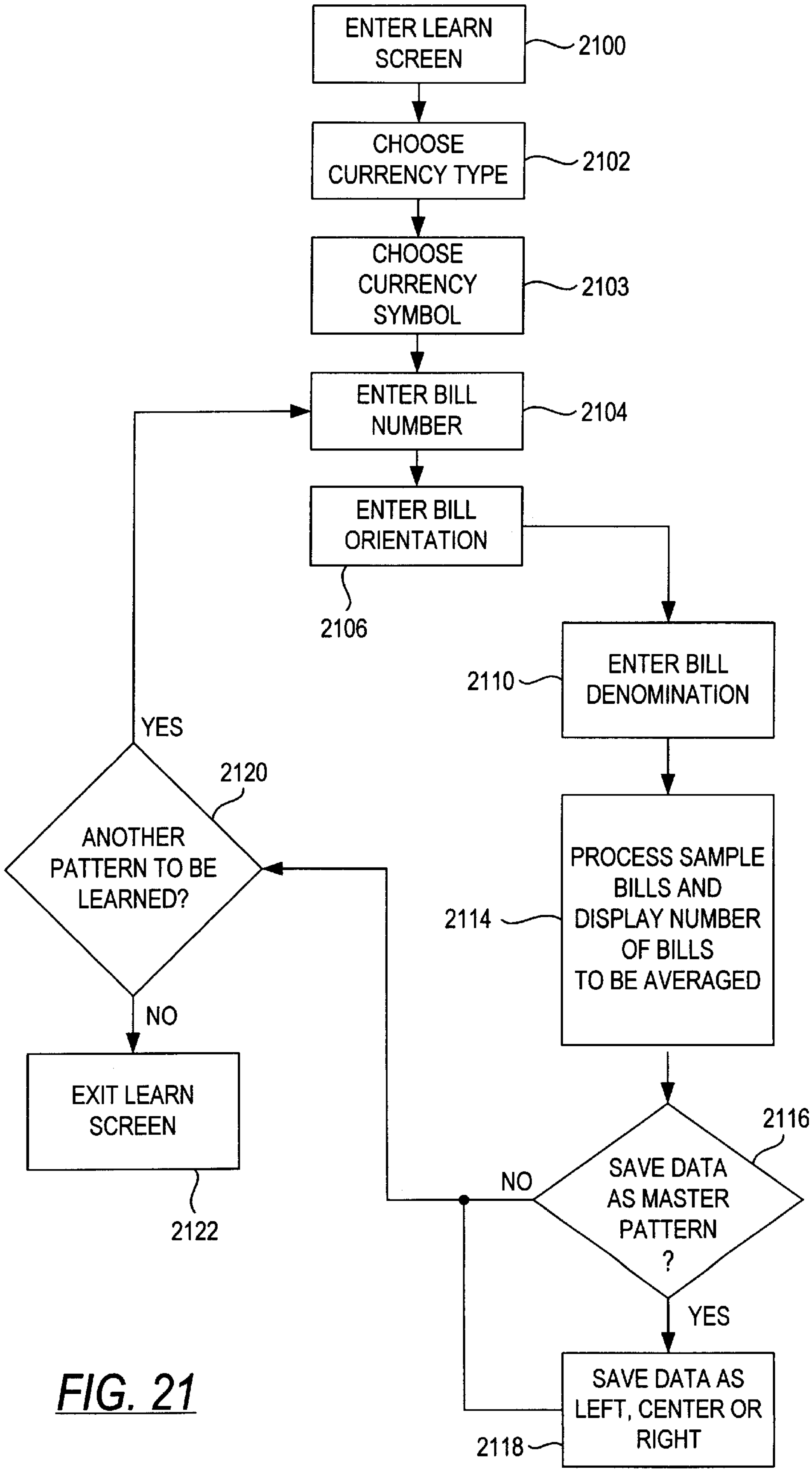
FIG. 21 is a flow chart of one embodiment of the learn mode.

One embodiment of how the learn mode functions is set forth in the flow chart illustrated in FIG. 21. First the operator enters the learn screen at step 2100 by pressing a key, such as a "MODE" key, on the operator interface panel 32. Next the operator chooses the currency type of the bills to be processed in the learn mode at step 2102 by scrolling through the list of currency types that are displayed on the screen when the learn mode is entered at step 2100. The operator chooses the desired currency type by aligning the cursor with the desired currency type displayed on the screen and pressing a key such as the "MODE" key. The operator then chooses the currency symbol associated with the currency type to be processed at step 2103 by scrolling through the list of currency symbols displayed on the screen after the currency type has been chosen. The operator chooses the desired currency symbol by again aligning the cursor with the desired symbol displayed on the screen and pressing the "MODE" key.

This advances the program to step 2104 where the operator enters the bill number, which is used to identify the different denomination or series of a bill for any given currency type. For example, different types of currency have denominations that have more than one series, e.g., there are two series of U.S. $100 bills, one with the old design and one with the new design. In this embodiment of the system 10, up to nine bill denominations and/or series can be learned. Here again, the display contains a menu of the available bill numbers (1–9), and the operator selects the desired bill number by aligning the cursor with the desired bill number and pressing the "MODE" key. Next, at step 2106, the operator enters the orientation of the bill, i.e., face up bottom edge forward, face up top edge forward, face down bottom edge forward or face down top edge forward.

From the above selections, the system 10 determines what master information to learn from the bill(s) to be processed in the learn mode. Then, the operator in step 2110 enters the bill denomination either by scrolling through a displayed menu of the denominations corresponding to the currency type entered in step 2102, or in an alternate embodiment, by pressing one of the denomination keys to identify the particular denomination to be learned. The system 10 automatically changes the denomination associated with the denomination keys to correspond to the denominations available for the currency type entered in step 2102. When the operator enters the denomination, the system 10 advances to step 2114 where the system processes the sample bills and displays the number of sample bills to be averaged. This step is described in further detail in connection with FIG. 22. For example, it may be desirable to average several different bills of the same denomination, but in different conditions, e.g., different degrees of wear, so that the patterns of a variety of bills of the same denomination, but of different conditions, can be averaged. Up to nine bills can be averaged to create a master pattern in this embodiment of the system 10. Typically, however, only one bill needs to be processed to generate master pattern data sufficient to authenticate a particular currency type and denomination in standard mode. This pattern averaging procedure is described in more detail in U.S. Pat. No. 5,633,949.

At step 2114, the system prompts the operator via the screen display to load the sample bill into the input hopper and then press a key, such as a "START" key. The bill is processed by the system 10 by being fed into the transport mechanism of the system 10. As the bill is fed through the system 10, the system scans the bill and adds the new information to the master pattern data corresponding to the scanned bill, as described in more detail in connection with FIG. 23. Eventually, the master pattern data will be averaged.

The operator is prompted at step 2116 to save the data corresponding to the characteristics learned. The operator saves the data corresponding to the characteristics learned as a master pattern by selecting "YES" from the display menu by aligning the cursor at "YES" and pressing a key such as the "MODE" key. Similarly, to continue without storing the data, the operator selects "NO" from the display menu by aligning the cursor over "NO" and pressing the "MODE" key. An operator may decide not to save the data if, while learning one denomination, the operator decides to learn another currency denomination and/or type. If the operator saves the data, the operator will next decide whether to save the data as left, center or right master data. These positions refer to where in relation to the edges of the input hopper 36 the bill was located when it entered the transport mechanism 38. The system 10 has an adjustable hopper 36 so if bills of one denomination are being processed, all the bills are fed down the center of the transport mechanism. However, if mixed denominations are being processed in the standard mode from a currency type that had different size denominations, then the hopper would have to be adjusted to accommodate the maximum size bill in the stack. Thus, a narrower dimension bill could shift in the hopper such that the data scanned from the bill would vary according to where in the hopper the bill entered the transport mechanism. Accordingly, in learn mode, master data scanned from a bill varies according to where in the input hopper the bill enters the transport mechanism. Therefore, the lateral position of the bill may either be communicated to the system 10 so the learned data can be stored in an appropriate memory location corresponding to the lateral position of the bill, or the system 10 can automatically determine the lateral position of the bill by use of the "X" sensors 1502*a,b*.

In step 2120, the operator is prompted regarding whether or not another pattern is to be learned. If the operator decides to have the system 10 learn another pattern, the operator selects "YES" from the display menu by aligning the cursor at "YES". If another pattern is to be learned, steps 2104–2120 are repeated. If the operator chooses not to learn another characteristic by selecting "NO", then the system 10 in step 2122 will exit the learn screen. Thereafter, the operator may learn another set of currency denominations from another country by re-entering the learn screen at step 2100.

Figure 22:
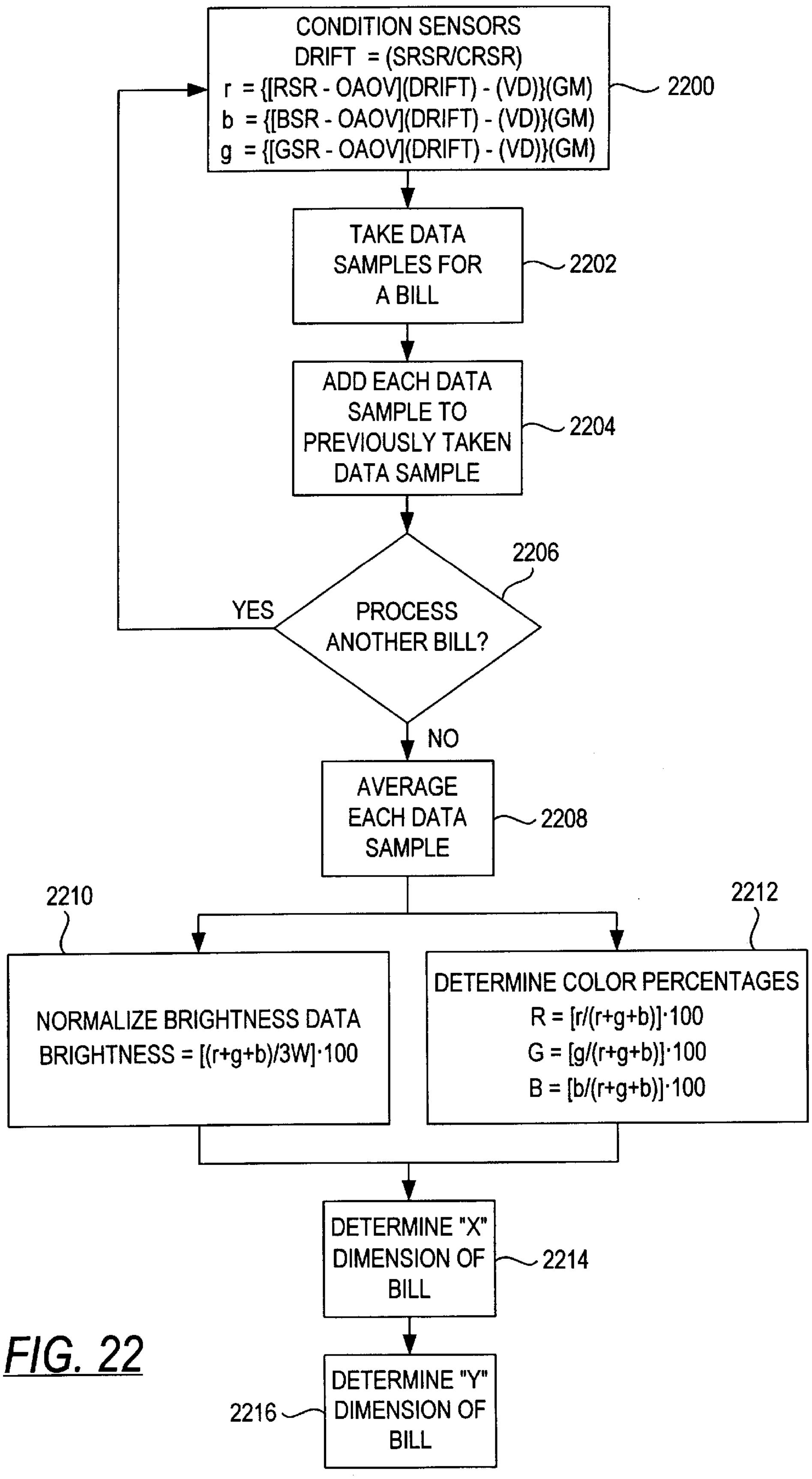
FIG. 22 is a flow chart further defining a step of the flow chart of FIG. 21.

The details of how the system 10 processes the sample bills in step 2114 is illustrated in the flow chart of FIG. 22. For each data sample for each pattern to be learned, the system 10 in step 2200 conditions the sensors. Four equations are used in adjusting the sensors. The first equation is the drift light intensity equation:

$$\text{DRIFT}=(SRSR/CRSR)$$

The light intensity drift (drift) is calculated by dividing a stored reference sensor reading SRSR by the current reference sensor reading. The stored reference sensor reading corresponds to the signal produced by the light intensity reference sensor at calibration time. The reference sensor 350 is illustrated in FIG. 13*b*. The adjusted red (r) or red hue, the adjusted blue (b) or blue hue and the adjusted green (g) or green hue are calculated from the following formulas:

$$r=\{[RSR-OAOV](\text{DRIFT})-(VD)\}(GM)$$

$$b=\{[BSR-OAOV](\text{DRIFT})-(VD)\}(GM)$$

$$g=\{[GSR-OAOV](\text{DRIFT})-(VD)\}(GM)$$

The sensor readings RSR, BSR and GSR are measured in millivolts (mv). OAOV is the op-amp offset voltage which is an empirically derived error voltage obtained by reading the sensors with the fluorescent light tubes turned off and is typically between 50 mv and 1,000 mv. Drift indicates the change in light intensity. VD (dark voltage) which represents internal light reflections is obtained by reading the sensors with the fluorescent light tubes on when a non-reflective black calibration standard material is placed in front of the sensors. The gain multiplier (GM) is an empirically derived constant obtained at calibration time from the following equation:

$$GM=W/(WSR-OAOV)$$

where WSR is a variable corresponding to the white sensor reading, i.e., the voltage measured when a white calibration standard is present in front of the sensors, OAOV is the op-amp offset voltage, and W is a constant corresponding to the voltage that the sensors should give when a white calibration standard is present in front of the sensors (generally, W=2.5 v). In step 2202, the system 10 takes data samples for the bill currently being scanned. For example, 64 data samples can be taken at various points along a bill.

In step 2204, each data sample is added to the previously taken corresponding data sample (or to zero if this is the first bill processed). For example, if 64 data samples are taken, each of the 64 data samples is added to the respective data sample(s) previously taken and stored in memory.

In step 2206, the operator is prompted regarding whether or not to process another bill to create the master pattern data. If the operator decides to process another bill, the operator selects "YES" from the display menu by aligning the cursor at "YES" and pressing the "MODE" key. If another bill of the same currency type and denomination is to be processed (for pattern averaging purposes), steps 2200–2206 are repeated. If the operator chooses not to process another bill by selecting "NO", then the system 10 proceeds to step 2208 where the averages of the summed data samples are computed. The average is computed by taking each sum from step 2204 and dividing by the number of bills processed. For example, if 64 data samples were taken from three bills, the sum of each of the 64 data samples is divided by three. Next, the system 10 determines the color percentages in step 2212. Three equations are used to determine the color percentages, namely:

$$R=[r/(r+g+b)]\cdot 100$$

$$G=[g/(r+g+b)]\cdot 100$$

$$B=[b/(r+g+b)]\cdot 100$$

The first equation determines the percentage of red reflected from the bill. This is calculated by dividing the adjusted red value r by the sum of the adjusted red, green and blue values r, g and b from step 2200 and multiplying that result by 100. The percentage of green and blue is found in a similar manner from the second and third equations, respectively.

Simultaneously, the system 10 normalizes the brightness data in step 2210. The brightness data corresponds to the intensity of the light reflected from the bill. The equation used to normalize the brightness data is:

$$\text{BRIGHTNESS}=[(r+g+b)/3W]\cdot 100$$

In that equation, W is the same as defined above. Then, the system 10 in step 2214 determines the "X" (or long)

dimension of the bill. The system 10 then determines in step 2216 the "Y" (or narrow) dimension of the bill. The details of how the bill size is determined were detailed above in section B. Size.

VI. Brightness Correlation Technique

The result of using the normalizing equations above is that, subsequent to the normalizing process, a relationship of correlation exists between a test brightness pattern and a master brightness pattern such that the aggregate sum of the products of corresponding samples in a test brightness pattern and any master brightness pattern, when divided by the total number of samples, equals unity if the patterns are identical. Otherwise, a value less than unity is obtained. Accordingly, the correlation number or factor resulting from the comparison of normalized samples, within a test brightness pattern, to those of a stored master brightness pattern provides a clear indication of the degree of similarity or correlation between the two patterns. Accordingly a correlation number, C, for each test/master pattern comparison can be calculated using the following formula:

$$C = \frac{\sum_{i=0}^{n} X_{ni} \cdot X_{mi}}{n} \qquad 4$$

wherein $X_{ni}$ is an individual normalized test sample of a test pattern, $X_{mi}$ is a master sample of a master pattern, and n is the number of samples in the patterns. According to one embodiment of this invention, the fixed number of brightness samples, n, which are digitized and normalized for a test bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In a one embodiment, for instance, the factor of unity which results when a hundred percent correlation exists is represented in terms of the binary number $2^{10}$, which is equal to a decimal value of 1024. Using the above procedure, the normalized samples within a test pattern are compared to the master characteristic patterns stored within the system memory in order to determine the particular stored pattern to which the test pattern corresponds most closely by identifying the comparison which yields a correlation number closest to 1024.

The correlation procedure is adapted to identify the two highest correlation numbers resulting from the comparison of the test brightness pattern to one of the stored master brightness patterns. At that point, a minimum threshold of correlation is required to be satisfied by these two correlation numbers. It has experimentally been found that a correlation number of about 850 serves as a good cut-off threshold above which positive calls may be made with a high degree of confidence and below which the designation of a test pattern as corresponding to any of the stored patterns is uncertain. As a second thresholding level, a minimum separation is prescribed between the two highest correlation numbers before making a call. This ensures that a positive call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no positive identification can be made.

In some cases a bi-level threshold of correlation is required to be satisfied before a particular call is made. The correlation procedure is adapted to identify the two highest correlation numbers resulting from the comparison of the test pattern to one of the stored patterns. A minimum threshold of correlation is required to make a positive call. It has experimentally been found that a correlation number of about 850 serves as a good cut-off threshold above which positive calls may be made with a high degree of confidence and below which the designation of a test pattern as corresponding to any of the stored patterns is uncertain. As a second threshold level, a minimum separation is prescribed between the two highest correlation numbers before making a call. This ensures that a positive call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no call is made. If the PROCESSOR 54 determines that the scanned bill matches one of the master sample sets, the PROCESSOR 54 makes a "positive" call having identified the scanned currency. If a "positive" call can not be made for a scanned bill, an error signal is generated.

VII. Color Correlation Technique

One embodiment of how the system 10, in standard mode, compares and discriminates a bill is set forth in the flow chart illustrated in FIGS. 23*a*–23*d*. A bill is first scanned in standard mode by 3 of the 5 scanheads and the standard scanhead in step 2300. The three scanheads are located at various positions along the width of the bill transport path so as to scan various areas of the bill being processed. The system next determines in step 2305 the lateral position of the bill in relation to the bill transport path by using the "X" sensors. In step 2310, initializing takes place, where the best and second best correlation results (from previous correlations at step 2360, if any), referred to as the "#1 and #2 answers" are initialized to zero. The system 10 determines, in step 2315, whether the size of the bill being processed (the test bill) is within the range of the master size data corresponding to one denomination of bill for the country selected. If the size is not within the range, the system 10 proceeds to point B. If the system 10 determines in step 2315 that the size of the test bill is within the range of the master size data, the system proceeds to step 2320, where the system points to a first orientation color pattern.

Next, the system 10, in step 2325, computes the absolute percentage difference between the test pattern and the master pattern on a point by point basis. For example, where 64 sample points are taken along the test bill to form the test pattern, the absolute percentage differences between each of the 64 sample points from the test bill and the corresponding 64 points from the master pattern are computed by the PROCESSOR 54. Then, the system 10 in step 2335 sums the absolute percentage differences from step 2330 for each of the master patterns stored in memory.

In an alternative embodiment, the red and green color master patterns are usually stored in memory because the third primary color, blue, is redundant, since the sum of the percentages of the three primary colors must equal 100%. Thus, by storing two of these percentages, the third percentage can be derived. Thus, in an alternate embodiment, each color cell 334 could include only two color sensors and two filters. Thus, in this context, "full color sensor" could also refer to a system which employs sensors for two primary colors, and a processor capable of deriving the percentage of the third primary color from the percentages of the two primary colors for which sensors are provided.

The system 10 in step 2340 proceeds by summing the result of the red and green sums from step 2335. The total from step 2340 is compared with a threshold value at step 2350. The threshold value is empirically derived and corresponds to a value that produces an acceptable degree of error between making a good call and making a mis-call. If the total from step 2340 is not less than the threshold value, then the system proceeds to step 2365 (point D) and points to the next orientation pattern, if all orientation patterns have not been completed (step 2370) the system returns to step 2330 and the total from step 2340 is compared to the next master color pattern corresponding to the bill position determination made in step 2305. The system 10 again determines, in step 2350, whether the total from step 2340 is less than the threshold value. This loop proceeds until the total is found to be less than the threshold. Then, the system 10 proceeds to step 2360 (point C).

At step 2360, the test bill brightness or intensity pattern is correlated with the first master brightness pattern that corresponds to the bill position determination made in step 2305. The correlation between the test pattern and the master pattern for brightness is computed in the manner described above under "Brightness Correlation Technique." Then, in step 2370 the system determines whether all orientation patterns have been used. If not, the system returns to step 2330 (point E). If so, the system proceeds to step 2375.

In step 2375, the process proceeds by pointing to the next master bill pattern in memory.

The brightness patterns may include several shifted versions of the same master pattern because the degree of correlation between a test pattern and a master pattern may be negatively impacted if the two patterns are not properly aligned with each other. Misalignment between patterns may result from a number of factors. For example, if a system is designed so that the scanning process is initiated in response to the detection of the thin borderline surrounding U.S. currency or the detection of some other printed indicia such as the edge of printed indicia on a bill, stray marks may cause initiation of the scanning process at an improper time. This is especially true for stray marks in the area between the edge of a bill and the edge of the printed indicia on the bill. Such stray marks may cause the scanning process to be initiated too soon, resulting in a scanned pattern which leads a corresponding master pattern. Alternatively, where the detection of the edge of a bill is used to trigger the scanning process, misalignment between patterns may result from variances between the location of printed indicia on a bill relative to the edges of a bill. Such variances may result from tolerances permitted during the printing and/or cutting processes in the manufacture of currency. For example, it has been found that location of the leading edge of printed indicia on Canadian currency relative to the edge of Canadian currency may vary up to approximately 0.2 inches (approximately 0½ cm).

Accordingly, the problems associated with misaligned patterns are overcome by shifting data in memory by dropping the last data sample of a master pattern and substituting a zero in front of the first data sample of the master pattern. In this way, the master pattern is shifted in memory and a slightly different portion of the master pattern is compared to the test pattern. This process may be repeated, up to a predetermined number of times, until a sufficiently high correlation is obtained between the master pattern and the test pattern so as to permit the identity of a test bill to be called. For example, the master pattern may be shifted three times to accommodate a test bill that has its identifying characteristic(s) shifted 0.2 inches from the leading edge of the bill. To do this, three zeros are inserted in front of the first data sample of the master pattern.

One embodiment of the pattern shifting technique described above is disclosed in U.S. Pat. No. 5,724,438 entitled "Method of Generating Modified Patterns and Method and Apparatus for Using the Same in a Currency Identification System," which is incorporated herein by reference.

Figure 23A:
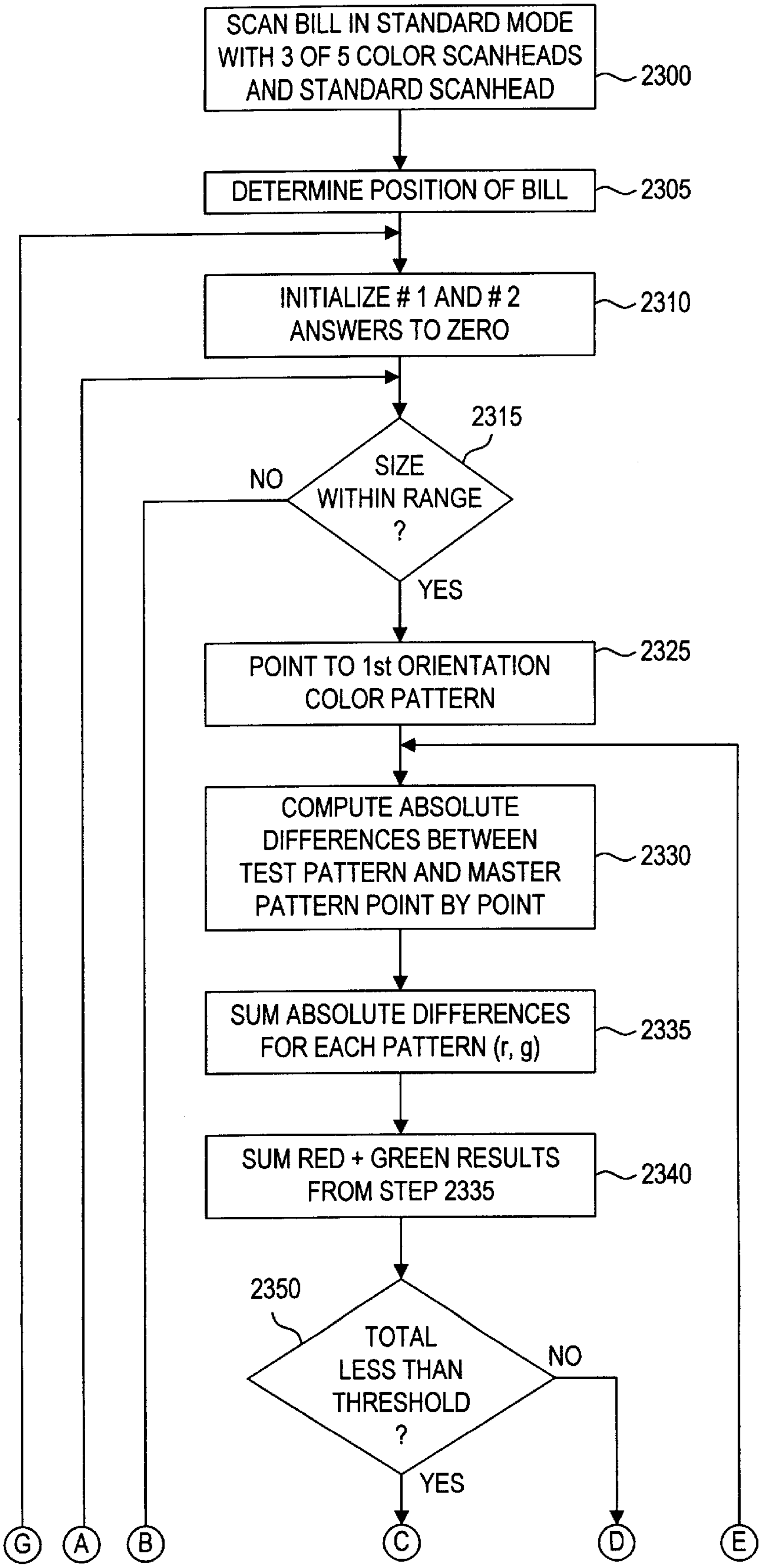
FIGS. 23*a–d* are a flow chart of one embodiment of how the system operates in standard bill evaluation mode.
Figure 23B:
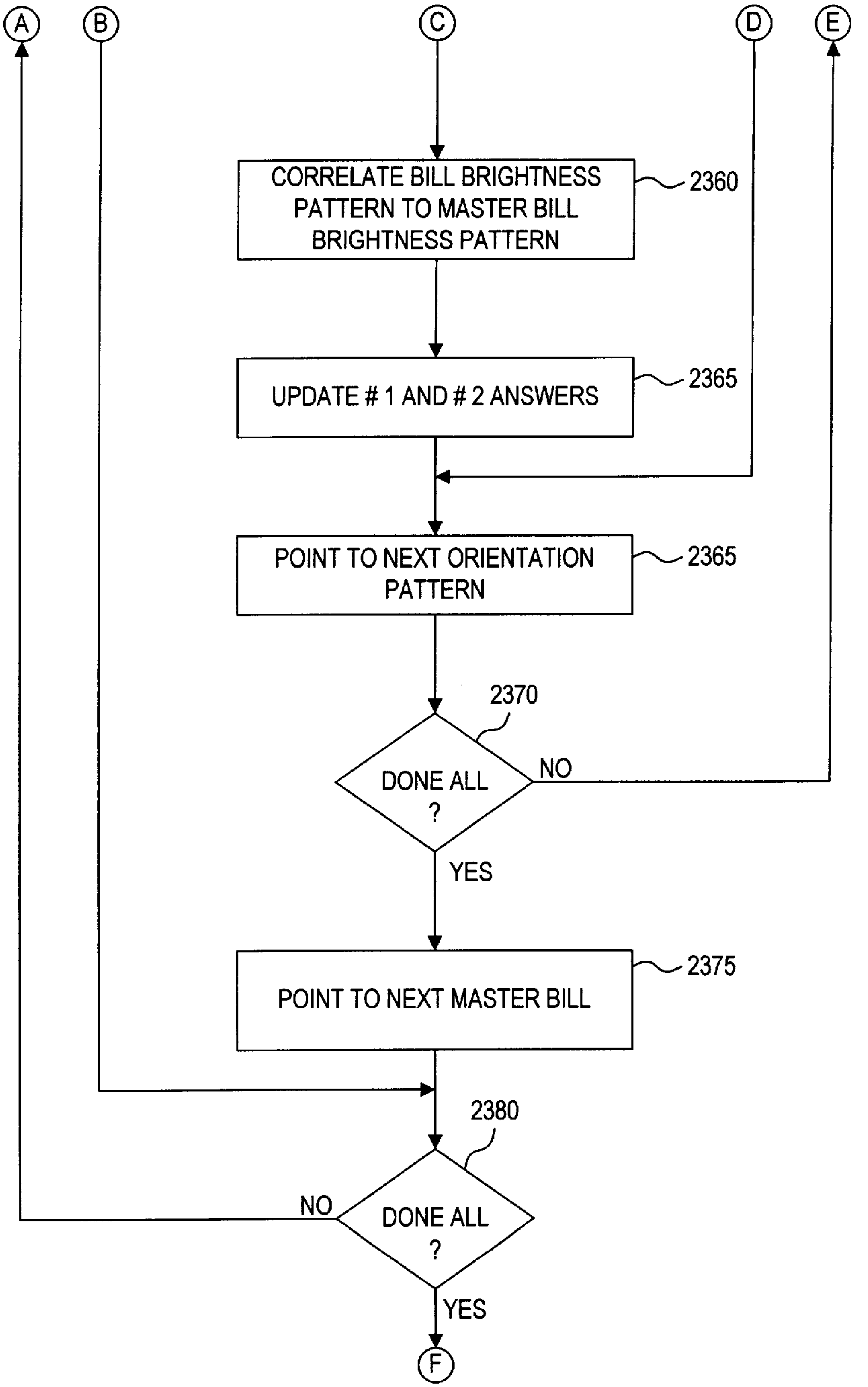

Returning to the flow chart at FIG. 23*b,* the system 10 in step 2380 determines whether all of the master bill patterns have been used. If not the process returns to step 2315 (point A). If so, the process proceeds to step 2395 (point F—see FIG. 23*c*).

The best two correlations are determined by a simple correlation procedure that processes digitized reflectance values into a form which is conveniently and accurately compared to corresponding values pre-stored in an identical format. This is detailed above in the sections on Normalizing Technique and Correlation Technique for the Brightness Samples.

Figure 23C:
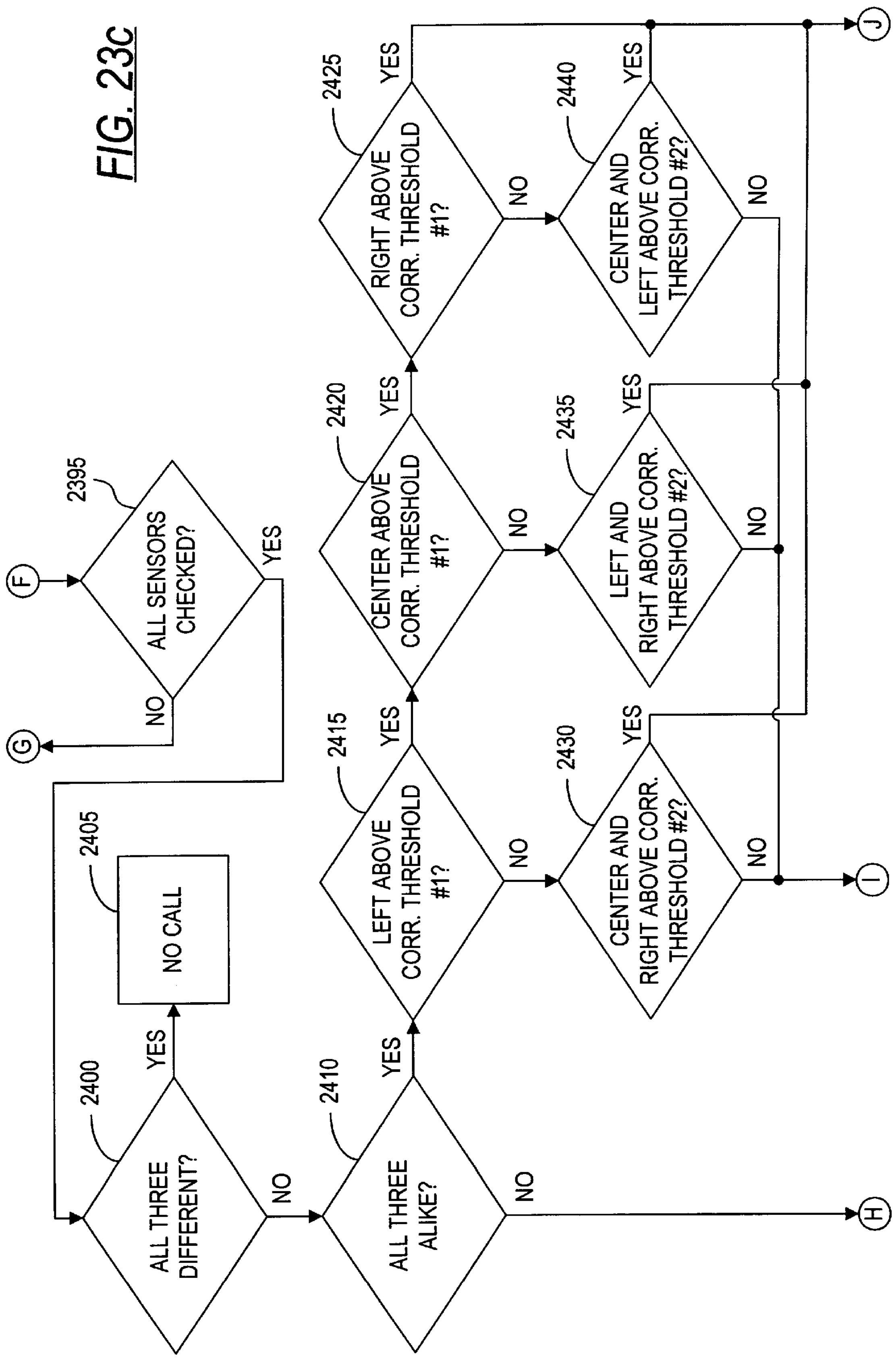
Figure 23D:
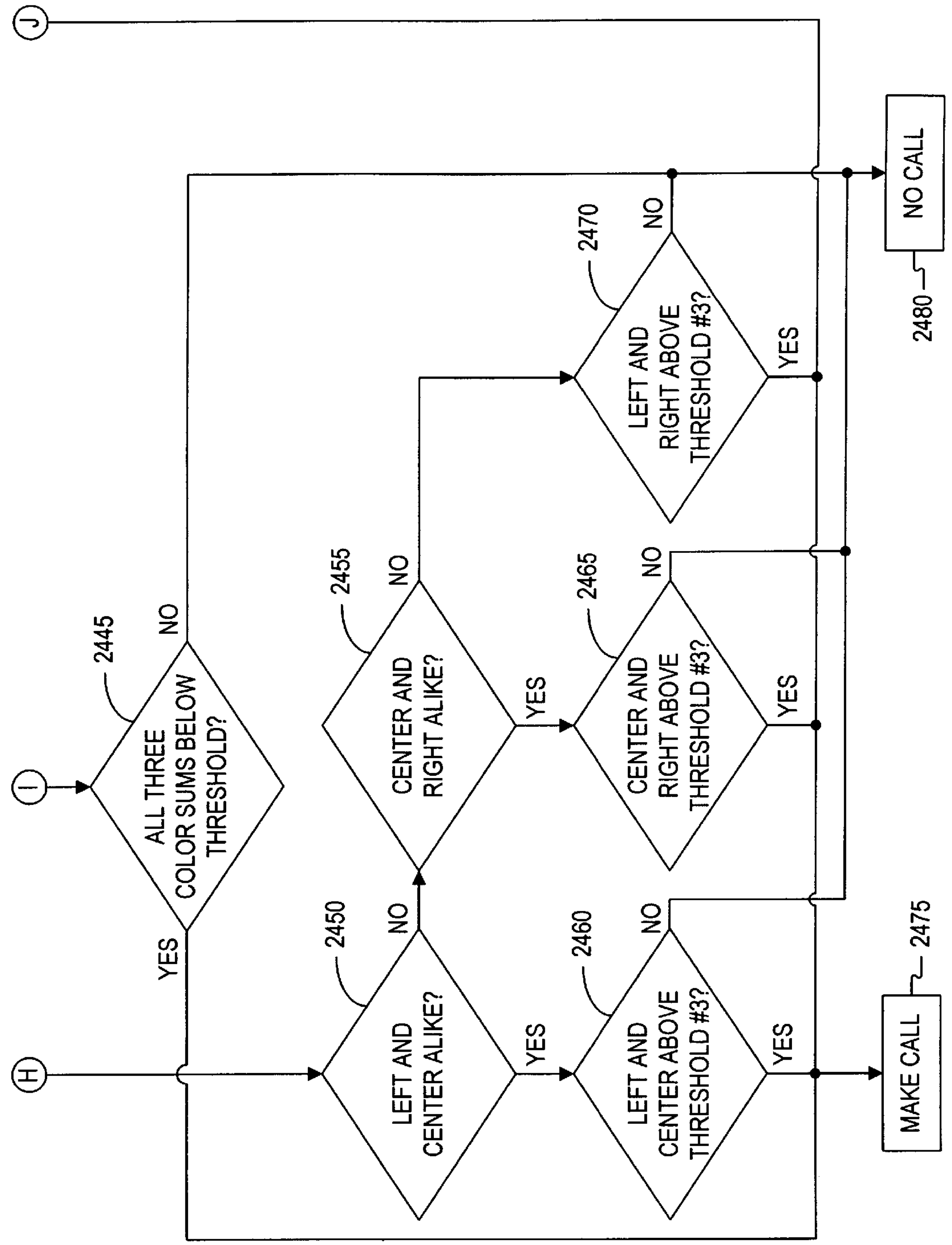

Referring to FIGS. 23*c–d,* the system 10 determines, in step 2395, whether all the sensors have been checked. If the master patterns for all of the sensors have not been checked against the test bill, the system 10 loops to step 2310. Steps 2310–2395 are repeated until all the sensors are checked. Then, the system 10 proceeds to step 2400 where the system 10 determines whether the results for all three sensors are different, i.e., whether they each selected a different master pattern. If each sensor selected a different master pattern, the system 10 displays a "no call" message to the operator indicating that the bill can not be denominated. Otherwise, the system 10 proceeds to step 2410 where the system 10 determines whether the results for all three sensors are alike, i.e., whether they all selected the same master pattern. If each sensor selected the same master pattern, the system 10 proceeds to step 2415. Otherwise, the system 10 proceeds to step 2450 (FIG. 23*d*), to be discussed below.

At step 2415, the system 10 determines whether the left sensor reading is above correlation threshold number one. If it is, the system 10 proceeds to step 2420. Otherwise, the system 10 proceeds to step 2430, to be discussed below. At step 2420, the system 10 determines whether the center sensor reading is above correlation threshold number one. If it is, the system 10 proceeds to step 2425. Otherwise, the system 10 proceeds to step 2435, to be discussed below. At step 2425, the system 10 determines whether the right sensor reading is above correlation threshold number one. If it is, the system 10 proceeds to step 2475 where the denomination of the bill is called. Otherwise, the system 10 proceeds to step 2440, to be discussed below.

At step 2430, the system 10 determines whether the center and right sensor readings are above correlation threshold number two. If they are, the system 10 proceeds to step 2475 (FIG. 23*d*) where the denomination of the bill is called. Otherwise, the system 10 proceeds to step 2445 (FIG. 23*d*), to be discussed below. At step 2435, the system 10 determines whether the left and right sensor readings are above correlation threshold number two. If they are, the system 10 proceeds to step 2475 where the denomination of the bill is called. Otherwise, the system 10 proceeds to step 2445, to be discussed below. At step 2440, the system 10 determines whether the center and left sensor readings are above correlation threshold number two. If they are, the system 10 proceeds to step 2475 where the denomination of the bill is called. Otherwise, the system 10 proceeds to step 2445 where the system 10 determines whether all three color sums are below a threshold. If they are, the system 10 proceeds to step 2475 where the denomination of the bill is called. Otherwise, the system 10 proceeds to step 2480 where the system 10 displays a "no call" message to the operator indicating that the bill can not be denominated.

At step 2410 the system 10 determined whether the results for all three of the sensors 2410 were alike, i.e., whether the master pattern denomination selected for each sensor is the same. If the results for all three sensors were not alike, the system 10 proceeded to step 2450 where the system 10 determines whether the left and center sensors are alike, i.e., whether they selected the same master pattern. If they did select the same master pattern, the system 10 proceeds to step 2460. Otherwise, the system 10 proceeds to step 2455, to be discussed below. At step 2455, the system 10 determines whether the center and right sensors are alike, i.e., whether they selected the same master pattern. If they did select the same master pattern, the system 10 proceeds to step 2465. Otherwise, the system 10 proceeds to step 2470, to be discussed below. At step 2465, the system 10 determines whether the center and right sensor readings are above threshold number three. If they are, the system 10 proceeds to step 2475 where the denomination of the bill is called. Otherwise, the system 10 proceeds to step 2480 where the system 10 displays a "no call" message to the operator indicating that the bill can not be denominated.

The system proceeded to step 2460 if the results of the left and center sensor readings were alike, i.e., selected the same master pattern. At step 2460, the system 10 determines whether the left and center sensor readings are above threshold number three. If they are, the system 10 proceeds to step 2475 where the denomination of the bill is called. Otherwise, the system 10 proceeds to step 2480 where the system 10 displays a "no call" message to the operator indicating that the bill can not be denominated.

Figure 24A:
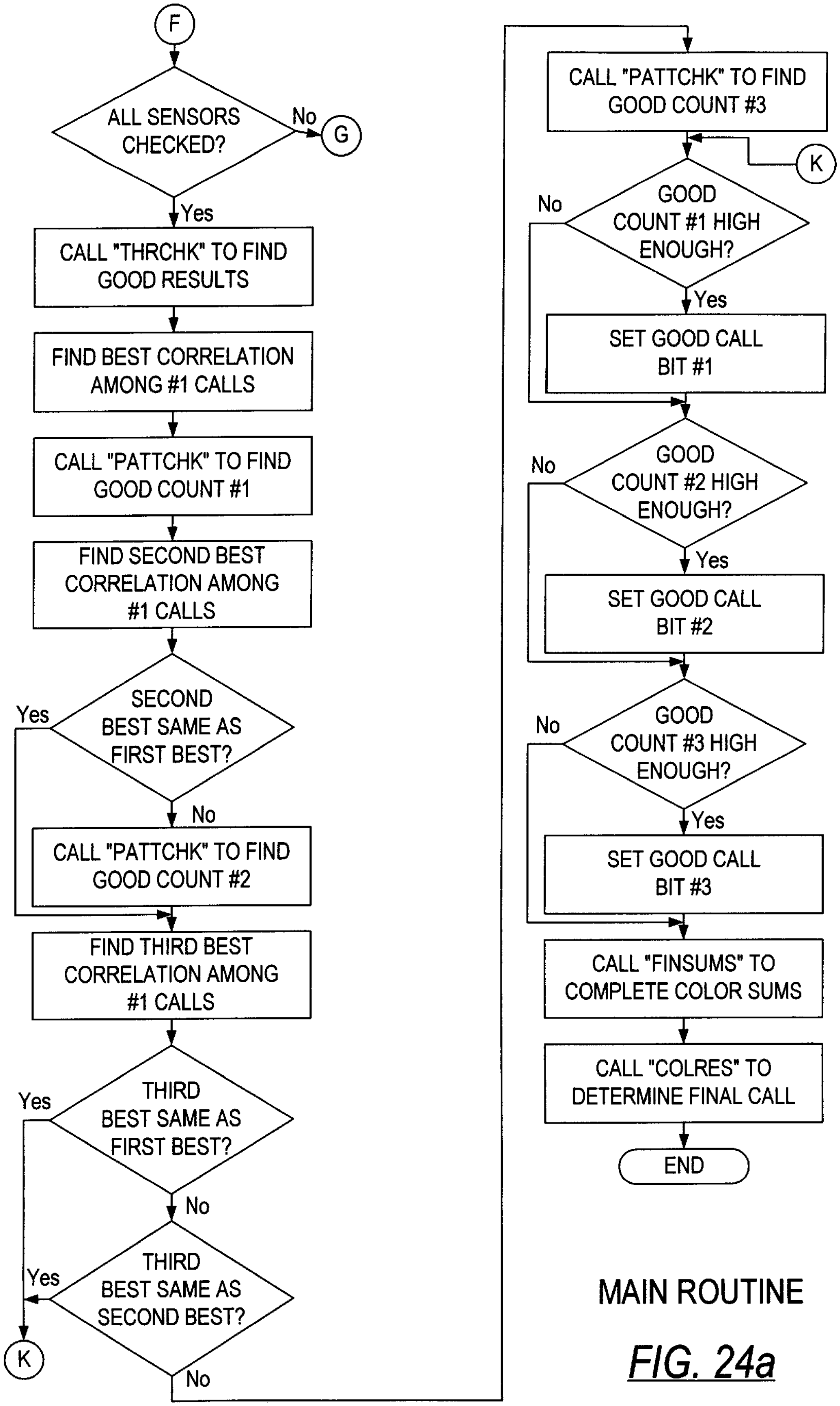
FIGS. 24*a–h* are flow charts of another embodiment of the color correlation scheme shown in FIGS. 23*c–d*.
Figure 24B:
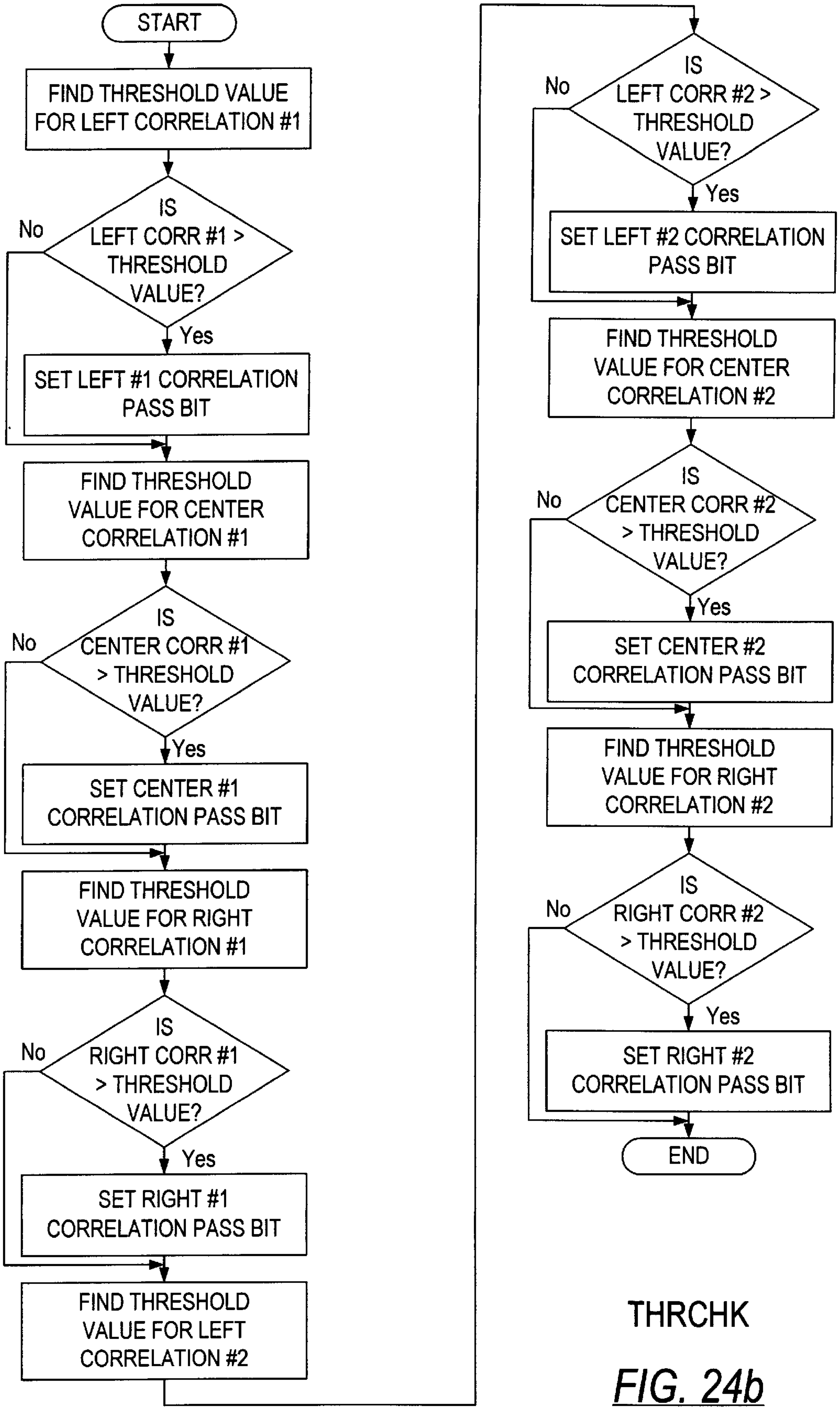
Figure 24C:
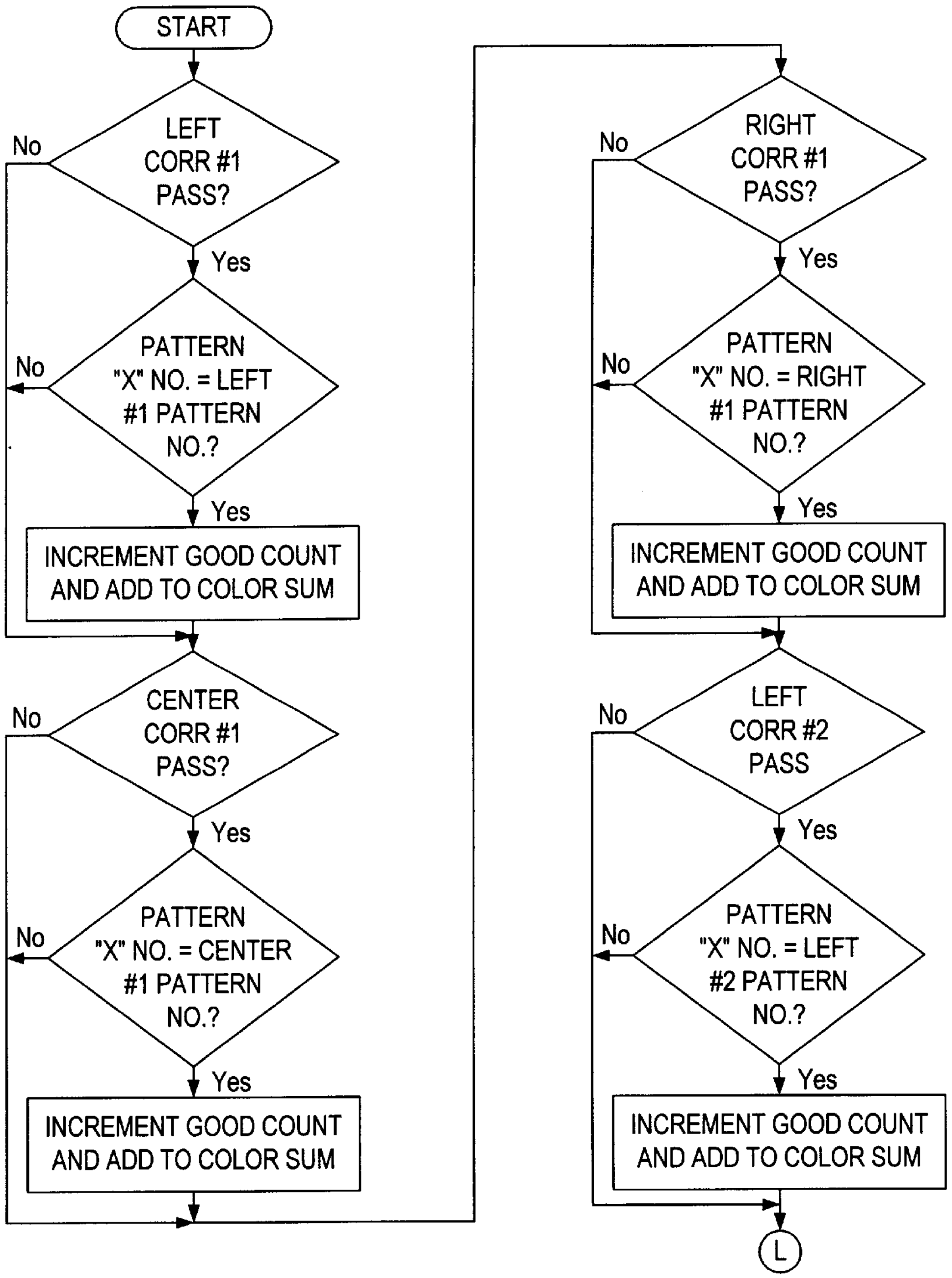
Figure 24D:
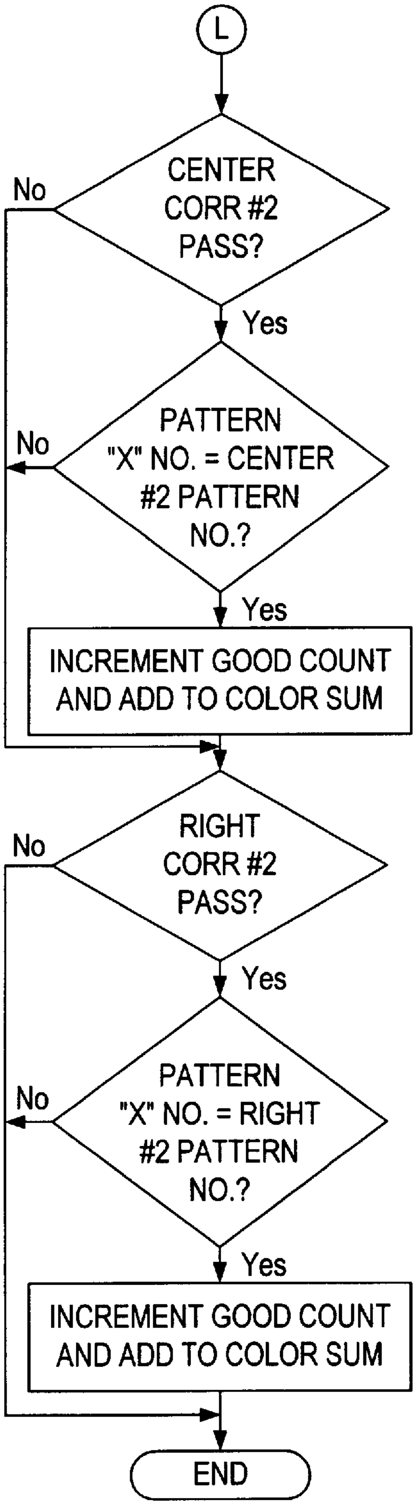
Figure 24E:
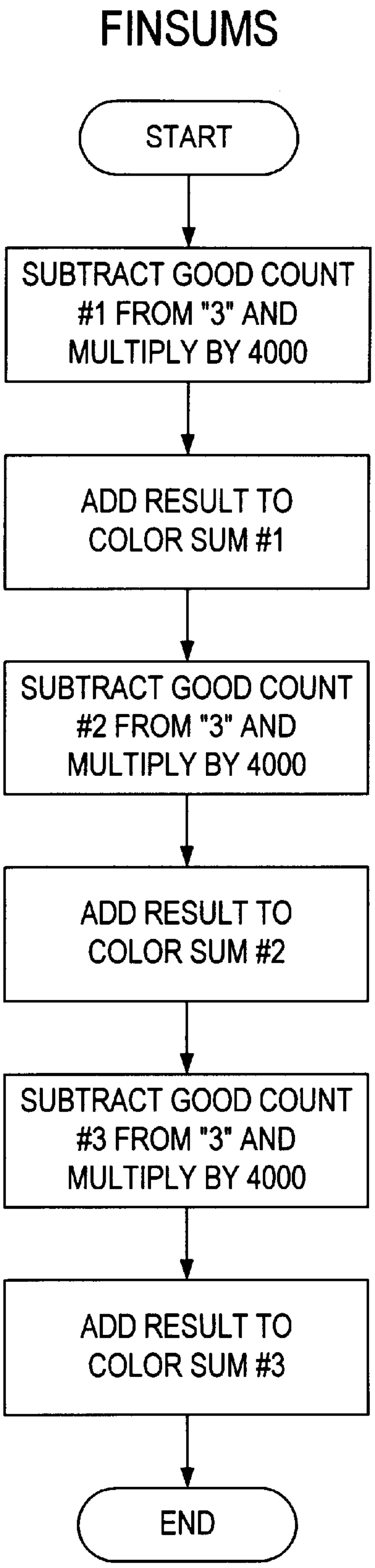
Figure 24F:
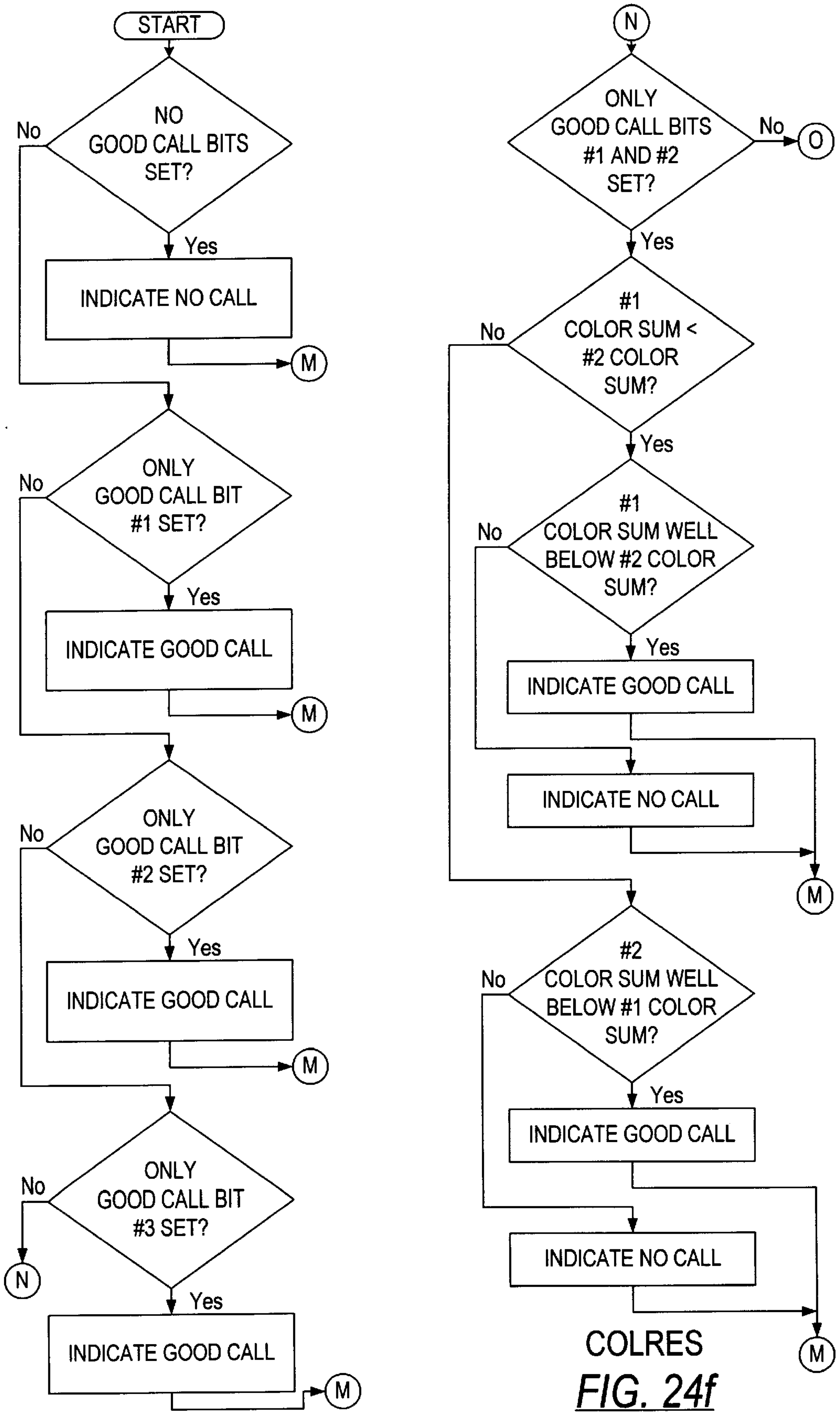
Figure 24G:
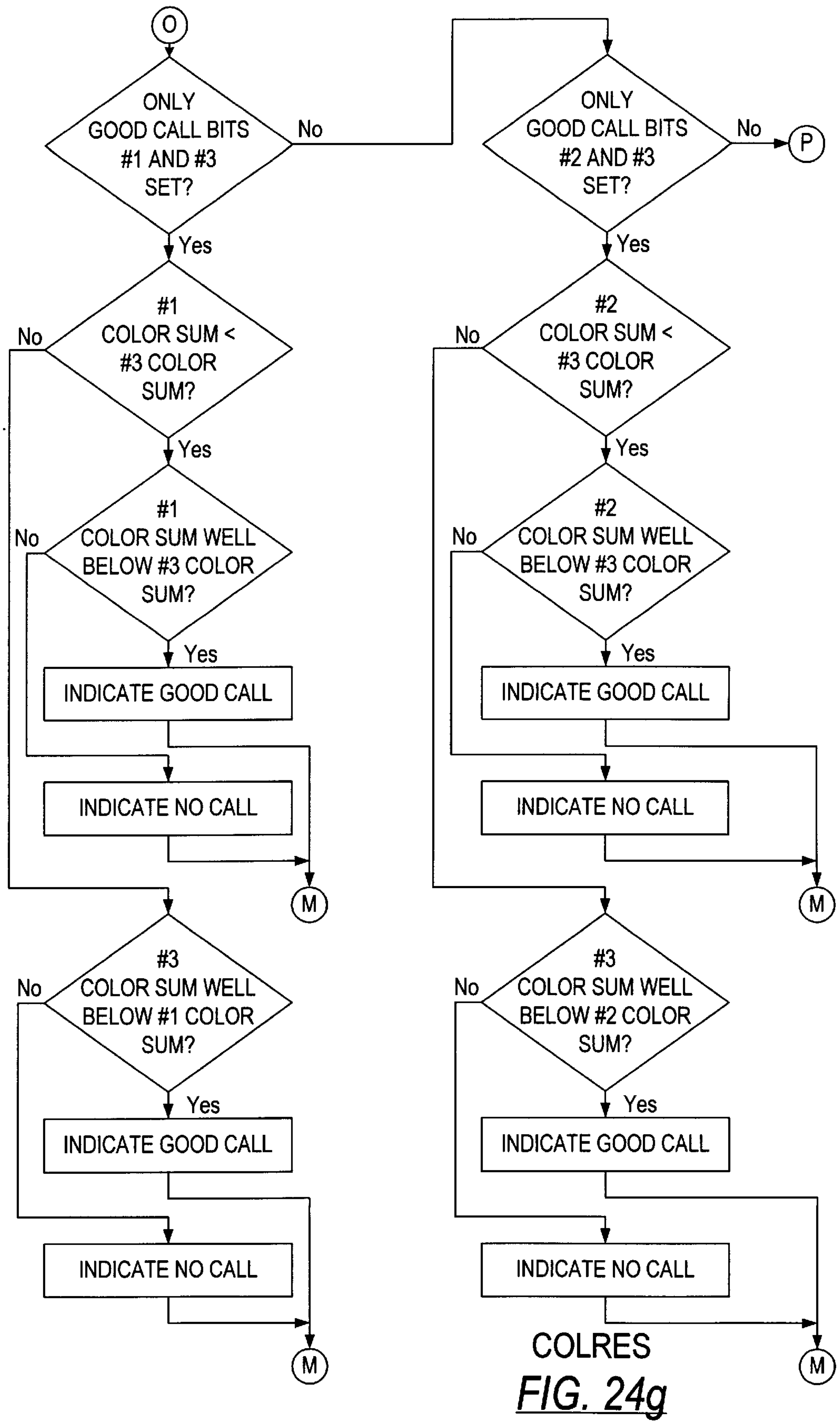
Figure 24H:
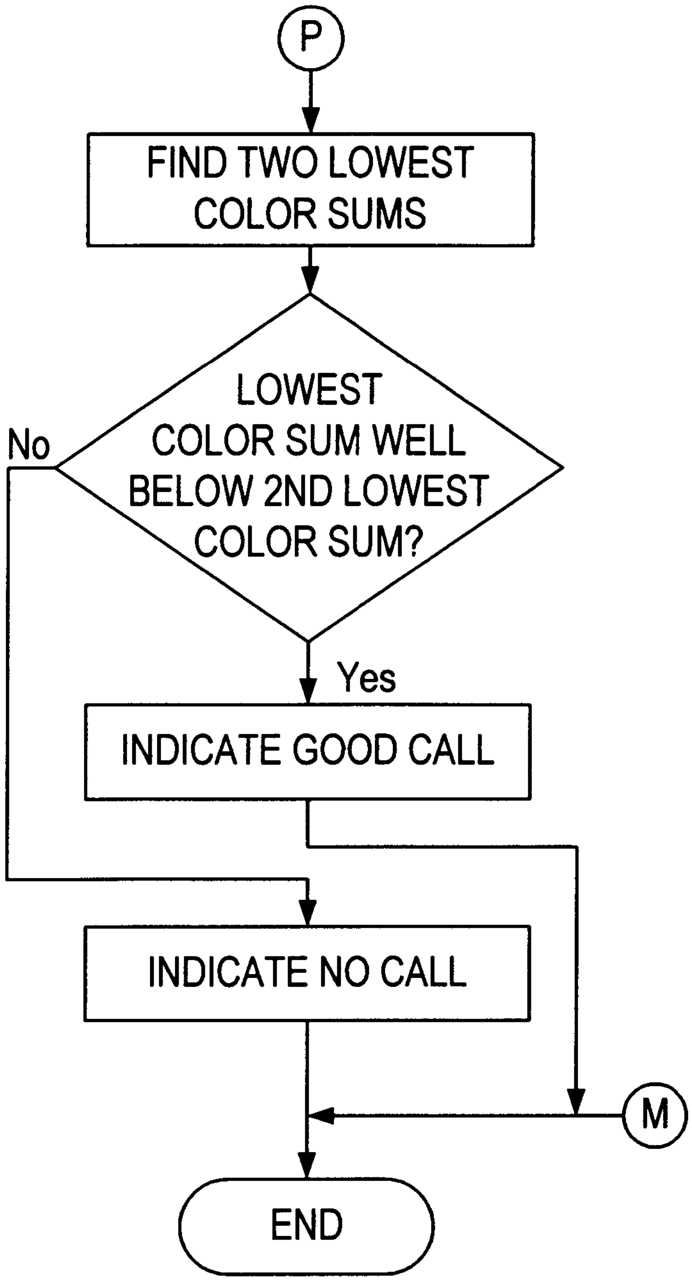

FIGS. 24*a*–24*h* are flow charts illustrating a main routine and subroutines which may be substituted for the flow charts of FIGS. 23*c*–*d*. Points F and G of FIG. 24*a* connect to points F and G in FIGS. 23*a*–*b*. FIG. 25*a* shows a "main" routine. FIG. 24*b* shows a "THRCHK" subroutine. FIGS. 24*c* and 24*d* show a "PATTCHK" subroutine, FIG. 24*e* shows a "FINSUMS" subroutine, and FIGS. 24*f*, 24*g* and 24*h* show a "COLRES" subroutine.

An alternative comparison method comprises comparing the individual test hue samples to their corresponding master hue samples. If the test hue samples are within a range of 8% of the master hues, then a match is recorded. If the test and master hue comparison records a threshold number of matches, such as 62 out of the 64 samples, the brightness patterns are compared as described in the above method.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A document handling system for processing documents, the system comprising:

a document transport mechanism being adapted to transport documents along a transport path from an input receptacle to at least one output receptacle;

a full color sensor being adapted to scan color characteristics of the document, the full color sensor including at least one color cell disposed adjacent to the document transport path, the at least one color cell including at least two primary color sensors for sensing each of at least two primary colors, each of the primary color sensors being linearly aligned transverse to the document transport path;

an edge sensor being adapted to detect at least the presence of a document, the edge sensor being linearly aligned with the primary color sensors; and a processor being adapted to process data corresponding to the characteristics scanned from one or more documents with the color sensor and to use the data to evaluate one or more documents.

2. The system of claim 1 wherein each of said primary color sensors comprises an optical sensor and an optical filter.

3. The system of claim 2 said optical filters comprise dichroic color separation glass filters.

4. The system of claim 1 wherein each of said primary color sensors generates analog signals representing variations in the respective primary color contents of a document being scanned, and further including an analog to digital converter for converting said analog signals to digital signals.

5. The system of claim 4 and further including a memory for storing the digital signals from two of said primary color sensors, and wherein said processor determines a value of the third primary color content of the document from the two digital signals stored by the memory.

6. The system of claim 1 and further including a light source, and wherein said primary color sensors are positioned for detecting light from said light source reflected from a bill being scanned and producing corresponding output signals.

7. The system of claim 6 and further including an encoder operatively coupled with said primary color sensors for defining sampling intervals for sampling output signals in synchronism with movement of a document relative to said full color sensor.

8. The system of claim 7 wherein said encoder synchronizes the sampling intervals with an operating frequency of the light source.

9. The system of claim 1 wherein each of said primary color sensors comprises a photodiode having a relatively large sensor area.

10. The system of claim 1 wherein each of said color cells is positioned for viewing a strip of a document being scanned and for producing continuous output signals corresponding to the color content of light reflected from said strip.

11. The system of claim 10 and further including an encoder operatively coupled with said color cells for defining sampling intervals for sampling said output signals in synchronization with movement of a document relative to said full color sensor.

12. The system of claim 11 wherein said encoder selects said sampling intervals such that successive samples of said output signals overlap one another.

13. The system of claim 1 wherein said processor is responsive to respective signals developed by said primary color sensors for developing a total brightness signal comprising the sum of the output signals from said primary color sensors and respective hue signals for each of the primary color sensors corresponding to the percentage of the total brightness signal that each of the output signals constitutes.

14. The system of claim 1 and further including a memory for storing master color characteristic data associated with each genuine document which the system is capable of discriminating, and wherein said processor compares the color characteristics scanned from a document with at least some of the master color characteristic data stored in said memory.

15. The system of claim 14 wherein said processor is operable in a learn mode for delivering data to said memory corresponding to characteristics scanned from a document by said full color sensor, when the scanned document is a genuine document, said data comprising master color characteristic data.

16. The system of claim 14 wherein said master color characteristics include a plurality of sets of data, one for each of at least four possible orientations of a document, as a document moves relative to said sensor.

17. The system of claim 14 wherein said memory contains master color characteristic data corresponding to color characteristics of documents comprising genuine bills of each of a plurality of denominations from the currency systems of each of a plurality of countries.

18. The system of claim 14 wherein said memory contains master color characteristic data corresponding to color characteristics of a plurality of denominations of documents including at least one type of casino script.

19. The system of claim 1 wherein said full color sensor is located for scanning color characteristics on one side of a document.

20. The system of claim 19 wherein a second color module is provided for scanning color characteristics on the other side of a document.

21. The system of claim 1 and further including a housing for mounting all components of said document handling system, said housing being relatively compact so as to fit on a table top, desk, work station, teller station and the like.

22. The system of claim 21 wherein said housing has a footprint of no more than about 11 inches by about 12 inches.

23. The system of claim 21 wherein said housing has a footprint of no more than about 15 inches by 20 inches.

24. The system of claim 21 wherein the housing and components of said document handling system weighs less than about 35 pounds.

25. The system of claim 21 wherein the housing and components of said document handling system weighs less than about 50 pounds.

26. The system of claim 1 and further including a memory for storing master color characteristic data corresponding to color characteristics of genuine documents which the system is capable of discriminating and master data corresponding to at least one other characteristic of each genuine document which the system is capable of discriminating and wherein said signal processing means compares said master color characteristic data with the color characteristic scanned from said document and selects master data corresponding to one or more potentially matching genuine documents for comparison with the characteristic scanned by said first sensor based at least in part on the color comparison.

27. The document handling system of claim 1 further comprising a first sensor for scanning at least one characteristic of a document other than color.

28. The system of claim 27 wherein said first sensor comprises an optical sensor.

29. The system of claim 27 wherein said first sensor comprises a magnetic sensor.

30. The system of claim 27 wherein said first sensor comprises a UV sensor.

31. A document handling method for processing documents, the method comprising:

transporting documents along a document transport path;

detecting the presence of a document with an edge sensor disposed adjacent to the transport path;

scanning one of at least two primary colors with a first primary color sensor disposed adjacent to the transport path;

scanning the other of at least to primary colors with a second primary color sensor disposed adjacent to the transport path, the first primary color sensor, the second primary color sensor, and the edge sensor being linearly aligned transverse to the document transport path;

processing data corresponding to the color and other characteristics scanned from one or more documents; and using the data to evaluate one or more documents.

32. The method of claim 31 wherein scanning the primary colors comprises optically filtering light reflected from a document and optically sensing the filtered light.

33. The method of claim 31 wherein scanning the primary colors includes generating analog signals representing variations in at least two primary color contents of a document being scanned, and converting said analog signals to digital signals.

34. The method of claim 33 and further including storing the digital signals corresponding to two of said primary colors and determining a value of the third primary color content of the document from the two stored digital signals.

35. The method of claim 31 wherein scanning includes viewing a strip of a document and producing continuous output signals corresponding to the color content of light reflected from said strip.

36. The method of claim 35 wherein processing includes defining sampling intervals for sampling said output signals in synchronization with movement of a document relative to said primary color sensors.

37. The method of claim 36 wherein said sampling intervals are selected such that successive samples of said output signals overlap one another.

38. The method of claim 36 and further including synchronizing the sampling intervals with an operating frequency of a light source.

39. The method of claim 31 wherein processing includes developing a total brightness signal comprising the sum of the output signals and respective hue signals for each of the primary colors corresponding to the percentage of the total brightness signal that each of the output signals constitutes.

40. The method of claim 31 and further including storing master color characteristic data associated with each genuine document which the system is capable of discriminating, and comparing the color characteristics scanned from a document with at least some of the stored master color characteristic data.

41. The method of claim 40 and further including operating in a learn mode for storing data corresponding to the color characteristics scanned from a document when the scanned document is a genuine document, said data comprising master color characteristic data.

42. The method of claim 40 wherein said master color characteristics include a plurality of sets of data, one for each of at least four possible orientations of a document.

43. The method of claim 31 wherein scanning includes scanning on both sides of a document.

44. The method of claim 31 and further including storing master color characteristic data corresponding to color characteristics of genuine documents which the method is capable of discriminating and master data corresponding to at least one other characteristic of each genuine document which the system is capable of discriminating and wherein processing comprises comparing said master color characteristic data with the color characteristic scanned from said document and selecting master data corresponding to one or more potentially matching genuine documents for comparison with said scanned other characteristic based at least in part on the color comparison.

45. The method of claim 31 further comprising scanning at least one characteristic of a document other than color.

46. A color scanhead apparatus for a document handling system having a document transport mechanism for transporting documents along a transport path from an input receptacle to at least one output receptacle, said color scanhead comprising:

a scanhead body including a plurality of receptacles linearly-aligned transverse to the document transport path;

a full color sensor including a plurality of color cells, the plurality of color cells being disposed adjacent to the transport path, each of said color cells comprising at least two primary color sensors being adapted to sense each of at least two primary colors, each of the least two primary color sensors being mounted within one of the plurality of receptacles; and at least one edge sensor for detecting at least the presence of a document mounted within one of the plurality of receptacles.

47. The apparatus of claim 46 wherein each of said primary color sensors comprises an optical sensor and an optical filter.

48. The apparatus of claim 47 said optical filters comprise dichroic color separation glass filters.

49. The apparatus of claim 47 wherein said scanhead body includes a plurality of sensor receptacles, said optical sensors and said optical filters being positioned in said receptacles, each receptacle having one optical sensor positioned behind a corresponding optical filter.

50. The apparatus of claim 49 wherein respective adjacent groups of said receptacles form a color cell, for respectively receiving one each of said primary color sensors, said scanhead body further including cell partitions extending between adjacent color cells.

51. The apparatus of claim 50 and further including a mask interposed between said light source and said primary color sensors, said mask having a reflective surface facing the light source and a relatively narrow slit for transmitting reflected light to the primary color sensors.

52. The apparatus of claim 51 and further including a manifold positioned between said mask and said primary color sensors for substantially limiting light reaching the sensors to light reflected through said slit in said mask, said cell partitions running substantially from a sensor end to a mask end of each cell.

53. The apparatus of claim 50 wherein at least one of said receptacles mounts a document edge sensor in place of a primary color sensor.

54. The apparatus of claim 46 and further including a light source, and wherein said primary color sensors are positioned for detecting light from said light source reflected from a bill being scanned.

55. The apparatus of claim 46 wherein each of said primary color sensors comprises a photodiode having a relatively large sensor area.

56. The apparatus of claim 46 wherein said scanhead includes at least one light source mounted to said scanhead body and positioned relatively close to a transport path along which a document moves adjacent to said scanhead.

57. The apparatus of claim 56 wherein said light source comprises at least one fluorescent tube providing white light with a high intensity in red, blue and green wavelengths.

58. The apparatus of claim 56 wherein said scanhead further includes a glass shield mounted to said scanhead body and positioned between the light source and the transport path.

59. The apparatus of claim 56 and further including a mask mounted to said scanhead body and interposed between said light source and said primary color sensors, said mask having a reflective surface facing the light source and a relatively narrow slit for transmitting reflected light to the primary color sensors.

60. The apparatus of claim 59 and further including a manifold positioned between said mask and said primary color sensors for substantially limiting light reaching the sensors to light reflected through said slit in said mask.

61. The apparatus of claim 60 wherein said manifold has interior surfaces formed at an angle such that the width of the manifold adjacent the mask is greater than the width of the manifold adjacent said primary color sensors for substantially trapping light reflected through said slit.

62. The apparatus of claim 61 wherein the interior surfaces of said manifold are coated with a light absorbing material to substantially prevent noisy light from reaching to the primary color sensors.

63. A color scanning method for a document handling system for processing documents, the method comprising:

transporting documents along a document transport path;

detecting the presence of a document with an edge sensor disposed adjacent to the transport path;

scanning one of at least two primary colors with a first primary color sensor disposed adjacent to the transport path;

scanning the other of at least to primary colors with a second primary color sensor disposed adjacent to the transport path, the first primary color sensor, the second primary color sensor, and the edge sensor being linearly aligned transverse to the document transport path;

scanning at least one characteristic of the document other than color;

processing data corresponding to the characteristics scanned from one or more documents;

using the data to evaluate one or more documents;

generating analog signals representing variations in at least two primary color contents of a document being scanned, and converting said analog signals to digital signals; and storing the digital signals corresponding to two of said primary colors and determining a value of the third primary color content of the document from the two stored digital signals.

64. The method of claim 63 wherein scanning the primary colors comprises optically filtering light reflected from a document and optically sensing the filtered light.

65. The method of claim 63 wherein scanning includes viewing a strip of a document and producing continuous output signals corresponding to the color content of light reflected from said strip.

66. The method of claim 65 wherein processing includes defining sampling intervals for sampling said output signals in synchronization with movement of a document relative to said full color sensor.

67. The method of claim 66 wherein said sampling intervals are selected such that successive samples of said output signals overlap one another.

68. The method of claim 66 and further including synchronizing the sampling intervals with an operating frequency of a light source.

69. The method of claim 63 wherein processing includes developing a total brightness signal comprising the sum of the output signals and respective hue signals for each of the primary colors corresponding to a percentage of the total brightness signal that each of the output signals constitutes.

70. The method of claim 63 and further including storing master color characteristic data associated with each genuine document which the system is capable of discriminating, and comparing the color characteristics scanned from a document with at least some of the stored master color characteristic data.

71. The method of claim 70 wherein said master color characteristics include a plurality of sets of data, one for each of at least four possible orientations of a document.

72. The method of claim 63 wherein scanning primary colors includes scanning primary colors on both sides of a document.

73. A currency handling system for processing currency bills, the system comprising:

a currency bill transport mechanism being adapted to transport currency bills along a transport path from an input receptacle to at least one output receptacle;

a full color sensor being adapted to scan color characteristics of a currency bill, the full color sensor including at least one color cell disposed adjacent to the transport path, the at least one color cell including at least two primary color sensors for sensing each of at least two primary colors, each of the primary color sensors being linearly aligned transverse to the transport path;

an edge sensor being adapted to detect at least the presence of a currency bill, the edge sensor being linearly aligned with the primary color sensors; and a processor being adapted to process data corresponding to the characteristics scanned from one or more currency bills with the color sensor and to use the data to evaluate one or more documents.

74. The system of claim 53 wherein the full color sensor includes a plurality of color cells, each cell comprising a primary color sensor for sensing each of at least two primary colors and producing a corresponding output signal.

75. The system of claim 74 wherein the full color sensor is part of a color module, the color module further including an edge sensor located to one side of the color cells for detecting at least the presence of a document adjacent the color cells.

76. The system of claim 75 wherein the module further includes a light source, and wherein the primary color sensors are positioned for detecting light from the light source reflected from a bill being scanned and producing corresponding output signals.

77. The system of claim 76 and further including an encoder operatively coupled with the primary color sensors for defining sampling intervals for sampling output signals in synchronization with movement of a document relative to the color module.

78. The system of claim 77 wherein the encoder synchronizes the sampling intervals with an operating frequency of the light source.

79. The system of claim 75 wherein the color module is located for scanning color characteristics on one side of a document.

80. The system of claim 79 wherein a second color module is provided for scanning color characteristics on the other side of a document.

81. The system of claim 74 wherein each of the primary color sensors comprises an optical sensor and an optical filter.

82. The system of claim 81 the optical filters comprise dichroic color separation glass filters.

83. The system of claim 74 wherein each of the primary color sensors generates analog signals representing variations in the respective primary color contents of a document being scanned, and further including an analog to digital converter for converting the analog signals to digital signals.

84. The system of claim 83 and further including a memory for storing the digital signals from two of the primary color sensors, and wherein the processor determines a value of the third primary color content of the document from the two digital signals stored by the memory.

85. The system of claim 74 wherein each of the primary color sensors comprises a photodiode having a relatively large sensor area.

86. The system of claim 74 wherein each of the color cells is positioned for viewing a strip of a document being scanned and for producing continuous output signals corresponding to the color content of light reflected from the strip.

87. The system of claim 86 and further including an encoder operatively coupled with the color cells for defining sampling intervals for sampling the output signals in synchronization with movement of a document relative to the full color sensor.

88. The system of claim 87 wherein the encoder selects the sampling intervals such that successive samples of the output signals overlap one another.

89. The system of claim 74 wherein the processor is responsive to respective signals developed by the primary color sensors for developing a total brightness signal comprising the sum of the output signals from the primary color sensors and respective hue signals for each of the primary color sensors corresponding to the percentage of the total brightness signal that each of the output signals constitutes.

90. The system of claim 73 and further including a memory for storing master color characteristic data associated with each genuine document which the system is capable of discriminating, and wherein the processor compares the color characteristics scanned from a document with at least some of the master color characteristic data stored in the memory.

91. The system of claim 90 wherein the processor is operable in a learn mode for delivering data to the memory corresponding to characteristics scanned from a document by the full color sensor, when the scanned document is a genuine document, the data comprising master color characteristic data.

92. The system of claim 90 wherein the master color characteristics include a plurality of sets of data, one for each of at least four possible orientations of a document, as a document moves relative to the sensor.

93. The system of claim 90 wherein the memory contains master color characteristic data corresponding to color characteristics of documents comprising genuine bills of each of a plurality of denominations from the currency systems of each of a plurality of countries.

94. The system of claim 90 wherein the memory contains master color characteristic data corresponding to color characteristics of a plurality of denominations of documents including at least one type of casino script.

95. The system of claim 73 and further including a housing for mounting all components of the document handling system, the housing being relatively compact so as to fit on a table top, desk, work station, teller station and the like.

96. The system of claim 95 wherein the housing has a footprint of no more than about 11 inches by about 12 inches.

97. The system of claim 95 wherein the housing has a footprint of no more than about 15 inches by 20 inches.

98. The system of claim 95 wherein the housing and components of the document handling system weighs less than about 35 pounds.

99. The system of claim 95 wherein the housing and components of the document handling system weighs less than about 50 pounds.

100. The system of claim 73 and further including a memory for storing master color characteristic data corresponding to color characteristics of genuine documents which the system is capable of discriminating and master data corresponding to at least one other characteristic of each genuine document which the system is capable of discriminating and wherein the signal processing means compares the master color characteristic data with the color characteristic scanned from the document and selects master data corresponding to one or more potentially matching genuine documents for comparison with the characteristic scanned by the first sensor based at least in part on the color comparison.

101. The currency handling system of claim 73 further comprising a first sensor for scanning at least one characteristic of a currency bill other than color.

102. The system of claim 101 wherein the first sensor comprises an optical sensor.

103. The system of claim 101 wherein the first sensor comprises a magnetic sensor.

104. The system of claim 101 wherein the first sensor comprises a UV sensor.

105. A currency bill handling method for processing currency bills, the method comprising:

transporting currency bills along a document transport path;

detecting the presence of a currency bill with an edge sensor disposed adjacent to the transport path;

scanning one of at least two primary colors with a first primary color sensor disposed adjacent to the transport path;

scanning the other of at least to primary colors with a second primary color sensor disposed adjacent to the transport path, the first primary color sensor, the second primary color sensor, and the edge sensor being linearly aligned transverse to the document transport path;

processing data corresponding to the color and other characteristics scanned from one or more documents; and using the data to evaluate one or more currency bills.

106. The method of claim 105 wherein scanning the primary colors comprises optically filtering light reflected from a document and optically sensing the filtered light.

107. The method of claim 105 wherein scanning the primary colors includes generating analog signals representing variations in at least two primary color contents of a document being scanned, and converting the analog signals to digital signals.

108. The method of claim 107 and further including storing the digital signals corresponding to two of the primary colors and determining a value of the third primary color content of the currency bill from the two stored digital signals.

109. The method of claim 105 wherein scanning includes viewing a strip of a currency bill and producing continuous output signals corresponding to the color content of light reflected from the strip.

110. The method of claim 109 wherein processing includes defining sampling intervals for sampling the output signals in synchronization with movement of a currency bill relative to the primary color sensors.

111. The method of claim 110 wherein the sampling intervals are selected such that successive samples of the output signals overlap one another.

112. The method of claim 110 and further including synchronizing the sampling intervals with an operating frequency of a light source.

113. The method of claim 110 wherein processing includes developing a total brightness signal comprising the sum of the output signals and respective hue signals for each of the primary colors corresponding to the percentage of the total brightness signal that each of the output signals constitutes.

114. The method of claim 105 and further including storing master color characteristic data associated with each genuine currency bill which the system is capable of discriminating, and comparing the color characteristics scanned from a currency bill with at least some of the stored master color characteristic data.

115. The method of claim 114 and further including operating in a learn mode for storing data corresponding to the color characteristics scanned from a currency bill when the scanned currency bill is a genuine document, the data comprising master color characteristic data.

116. The method of claim 114 wherein the master color characteristics include a plurality of sets of data, one for each of at least four possible orientations of a currency bill.

117. The method of claim 105 wherein scanning includes scanning on both sides of a currency bill.

118. The method of claim 105 and further including storing master color characteristic data corresponding to color characteristics of genuine currency bills which the method is capable of discriminating and master data corresponding to at least one other characteristic of each genuine currency bill which the system is capable of discriminating and wherein processing comprises comparing the master color characteristic data with the color characteristic scanned from the currency bill and selecting master data corresponding to one or more potentially matching genuine currency bills for comparison with the scanned other characteristic based at least in part on the color comparison.

* * * * *

UNITED STATES PATENT AND TRADEMARK OFFICE
CERTIFICATE OF CORRECTION

PATENT NO. : 6,256,407 B1
DATED : July 3, 2001
INVENTOR(S) : Mennie et al.

It is certified that error appears in the above-identified patent and that said Letters Patent is hereby corrected as shown below:

Title page,
Item [56], FOREIGN PATENT DOCUMENTS, delete "0 718 809 6/1996 (EP)" and insert -- 0 178 809 6/1995 (EP) --

Column 46, claim 7,
Line 37, please delete "synchronism" and insert -- synchronization --.

Column 49, claim 46,
Line 18, please delete "linearly-aligned" and insert -- linearly aligned --.

Signed and Sealed this

Twenty-ninth Day of January, 2002

*Attest:*

JAMES E. ROGAN
*Attesting Officer* *Director of the United States Patent and Trademark Office*